US012750512B2

(12) United States Patent
Zhang et al.

(10) Patent No.: US 12,750,512 B2
(45) Date of Patent: Sep. 29, 2026

(54) SEARCH AREA REFINEMENT FOR DECODER MOTION REFINEMENT

(71) Applicant: QUALCOMM Incorporated, San Diego, CA (US)

(72) Inventors: Zhi Zhang, Munich (DE); Po-Han Lin, Taipei (TW); Jian-Liang Lin, Su'ao Township (TW); Yan Zhang, San Diego, CA (US); Chun-Chi Chen, San Diego, CA (US); Han Huang, San Diego, CA (US); Vadim Seregin, San Diego, CA (US); Marta Karczewicz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 18/970,073

(22) Filed: Dec. 5, 2024

(65) Prior Publication Data

US 2025/0220208 A1 Jul. 3, 2025

Related U.S. Application Data

(60) Provisional application No. 63/615,106, filed on Dec. 27, 2023.

(51) Int. Cl.
*H04N 19/44* (2014.01)
*H04N 19/105* (2014.01)
*H04N 19/176* (2014.01)

(52) U.S. Cl.
CPC ........... *H04N 19/44* (2014.11); *H04N 19/105* (2014.11); *H04N 19/176* (2014.11)

(58) Field of Classification Search
CPC .... H04N 19/105; H04N 19/176; H04N 19/44; H04N 19/52
See application file for complete search history.

(56) References Cited

U.S. PATENT DOCUMENTS

2016/0366416 A1* 12/2016 Liu ......................... G06T 7/246
2022/0329823 A1* 10/2022 Chen ...................... H04N 19/53
(Continued)

FOREIGN PATENT DOCUMENTS

WO 2016200779 A1 12/2016

OTHER PUBLICATIONS

"Decoder Side Motion Vector Refinement for Versatile Video Coding"—Gao et al., 978-1-7281-1817-8/19/$31.00 c 2019 IEEE (Year: 2019).*
(Continued)

*Primary Examiner* — Mainul Hasan
(74) *Attorney, Agent, or Firm* — QUALCOMM Incorporated

(57) ABSTRACT

An example device includes one or more processors configured to determine a first search area in a first reference picture for a current block of the video data. The one or more processors are configured to determine a first initial reference block in the first search area. The one or more processors are configured to apply a local illumination compensation model to the first search area to generate a refined first search area. The one or more processors are configured to apply template matching to the refined first search area to determine a first candidate motion vector having a lowest template matching cost for the refined first search area. The one or more processors are configured to decode the current block based on the first candidate motion vector.

20 Claims, 21 Drawing Sheets

(56) References Cited

U.S. PATENT DOCUMENTS

| | | | | |
|---|---|---|---|---|
| 2022/0417522 A1* | 12/2022 | Huang | ................. | H04N 19/513 |
| 2024/0364865 A1* | 10/2024 | Deng | .................... | H04N 19/176 |
| 2024/0380903 A1* | 11/2024 | Deng | .................... | H04N 19/176 |
| 2025/0142081 A1* | 5/2025 | Vishwanath | ......... | H04N 19/139 |

OTHER PUBLICATIONS

"Adaptive linear model for intra block copy with local illumination compensation"—Wang et al., 2023 IEEE International Conference on Visual Communications and Image Processing (VCIP) (Year: 2023).*

"A VVC Proposal With Quaternary Tree Plus Binary-Ternary Tree Coding Block Structure and Advanced Coding Techniques"—Huang et al., IEEE Transactions on Circuits and Systems for Video Technology, vol. 30, No. 5, May 2020 ( Year: 2020).*

Bross B., et al., "Versatile Video Coding Editorial Refinements on Draft 10", JVET-T2001-v2, Joint Video Experts Team (JVET) of ITU-T SG 16 WP 3 and ISO/IEC JTC 1/SC 2920th Meeting, by Teleconference, Oct. 7-16, 2020, pp. 1-514.

Chen J., et al., "Algorithm Description for Versatile Video Coding and Test Model 10 (VTM 10)", JVET-S2002-v2, Joint Video Experts Team (JVET)of ITU-T SG 16 WP 3 and ISO/IEC JTC 1/SC 29/WG 11 19th Meeting: by Teleconference, Jun. 22-Jul. 1, 2020, pp. 1-99, Doc: JVET-S2002-v1.

Chen J., et al., "Algorithm Description for Versatile Video Coding and Test Model 11 (VTM 11)", JVET-T2002-v2, Joint Video Experts Team (JVET) of ITU-T SG 16 WP 3 and ISO/IEC JTC 1/SC 29, 20th Meeting, by teleconference, Oct. 7-16, 2020, pp. 1-102.

Coban M., et al., "Algorithm Description of Enhanced Compression Model 10 (ECM 10)", JVET-AE2025-v1, Joint Video Experts Team (JVET) of ITU-T SG 16 WP 3 and ISO/IEC JTC 1/SC 29, 31st Meeting, Geneva, CH, Jul. 11-19, 2023, pp. 1-83, Oct. 29, 2023, XP030313627, The whole document.

Coban M., et al., "Algorithm Description of Enhanced Compression Model 11 (ECM 11)", JVET-AF2025, Joint Video Experts Team (JVET) of ITU-T SG 16 WP 3 and ISO/IEC JTC 1/SC 29 32nd Meeting, Hannover, DE, Oct. 13-20, 2023, pp. 1-85, JVET-AF2025-V1.

ITU-T H.265: "Series H: Audiovisual and Multimedia Systems Infrastructure of Audiovisual Services—Coding of Moving Video", High Efficiency Video Coding, The International Telecommunication Union, Jun. 2019, 696 Pages.

ITU-T H.266: "Series H: Audiovisual and Multimedia Systems Infrastructure of Audiovisual Services—Coding of Moving Video", Versatile Video Coding, The International Telecommunication Union, Aug. 2020, 516 pages.

Karczewicz M., et al., "Common Test Conditions and Evaluation Procedures for Enhanced Compression Tool Testing", JVET-AF2017-v1, Joint Video Experts Team (JVET) of ITU-T SG 16 WP 3 and ISO/IEC JTC 1/SC 29 32nd Meeting, Hannover, DE, Oct. 13-20, 2023, pp. 1-12.

Karczewicz M., et al., "Common Test Conditions and Evaluation Procedures for Enhanced Compression Tool Testing", JVET-Y2017-v1, Joint Video Experts Team (JVET) of ITU-T SG 16 WP 3 and ISO/IEC JTC 1/SC 29, 25th Meeting, by teleconference, Jan. 12-21, 2022, pp. 1-12.

Seregin V., et al., "CE4-3.1a and CE4-3.1b: Unidirectional Local Illumination Compensation with Affine Prediction", JVET-O0066-v1, Joint Video Experts Team (JVET) of ITU-T SG 16 WP 3 and ISO/IEC JTC 1/SC 29/WG 11, 15th Meeting, Gothenburg, SE, Jul. 3-12, 2019, pp. 1-5.

Seregin V., et al., "Exploration Experiment on Enhanced Compression Beyond VVC Capability (EE2)", Joint Video Experts Team (JVET) of ITU-T SG 16 WP 3 and ISO/IEC JTC 1/SC 29, 32nd Meeting, Hannover, DE, Oct. 13-20, 2023, JVET-AF2024-v2, pp. 1-22.

Seregin V., "Merge Branch 'xlxiangli/ecm16-ahg7cfg' into 'master'", ECM Software, Created on Jul. 22, 2021, pp. 1-3.

Sullivan G.J., et al., "Overview of the High Efficiency Video Coding (HEVC) Standard", IEEE Transactions on Circuits and Systems for Video Technology, IEEE Service Center, Piscataway, NJ, US, vol. 22, No. 12, Dec. 1, 2012, XP055045358, XP011487803, pp. 1649-1668.

Wang Y., et al., "EE2 Test 2.6g, 2.6h, 2.6i, 2.6j: Combination of Tests on LIC Improvement", JVET-AG0276_r2, Joint Video Experts Team (JVET) of ITU-T SG 16 WP 3 and ISO/IEC JTC 1/SC 29, 33rd Meeting, by Teleconference, Jan. 17-26, 2024, JVET-AG0276-v3, pp. 1-5.

Wang Y., et al., "Non-EE2: Extension of Local Illumination Compensation", JVET-AF0200_r1, Joint Video Experts Team (JVET)of ITU-T SG 16 WP 3 and ISO/IEC JTC 1/SC 29, 32nd Meeting, Hannover, DE, Oct. 13-20, 2023, JVET-AF0200-v2, pp. 1-3.

Wang Y-K., et al., "High Efficiency Video Coding (HEVC) Defect Report", JCTVC-N1003_v1, Joint Collaborative Team on Video Coding (JCT-VC) of ITU-T SG 16 WP 3 and ISO/IEC JTC 1/SC 29/WG 11 14th Meeting: Vienna, AT, Jul 25-Aug. 2, 2013, 311 Pages.

Xiu X., et al., "EE2-Test2.7: Improvements on Local Illumination Compensation", JVET-AD0213-v1, Joint Video Experts Team (JVET) of ITU-T SG 16 WP 3 and ISO/IEC JTC 1/SC 29 30th Meeting, Antalya, TR, Apr. 21-28, 2023, pp. 1-5.

Xiu X., et al., "Non-EE2: Enhancements on local illumination compensation", JVET-AF0191-v2, Joint Video Experts Team (JVET) of ITU-T SG 16 WP 3 and ISO/IEC JTC 1/SC 29, JVET-AF0191_r1, 32nd Meeting, Hannover, DE, Oct. 13-20, 2023, pp. 1-3.

Zhang N., et al., "EE2-3.2: LIC flag derivation for merge candidates with template costs", JVET-AF0128-v2, Joint Video Experts Team (JVET) of ITU-T SG 16 WP 3 and ISO/IEC JTC 1/SC 29, 32nd Meeting, Hannover, DE, Oct. 13-20, 2023, pp. 1-3.

Zhang Y., et al., "EE2: Test 2.1, 2.2, 2.5, 2.6a, 2.6e and 2.6f on LIC improvement", JVET-AG0176-v2, Joint Video Experts Team (JVET) of ITU-T SG 16 WP 3 and ISO/IEC JTC 1/SC 29, 33rd Meeting, by teleconference, Jan. 17-26, 2024, pp. 1-6.

Zhang Y., et al., "EE2-2.1: Regression Based Affine Candidate Derivation", JVET-AA0107-v2, Joint Video Experts Team (JVET) of ITU-T SG 16 WP 3 and ISO/IEC JTC 1/SC 29, 27th Meeting, by teleconference, Jul. 13-22, 2022, pp. 1-5.

Zhang Y., et al., "Non-EE2: On LIC Flag in Merge Mode", Doc: JVET-AF0194, Joint Video Experts Team (JVET) of ITU-T SG 16 WP 3 and ISO/IEC JTC 1/SC 29, 32nd Meeting, Hannover, DE, Oct. 13-20, 2023, JVET-AF0194-V2, pp. 1-2.

Coban M., et al., "Algorithm Description of Enhanced Compression Model 9 (ECM 9)", 142. MPEG Meeting; Apr. 24, 2023-Apr. 28, 2023, Antalya, (Motion Picture Expert Group or Iso/iec Jtc1/sc29/wg11), No. m63602, JVET-AD2025, Joint Video Experts Team (JVET) of ITU-T SG 16 WP 3 and ISO/IEC JTC 1/SC 29, 30th Meeting, Antalya, TR, Apr. 21-28, 2023, pp. 1-76, Jul. 3, 2023, XP030311068.

Filippov (Huawei) A., et al., "CE1-related: Simplification of LIC parameter derivation and its unification with CCLM", JVET-N0410-v2, Joint Video Experts Team (JVET) of ITU-T SG 16 WP 3 and ISO/IEC JTC 1/SC 29/WG 11 14th Meeting, Geneva, CH, Mar. 19-27, 2019, No. JVET-N0410, Mar. 23, 2019, XP030204653, 7 pages, abstract, section 2.

Filippov (Ofinno) A., et al., "Non-EE2: LIC Extensions", JVET-AE0140-v2, Joint Video Experts Team (JVET) of ITU-T SG 16 WP 3 and ISO/IEC JTC 1/SC 29, 31st Meeting, Geneva, CH, Jul. 11-19, 2023, No. JVET-AE0140, Jul. 13, 2023, 4 pages, XP030311424, abstract, figures 1-3 Sections 1-2.

International Search Report and Written Opinion—PCT/US2024/058799—ISA/EPO—Mar. 26, 2025 13 Pages.

* cited by examiner

SEARCH AREA REFINEMENT FOR DECODER MOTION REFINEMENT

This application claims the benefit of U.S. Provisional Patent Application 63/615,106, filed Dec. 27, 2023, the entire content of which is incorporated by reference.

TECHNICAL FIELD

This disclosure relates to video encoding and video decoding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video coding techniques, such as those described in the standards defined by MPEG-2, MPEG-4, ITU-T H.263, ITU-T H.264/MPEG-4, Part 10, Advanced Video Coding (AVC), ITU-T H.265/High Efficiency Video Coding (HEVC), ITU-T H.266/Versatile Video Coding (VVC), and extensions of such standards, as well as proprietary video codecs/formats such as AOMedia Video 1 (AV1) that was developed by the Alliance for Open Media. The video devices may transmit, receive, encode, decode, and/or store digital video information more efficiently by implementing such video coding techniques.

Video coding techniques include spatial (intra-picture) prediction and/or temporal (inter-picture) prediction to reduce or remove redundancy inherent in video sequences. For block-based video coding, a video slice (e.g., a video picture or a portion of a video picture) may be partitioned into video blocks, which may also be referred to as coding tree units (CTUs), coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to as reference frames.

SUMMARY

In general, this disclosure describes techniques for decoder-side motion vector derivation (e.g., template matching, bilateral matching, decoder-side motion vector refinement, bi-directional optical flow) and/or local illuminance compensation (LIC) in video coding. These techniques may improve the bilateral matching decoder side motion refinement (BDMVR) search result by improving the prediction signal of reference search areas on reference picture L0 and L1 when compared to other video coder implementations or video coding standards. By improving the search result, the techniques of this disclosure may improve the quality of decoded video and/or improve encoding and/or decoding efficiency.

In one example, a method includes: determining a first search area in a first reference picture for a current block of the video data; determining a first initial reference block in the first search area; applying a first local illumination compensation (LIC) model to the first search area to generate a refined first search area; applying template matching to the refined first search area to determine a first candidate motion vector having a lowest template matching cost for the refined first search area; and decoding the current block based on the first candidate motion vector.

In another example, a device includes one or more memories configured to store video data and one or more processors coupled to the one or more memories, the one or more processors configured to one or more memories configured to store the video data; and one or more processors, the one or more processors communicatively coupled to the one or more memories and configured to: determine a first search area in a first reference picture for a current block of the video data; determine a first initial reference block in the first search area; apply a first local illumination compensation (LIC) model to the first search area to generate a refined first search area; apply template matching to the refined first search area to determine a first candidate motion vector having a lowest template matching cost for the refined first search area; and decode the current block based on the first candidate motion vector.

In another example, a device includes: means for determining a first search area in a first reference picture for a current block of the video data; means for determining a first initial reference block in the first search area; means for applying a first local illumination compensation (LIC) model to the first search area to generate a refined first search area; means for applying template matching to the refined first search area to determine a first candidate motion vector having a lowest template matching cost for the refined first search area; and means for decoding the current block based on the first candidate motion vector.

In another example, computer-readable storage media is encoded with instructions that, when executed, cause one or more processors to determine a first search area in a first reference picture for a current block of the video data; determine a first initial reference block in the first search area; apply a first local illumination compensation (LIC) model to the first search area to generate a refined first search area; apply template matching to the refined first search area to determine a first candidate motion vector having a lowest template matching cost for the refined first search area; and decode the current block based on the first candidate motion vector.

The details of one or more examples are set forth in the accompanying drawings and the description below. Other features, objects, and advantages will be apparent from the description, drawings, and claims.

DETAILED DESCRIPTION

In some video coding standards and implementations, when performing bilateral matching decoder side motion refinement (BDMVR), a video coder may determine a final motion vector by minimizing bilateral matching (BM) cost between two candidate reference blocks in reference picture L0 and reference picture L1. The video coder may derive candidate reference blocks through bilinear interpolation using initial motion vectors of reference picture L0 and reference picture L1, respectively. The BM cost is defined as the difference between two candidate reference blocks, and this difference may be the sum of absolute difference (SAD), mean removed sum of absolute difference (MR-SAD), sum of absolute Hadamard transform difference (SATD), etc. A pair of candidate reference blocks may have a higher BM cost than another pair of candidate reference blocks due to for example, illuminance differences, high frequency noise, or the like. As such, in some cases, determining a refined motion vector (MV) by using BM cost is not accurate, and the resulting prediction signal which is derived from the BDMVR refined MV is not efficient for video compression. This may lead to less efficient coding and/or poorer quality decoded video. This disclosure describes techniques to improve the BDMVR search result by improving the prediction signal of reference search areas on reference picture L0 and L1 to address the above issues.

Figure 1:
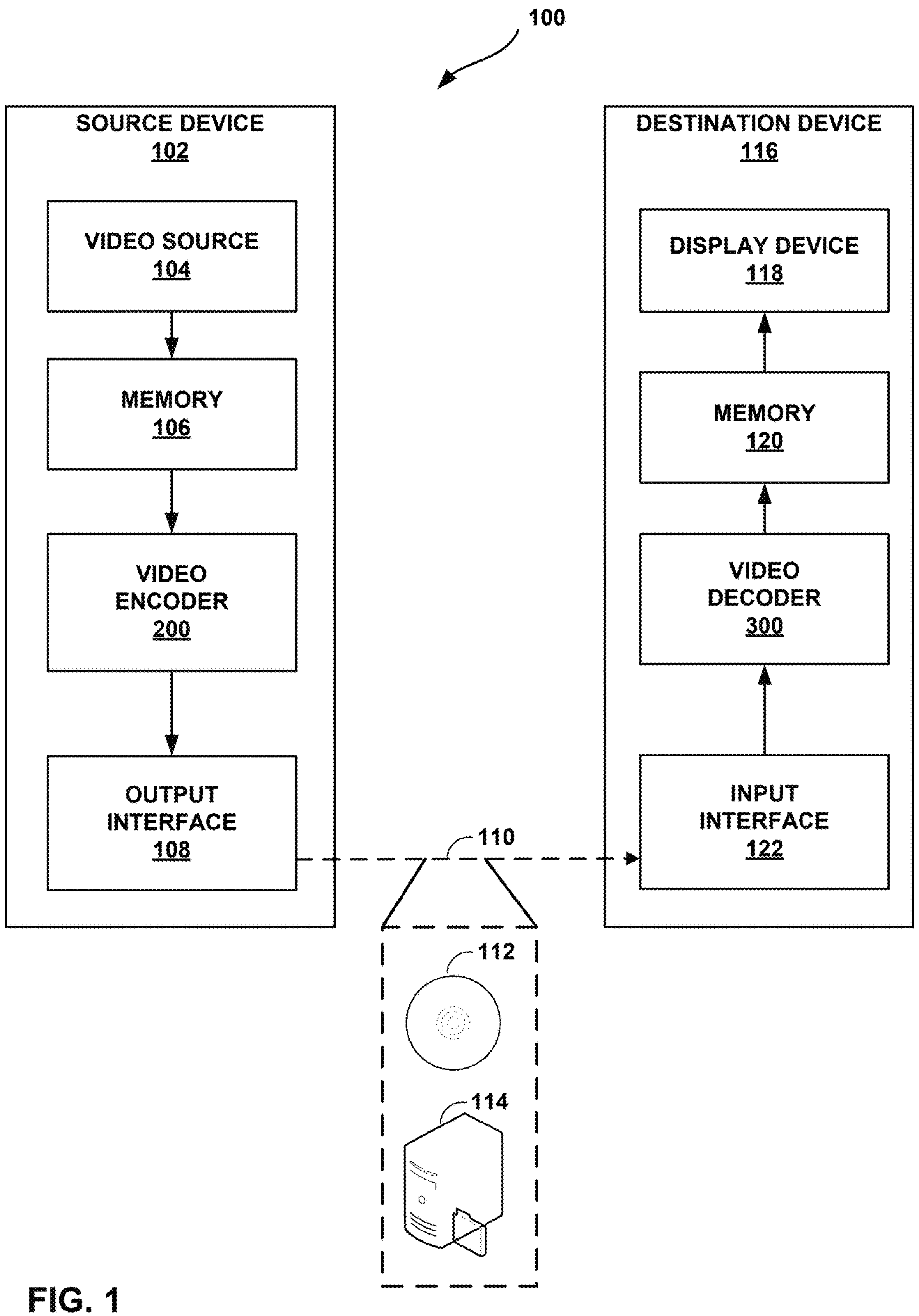
FIG. 1 is a block diagram illustrating an example video encoding and decoding system that may perform the techniques of this disclosure.

FIG. 1 is a block diagram illustrating an example video encoding and decoding system 100 that may perform the techniques of this disclosure. The techniques of this disclosure are generally directed to coding (encoding and/or decoding) video data. In general, video data includes any data for processing a video. Thus, video data may include raw, unencoded video, encoded video, decoded (e.g., reconstructed) video, and video metadata, such as signaling data.

As shown in FIG. 1, system 100 includes a source device 102 that provides encoded video data to be decoded and displayed by a destination device 116, in this example. In particular, source device 102 provides the video data to destination device 116 via a computer-readable medium 110. Source device 102 and destination device 116 may be or include any of a wide range of devices, such as desktop computers, notebook (i.e., laptop) computers, mobile devices, tablet computers, set-top boxes, telephone handsets such as smartphones, televisions, cameras, display devices, digital media players, video gaming consoles, video streaming device, broadcast receiver devices, or the like. In some cases, source device 102 and destination device 116 may be equipped for wireless communication, and thus may be referred to as wireless communication devices.

In the example of FIG. 1, source device 102 includes video source 104, memory 106, video encoder 200, and output interface 108. Destination device 116 includes input interface 122, video decoder 300, memory 120, and display device 118. In accordance with this disclosure, video encoder 200 of source device 102 and video decoder 300 of destination device 116 may be configured to apply the techniques for decoder-side motion vector derivation (e.g., template matching, bilateral matching, decoder-side MV refinement, bi-directional optical flow) and/or Local Illuminance Compensation (LIC). Thus, source device 102 represents an example of a video encoding device, while destination device 116 represents an example of a video decoding device. In other examples, a source device and a destination device may include other components or arrangements. For example, source device 102 may receive video data from an external video source, such as an external camera. Likewise, destination device 116 may interface with an external display device, rather than include an integrated display device.

System 100 as shown in FIG. 1 is merely one example. In general, any digital video encoding and/or decoding device may perform techniques for decoder-side motion vector derivation and/or LIC. Source device 102 and destination device 116 are merely examples of such coding devices in which source device 102 generates coded video data for transmission to destination device 116. This disclosure refers to a "coding" device as a device that performs coding (encoding and/or decoding) of data. Thus, video encoder 200 and video decoder 300 represent examples of coding devices, in particular, a video encoder and a video decoder, respectively. In some examples, source device 102 and destination device 116 may operate in a substantially symmetrical manner such that each of source device 102 and destination device 116 includes video encoding and decoding components. Hence, system 100 may support one-way or two-way video transmission between source device 102 and destination device 116, e.g., for video streaming, video playback, video broadcasting, or video telephony.

In general, video source 104 represents a source of video data (i.e., raw, unencoded video data) and provides a sequential series of pictures (also referred to as "frames") of the video data to video encoder 200, which encodes data for the pictures. Video source 104 of source device 102 may include a video capture device, such as a video camera, a video archive containing previously captured raw video, and/or a video feed interface to receive video from a video content provider. As a further alternative, video source 104 may generate computer graphics-based data as the source video, or a combination of live video, archived video, and computer-generated video. In each case, video encoder 200 encodes the captured, pre-captured, or computer-generated video data. Video encoder 200 may rearrange the pictures from the received order (sometimes referred to as "display order") into a coding order for coding. Video encoder 200 may generate a bitstream including encoded video data. Source device 102 may then output the encoded video data via output interface 108 onto computer-readable medium 110 for reception and/or retrieval by, e.g., input interface 122 of destination device 116.

Memory 106 of source device 102 and memory 120 of destination device 116 represent general purpose memories. In some examples, memories 106, 120 may store raw video data, e.g., raw video from video source 104 and raw, decoded video data from video decoder 300. Additionally or alternatively, memories 106, 120 may store software instructions executable by, e.g., video encoder 200 and video decoder 300, respectively. Although memory 106 and memory 120 are shown separately from video encoder 200 and video decoder 300 in this example, it should be understood that video encoder 200 and video decoder 300 may also include internal memories for functionally similar or equivalent purposes. Furthermore, memories 106, 120 may store encoded video data, e.g., output from video encoder 200 and input to video decoder 300. In some examples, portions of memories 106, 120 may be allocated as one or more video buffers, e.g., to store raw, decoded, and/or encoded video data.

Computer-readable medium 110 may represent any type of medium or device capable of transporting the encoded video data from source device 102 to destination device 116. In one example, computer-readable medium 110 represents a communication medium to enable source device 102 to transmit encoded video data directly to destination device 116 in real-time, e.g., via a radio frequency network or computer-based network. Output interface 108 may modulate a transmission signal including the encoded video data, and input interface 122 may demodulate the received transmission signal, according to a communication standard, such as a wireless communication protocol. The communication medium may include any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 102 to destination device 116.

In some examples, source device 102 may output encoded data from output interface 108 to storage device 112. Similarly, destination device 116 may access encoded data from storage device 112 via input interface 122. Storage device 112 may include any of a variety of distributed or locally accessed data storage media such as a hard drive, Blu-ray discs, DVDs, CD-ROMs, flash memory, volatile or non-volatile memory, or any other suitable digital storage media for storing encoded video data.

In some examples, source device 102 may output encoded video data to file server 114 or another intermediate storage device that may store the encoded video data generated by source device 102. Destination device 116 may access stored video data from file server 114 via streaming or download.

File server 114 may be any type of server device capable of storing encoded video data and transmitting that encoded video data to the destination device 116. File server 114 may represent a web server (e.g., for a website), a server configured to provide a file transfer protocol service (such as File Transfer Protocol (FTP) or File Delivery over Unidirectional Transport (FLUTE) protocol), a content delivery network (CDN) device, a hypertext transfer protocol (HTTP) server, a Multimedia Broadcast Multicast Service (MBMS) or Enhanced MBMS (eMBMS) server, and/or a network attached storage (NAS) device. File server 114 may, additionally or alternatively, implement one or more HTTP streaming protocols, such as Dynamic Adaptive Streaming over HTTP (DASH), HTTP Live Streaming (HLS), Real Time Streaming Protocol (RTSP), HTTP Dynamic Streaming, or the like.

Destination device 116 may access encoded video data from file server 114 through any standard data connection, including an Internet connection. This may include a wireless channel (e.g., a Wi-Fi connection), a wired connection (e.g., digital subscriber line (DSL), cable modem, etc.), or a combination of both that is suitable for accessing encoded video data stored on file server 114. Input interface 122 may be configured to operate according to any one or more of the various protocols discussed above for retrieving or receiving media data from file server 114, or other such protocols for retrieving media data.

Output interface 108 and input interface 122 may represent wireless transmitters/receivers, modems, wired networking components (e.g., Ethernet cards), wireless communication components that operate according to any of a variety of IEEE 802.11 standards, or other physical components. In examples where output interface 108 and input interface 122 include wireless components, output interface 108 and input interface 122 may be configured to transfer data, such as encoded video data, according to a cellular communication standard, such as 4G, 4G-LTE (Long-Term Evolution), LTE Advanced, 5G, or the like. In some examples where output interface 108 includes a wireless transmitter, output interface 108 and input interface 122 may be configured to transfer data, such as encoded video data, according to other wireless standards, such as an IEEE 802.11 specification, an IEEE 802.15 specification (e.g., ZigBee™), a Bluetooth™ standard, or the like. In some examples, source device 102 and/or destination device 116 may include respective system-on-a-chip (SoC) devices. For example, source device 102 may include an SoC device to perform the functionality attributed to video encoder 200 and/or output interface 108, and destination device 116 may include an SoC device to perform the functionality attributed to video decoder 300 and/or input interface 122.

The techniques of this disclosure may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications.

Input interface 122 of destination device 116 receives an encoded video bitstream from computer-readable medium 110 (e.g., a communication medium, storage device 112, file server 114, or the like). The encoded video bitstream may include signaling information defined by video encoder 200, which is also used by video decoder 300, such as syntax elements having values that describe characteristics and/or processing of video blocks or other coded units (e.g., slices, pictures, groups of pictures, sequences, or the like). Display device 118 displays decoded pictures of the decoded video data to a user. Display device 118 may represent any of a variety of display devices such as a liquid crystal display (LCD), a plasma display, an organic light emitting diode (OLED) display, or another type of display device.

Although not shown in FIG. 1, in some examples, video encoder 200 and video decoder 300 may each be integrated with an audio encoder and/or audio decoder (e.g., audio codec), and may include appropriate MUX-DEMUX units, or other hardware and/or software, to handle multiplexed streams including both audio and video in a common data stream. Example audio codecs may include AAC, AC-3, AC-4, ALAC, ALS, AMBE, AMR, AMR-WB (G.722.2), AMR-WB+, aptx (various versions), ATRAC, BroadVoice (BV16, BV32), CELT, Enhanced AC-3 (E-AC-3), EVS, FLAC, G.711, G.722, G.722.1, G.722.2 (AMR-WB). G.723.1, G.726, G.728, G.729, G.729.1, GSM-FR, HE-AAC, ILBC, iSAC, LA Lyra, Monkey's Audio, MP1, MP2 (MPEG-1, 2 Audio Layer II), MP3, Musepack, Nellymoser Asao, OptimFROG, Opus, Sac, Satin, SBC, SILK, Siren 7, Speex, SVOPC, True Audio (TTA), TwinVQ, USAC, Vorbis (Ogg), WavPack, and Windows Media Aud.

Video encoder 200 and video decoder 300 each may be implemented as any of a variety of suitable encoder and/or decoder circuitry that includes a processing system, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 200 and video decoder 300 may be included in one or more encoders or decoders, either of which may be integrated as part of a combined encoder/decoder (CODEC) in a respective device. A device including video encoder 200 and/or video decoder 300 may implement video encoder 200 and/or video decoder 300 in processing circuitry such as an integrated circuit and/or a microprocessor. Such a device may be a wireless communication device, such as a cellular telephone, or any other type of device described herein.

Video encoder 200 and video decoder 300 may operate according to a video coding standard, such as ITU-T H.265, also referred to as High Efficiency Video Coding (HEVC) or extensions thereto, such as the multi-view and/or scalable video coding extensions. Alternatively, video encoder 200 and video decoder 300 may operate according to other proprietary or industry standards, such as ITU-T H.266, also referred to as Versatile Video Coding (VVC). In other examples, video encoder 200 and video decoder 300 may operate according to a proprietary video codec/format, such as AOMedia Video 1 (AV1), extensions of AV1, and/or successor versions of AV1 (e.g., AV2). In other examples, video encoder 200 and video decoder 300 may operate according to other proprietary formats or industry standards. The techniques of this disclosure, however, are not limited to any particular coding standard or format. In general, video encoder 200 and video decoder 300 may be configured to perform the techniques of this disclosure in conjunction with any video coding techniques that use decoder-side motion vector derivation and/or LIC).

In general, video encoder 200 and video decoder 300 may perform block-based coding of pictures. The term "block" generally refers to a structure including data to be processed (e.g., encoded, decoded, or otherwise used in the encoding and/or decoding process). For example, a block may include a two-dimensional matrix of samples of luminance and/or chrominance data. In general, video encoder 200 and video decoder 300 may code video data represented in a YUV (e.g., Y, Cb, Cr) format. That is, rather than coding red, green, and blue (RGB) data for samples of a picture, video encoder 200 and video decoder 300 may code luminance and chrominance components, where the chrominance components may include both red hue and blue hue chrominance components. In some examples, video encoder 200 converts received RGB formatted data to a YUV representation prior to encoding, and video decoder 300 converts the YUV representation to the RGB format. Alternatively, pre- and post-processing units (not shown) may perform these conversions.

This disclosure may generally refer to coding (e.g., encoding and decoding) of pictures to include the process of encoding or decoding data of the picture. Similarly, this disclosure may refer to coding of blocks of a picture to include the process of encoding or decoding data for the blocks, e.g., prediction and/or residual coding. An encoded video bitstream generally includes a series of values for syntax elements representative of coding decisions (e.g., coding modes) and partitioning of pictures into blocks. Thus, references to coding a picture or a block should generally be understood as coding values for syntax elements forming the picture or block.

HEVC defines various blocks, including coding units (CUs), prediction units (PUs), and transform units (TUs). According to HEVC, a video coder (such as video encoder 200) partitions a coding tree unit (CTU) into CUs according to a quadtree structure. That is, the video coder partitions CTUs and CUs into four equal, non-overlapping squares, and each node of the quadtree has either zero or four child nodes. Nodes without child nodes may be referred to as "leaf nodes," and CUs of such leaf nodes may include one or more PUs and/or one or more TUs. The video coder may further partition PUs and TUs. For example, in HEVC, a residual quadtree (RQT) represents partitioning of TUs. In HEVC, PUs represent inter-prediction data, while TUs represent residual data. CUs that are intra-predicted include intra-prediction information, such as an intra-mode indication.

As another example, video encoder 200 and video decoder 300 may be configured to operate according to VVC. According to VVC, a video coder (such as video encoder 200) partitions a picture into a plurality of CTUs. Video encoder 200 may partition a CTU according to a tree structure, such as a quadtree-binary tree (QTBT) structure or Multi-Type Tree (MTT) structure. The QTBT structure removes the concepts of multiple partition types, such as the separation between CUs, PUs, and TUs of HEVC. A QTBT structure includes two levels: a first level partitioned according to quadtree partitioning, and a second level partitioned according to binary tree partitioning. A root node of the QTBT structure corresponds to a CTU. Leaf nodes of the binary trees correspond to CUs.

In an MTT partitioning structure, blocks may be partitioned using a quadtree (QT) partition, a binary tree (BT)

partition, and one or more types of triple tree (TT) (also called ternary tree (TT)) partitions. A triple or ternary tree partition is a partition where a block is split into three sub-blocks. In some examples, a triple or ternary tree partition divides a block into three sub-blocks without dividing the original block through the center. The partitioning types in MTT (e.g., QT, BT, and TT), may be symmetrical or asymmetrical.

When operating according to the AV1 codec, video encoder 200 and video decoder 300 may be configured to code video data in blocks. In AV1, the largest coding block that can be processed is called a superblock. In AV1, a superblock can be either 128×128 luma samples or 64×64 luma samples. However, in successor video coding formats (e.g., AV2), a superblock may be defined by different (e.g., larger) luma sample sizes. In some examples, a superblock is the top level of a block quadtree. Video encoder 200 may further partition a superblock into smaller coding blocks. Video encoder 200 may partition a superblock and other coding blocks into smaller blocks using square or non-square partitioning. Non-square blocks may include N/2×N, N×N/2, N/4×N, and N×N/4 blocks. Video encoder 200 and video decoder 300 may perform separate prediction and transform processes on each of the coding blocks.

AV1 also defines a tile of video data. A tile is a rectangular array of superblocks that may be coded independently of other tiles. That is, video encoder 200 and video decoder 300 may encode and decode, respectively, coding blocks within a tile without using video data from other tiles. However, video encoder 200 and video decoder 300 may perform filtering across tile boundaries. Tiles may be uniform or non-uniform in size. Tile-based coding may enable parallel processing and/or multi-threading for encoder and decoder implementations.

In some examples, video encoder 200 and video decoder 300 may use a single QTBT or MTT structure to represent each of the luminance and chrominance components, while in other examples, video encoder 200 and video decoder 300 may use two or more QTBT or MTT structures, such as one QTBT/MTT structure for the luminance component and another QTBT/MTT structure for both chrominance components (or two QTBT/MTT structures for respective chrominance components).

Video encoder 200 and video decoder 300 may be configured to use quadtree partitioning, QTBT partitioning, MTT partitioning, superblock partitioning, or other partitioning structures.

In some examples, a CTU includes a coding tree block (CTB) of luma samples, two corresponding CTBs of chroma samples of a picture that has three sample arrays, or a CTB of samples of a monochrome picture or a picture that is coded using three separate color planes and syntax structures used to code the samples. A CTB may be an N×N block of samples for some value of N such that the division of a component into CTBs is a partitioning. A component is an array or single sample from one of the three arrays (luma and two chroma) that compose a picture in 4:2:0, 4:2:2, or 4:4:4 color format or the array or a single sample of the array that compose a picture in monochrome format. In some examples, a coding block is an M×N block of samples for some values of M and N such that a division of a CTB into coding blocks is a partitioning.

The blocks (e.g., CTUs or CUS) may be grouped in various ways in a picture. As one example, a brick may refer to a rectangular region of CTU rows within a particular tile in a picture. A tile may be a rectangular region of CTUs within a particular tile column and a particular tile row in a picture. A tile column refers to a rectangular region of CTUs having a height equal to the height of the picture and a width specified by syntax elements (e.g., such as in a picture parameter set). A tile row refers to a rectangular region of CTUS having a height specified by syntax elements (e.g., such as in a picture parameter set) and a width equal to the width of the picture.

In some examples, a tile may be partitioned into multiple bricks, each of which may include one or more CTU rows within the tile. A tile that is not partitioned into multiple bricks may also be referred to as a brick. However, a brick that is a true subset of a tile may not be referred to as a tile. The bricks in a picture may also be arranged in a slice. A slice may be an integer number of bricks of a picture that may be exclusively contained in a single network abstraction layer (NAL) unit. In some examples, a slice includes either a number of complete tiles or only a consecutive sequence of complete bricks of one tile.

This disclosure may use "N×N" and "N by N" interchangeably to refer to the sample dimensions of a block (such as a CU or other video block) in terms of vertical and horizontal dimensions, e.g., 16×16 samples or 16 by 16 samples. In general, a 16×16 CU will have 16 samples in a vertical direction (y=16) and 16 samples in a horizontal direction (x=16). Likewise, an N×N CU generally has N samples in a vertical direction and N samples in a horizontal direction, where N represents a nonnegative integer value. The samples in a CU may be arranged in rows and columns. Moreover, CUs need not necessarily have the same number of samples in the horizontal direction as in the vertical direction. For example, CUs may include N×M samples, where M is not necessarily equal to N.

Video encoder 200 encodes video data for CUs representing prediction and/or residual information, and other information. The prediction information indicates how the CU is to be predicted in order to form a prediction block for the CU. The residual information generally represents sample-by-sample differences between samples of the CU prior to encoding and the prediction block.

To predict a CU, video encoder 200 may generally form a prediction block for the CU through inter-prediction or intra-prediction. Inter-prediction generally refers to predicting the CU from data of a previously coded picture, whereas intra-prediction generally refers to predicting the CU from previously coded data of the same picture. To perform inter-prediction, video encoder 200 may generate the prediction block using one or more motion vectors. Video encoder 200 may generally perform a motion search to identify a reference block that closely matches the CU, e.g., in terms of differences between the CU and the reference block. Video encoder 200 may calculate a difference metric using a sum of absolute difference (SAD), sum of squared differences (SSD), mean absolute difference (MAD), mean squared differences (MSD), or other such difference calculations to determine whether a reference block closely matches the current CU. In some examples, video encoder 200 may predict the current CU using uni-directional prediction or bi-directional prediction.

Some examples of VVC also provide an affine motion compensation mode, which may be considered an inter-prediction mode. In affine motion compensation mode, video encoder 200 may determine two or more motion vectors that represent non-translational motion, such as zoom in or out, rotation, perspective motion, or other irregular motion types.

To perform intra-prediction, video encoder 200 may select an intra-prediction mode to generate the prediction block. Some examples of VVC provide sixty-seven intra-prediction modes, including various directional modes, as well as planar mode and DC mode. In general, video encoder 200 selects an intra-prediction mode that describes neighboring samples to a current block (e.g., a block of a CU) from which to predict samples of the current block. Such samples may generally be above, above and to the left, or to the left of the current block in the same picture as the current block, assuming video encoder 200 codes CTUs and CUs in raster scan order (left to right, top to bottom).

Video encoder 200 encodes data representing the prediction mode for a current block. For example, for inter-prediction modes, video encoder 200 may encode data representing which of the various available inter-prediction modes is used, as well as motion information for the corresponding mode. For uni-directional or bi-directional inter-prediction, for example, video encoder 200 may encode motion vectors using advanced motion vector prediction (AMVP) or merge mode. Video encoder 200 may use similar modes to encode motion vectors for affine motion compensation mode.

AV1 includes two general techniques for encoding and decoding a coding block of video data. The two general techniques are intra prediction (e.g., intra frame prediction or spatial prediction) and inter prediction (e.g., inter frame prediction or temporal prediction). In the context of AV1, when predicting blocks of a current frame of video data using an intra prediction mode, video encoder 200 and video decoder 300 do not use video data from other frames of video data. For most intra prediction modes, video encoder 200 encodes blocks of a current frame based on the difference between sample values in the current block and predicted values generated from reference samples in the same frame. Video encoder 200 determines predicted values generated from the reference samples based on the intra prediction mode.

Following prediction, such as intra-prediction or inter-prediction of a block, video encoder 200 may calculate residual data for the block. The residual data, such as a residual block, represents sample by sample differences between the block and a prediction block for the block, formed using the corresponding prediction mode. Video encoder 200 may apply one or more transforms to the residual block, to produce transformed data in a transform domain instead of the sample domain. For example, video encoder 200 may apply a discrete cosine transform (DCT), an integer transform, a wavelet transform, or a conceptually similar transform to residual video data. Additionally, video encoder 200 may apply a secondary transform following the first transform, such as a mode-dependent non-separable secondary transform (MDNSST), a signal dependent transform, a Karhunen-Loeve transform (KLT), or the like. Video encoder 200 produces transform coefficients following application of the one or more transforms.

As noted above, following any transforms to produce transform coefficients, video encoder 200 may perform quantization of the transform coefficients. Quantization generally refers to a process in which transform coefficients are quantized to possibly reduce the amount of data used to represent the transform coefficients, providing further compression. By performing the quantization process, video encoder 200 may reduce the bit depth associated with some or all of the transform coefficients. For example, video encoder 200 may round an n-bit value down to an m-bit value during quantization, where n is greater than m. In some examples, to perform quantization, video encoder 200 may perform a bitwise right-shift of the value to be quantized.

Following quantization, video encoder 200 may scan the transform coefficients, producing a one-dimensional vector from the two-dimensional matrix including the quantized transform coefficients. The scan may be designed to place higher energy (and therefore lower frequency) transform coefficients at the front of the vector and to place lower energy (and therefore higher frequency) transform coefficients at the back of the vector. In some examples, video encoder 200 may utilize a predefined scan order to scan the quantized transform coefficients to produce a serialized vector, and then entropy encode the quantized transform coefficients of the vector. In other examples, video encoder 200 may perform an adaptive scan. After scanning the quantized transform coefficients to form the one-dimensional vector, video encoder 200 may entropy encode the one-dimensional vector, e.g., according to context-adaptive binary arithmetic coding (CABAC). Video encoder 200 may also entropy encode values for syntax elements describing metadata associated with the encoded video data for use by video decoder 300 in decoding the video data.

To perform CABAC, video encoder 200 may assign a context within a context model to a symbol to be transmitted. The context may relate to, for example, whether neighboring values of the symbol are zero-valued or not. The probability determination may be based on a context assigned to the symbol.

Video encoder 200 may further generate syntax data, such as block-based syntax data, picture-based syntax data, and sequence-based syntax data, to video decoder 300, e.g., in a picture header, a block header, a slice header, or other syntax data, such as a sequence parameter set (SPS), picture parameter set (PPS), or video parameter set (VPS). Video decoder 300 may likewise decode such syntax data to determine how to decode corresponding video data.

In this manner, video encoder 200 may generate a bitstream including encoded video data, e.g., syntax elements describing partitioning of a picture into blocks (e.g., CUs) and prediction and/or residual information for the blocks. Ultimately, video decoder 300 may receive the bitstream and decode the encoded video data.

In general, video decoder 300 performs a reciprocal process to that performed by video encoder 200 to decode the encoded video data of the bitstream. For example, video decoder 300 may decode values for syntax elements of the bitstream using CABAC in a manner substantially similar to, albeit reciprocal to, the CABAC encoding process of video encoder 200. The syntax elements may define partitioning information for partitioning of a picture into CTUs, and partitioning of each CTU according to a corresponding partition structure, such as a QTBT structure, to define CUs of the CTU. The syntax elements may further define prediction and residual information for blocks (e.g., CUs) of video data.

The residual information may be represented by, for example, quantized transform coefficients. Video decoder 300 may inverse quantize and inverse transform the quantized transform coefficients of a block to reproduce a residual block for the block. Video decoder 300 uses a signaled prediction mode (intra- or inter-prediction) and related prediction information (e.g., motion information for inter-prediction) to form a prediction block for the block. Video decoder 300 may then combine the prediction block and the residual block (on a sample-by-sample basis) to reproduce the original block. Video decoder 300 may perform additional processing, such as performing a deblocking process to reduce visual artifacts along boundaries of the block.

This disclosure may generally refer to "signaling" certain information, such as syntax elements. The term "signaling" may generally refer to the communication of values for syntax elements and/or other data used to decode encoded video data. That is, video encoder 200 may signal values for syntax elements in the bitstream. In general, signaling refers to generating a value in the bitstream. As noted above, source device 102 may transport the bitstream to destination device 116 substantially in real time, or not in real time, such as might occur when storing syntax elements to storage device 112 for later retrieval by destination device 116.

In accordance with the techniques of this disclosure, a method of coding video data includes: determining a first search area in a first reference picture for a current block of the video data; determining a first initial reference block in the first search area; applying a first local illumination compensation (LIC) model to the first search area to generate a refined first search area; applying template matching to the refined first search area to determine a first candidate motion vector having a lowest template matching cost for the refined first search area; and decoding the current block based on the first candidate motion vector.

This disclosure is related to the decoder-side motion vector derivation techniques (e.g., template matching, bilateral matching, decoder-side MV refinement, bi-directional optical flow) and/or LIC. The techniques of this disclosure may be applied to any of the existing video codecs, such as HEVC (High Efficiency Video Coding), VVC (Versatile Video Coding), Essential Video Coding (EVC) or be an efficient coding tool in any future video coding standards. In this section, HEVC and JEM techniques and on-going works in Versatile Video Coding (VVC) related to this disclosure are firstly reviewed.

Video coding standards include ITU-T H.261, ISO/IEC MPEG-1 Visual, ITU-T H.262 or ISO/IEC MPEG-2 Visual, ITU-T H.263, ISO/IEC MPEG-4 Visual and ITU-T H.264 (also known as ISO/IEC MPEG-4 AVC), including its Scalable Video Coding (SVC) and Multi-view Video Coding (MVC) extensions.

In addition, a new video coding standard, namely High Efficiency Video Coding (HEVC) or ITU-T H.265, including its range extension, multiview extension (MV-HEVC) and scalable extension (SHVC), has recently been developed by the Joint Collaboration Team on Video Coding (JCT-VC) as well as Joint Collaboration Team on 3D Video Coding Extension Development (JCT-3V) of ITU-T Video Coding Experts Group (VCEG) and ISO/IEC Motion Picture Experts Group (MPEG).

The latest HEVC draft specification, and referred to as HEVC WD hereinafter, is available from phenix.int-evry.fr/jct/doc_end_user/documents/14_Vienna/wg11/JCTVC-N1003-v1.zip.

ITU-T VCEG (Q6/16) and ISO/IEC MPEG (JTC 1/SC 29/WG 11) are now studying the potential need for standardization of future video coding technology with a compression capability that significantly exceeds that of the current HEVC standard (including its current extensions and near-term extensions for screen content coding and high-dynamic-range coding). The groups are working together on this exploration activity in a joint collaboration effort known as the Joint Video Exploration Team (JVET) to evaluate compression technology designs proposed by their experts in this area. The latest version of reference software, i.e., VVC Test Model 10 (VTM 10.0) could be downloaded from: vcgit.hhi.fraunhofer.de/jvet/VVCSoftware_VTM The Versatile Video Coding (VVC) draft specification could be referred to JVET-T2001.

Algorithm description of Versatile Video Coding and Test Model 10 (VTM 10.0) could be referred to JVET-T2002.

CU Structure and Motion Vector Prediction in HEVC is now discussed. In HEVC, the largest coding unit in a slice is called a coding tree block (CTB) or coding tree unit (CTU). A CTB contains a quad-tree the nodes of which are coding units.

The size of a CTB can range from 16×16 to 64×64 in the HEVC main profile (although technically 8×8 CTB sizes can be supported). A coding unit (CU) could be the same size of a CTB to as small as 8×8. Each coding unit is coded with one mode, e.g., inter or intra. When a CU is inter coded, it may be further partitioned into 2 or 4 prediction units (PUs) or become just one PU when further partitioning does not apply. When two PUs are present in one CU, they can be half size rectangles or two rectangle size with ¼ or ¾ size of the CU.

When the CU is inter coded, each PU has one set of motion information, which is derived with a unique inter prediction mode.

Motion Vector Prediction is now discussed. In HEVC standard, there are two inter prediction modes, named merge (skip is considered as a special case of merge) and advanced motion vector prediction (AMVP) modes respectively for a prediction unit (PU).

In either AMVP or merge mode, a motion vector (MV) candidate list is maintained for multiple motion vector predictors. The motion vector(s), as well as reference indices in the merge mode, of the current PU are generated by taking one candidate from the MV candidate list.

The MV candidate list contains up to 5 candidates for the merge mode and only two candidates for the AMVP mode. A merge candidate may contain a set of motion information, e.g., motion vectors corresponding to both reference picture lists (list 0 and list 1) and the reference indices. If a merge candidate is identified by a merge index, the reference pictures used for the prediction of the current blocks, as well as the associated motion vectors are determined. On the other hand, under AMVP mode for each potential prediction direction from either list 0 or list 1, a reference index needs to be explicitly signaled, together with an MV predictor (MVP) index to the MV candidate list since the AMVP candidate contains only a motion vector. In AMVP mode, the predicted motion vectors can be further refined.

The candidates for both modes are derived similarly from the same spatial and temporal neighboring blocks.

Figure 2B:
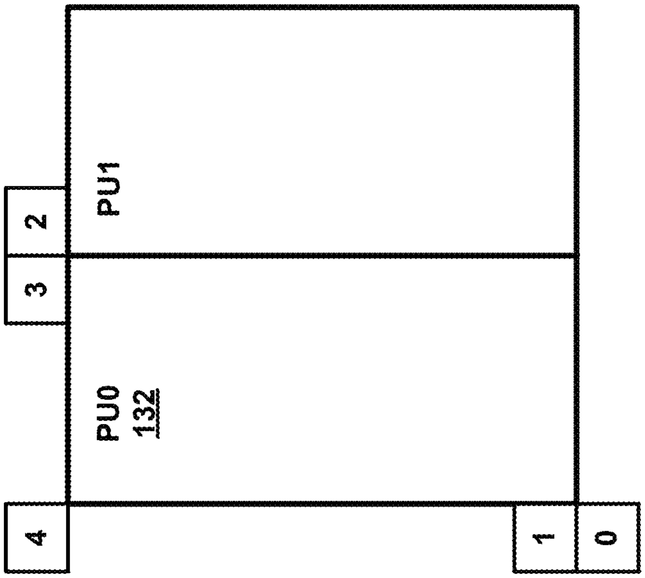
FIGS. 2A-2B are conceptual diagrams illustrating example spatial neighboring motion vector (MV) candidates for merge and AMVP modes.
Figure 2A:
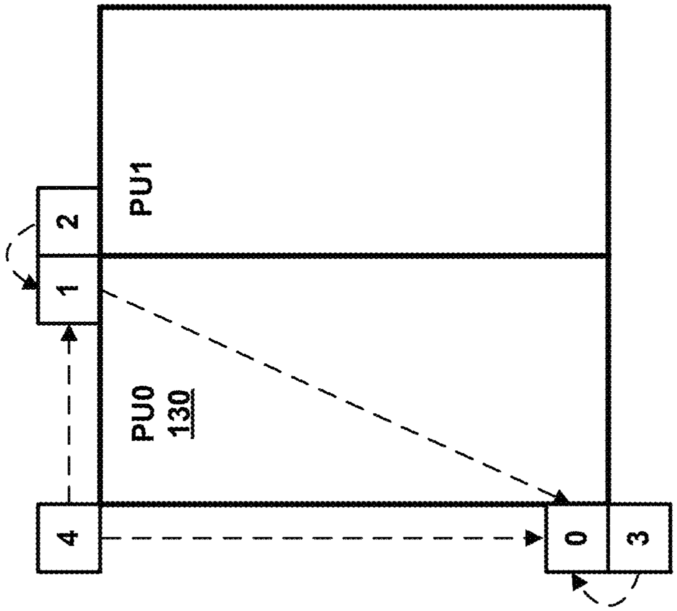

Spatial Neighboring Candidates are now discussed. FIGS. 2A-2B are conceptual diagrams illustrating example spatial neighboring MV candidates for merge and AMVP modes. For example, video encoder 200 or video decoder 300 may derive spatial MV candidates from neighboring blocks shown in FIGS. 2A-2B, for a specific PU (PUO), although the techniques video encoder 200 or video decoder 300 may use to generate the candidates from the blocks differ for merge and AMVP modes.

In merge mode, up to four spatial MV candidates for PUO 130 can be derived with the orders shown in FIG. 2A as follows: left (0, A1), above (1, B1), above right (2, B0), below left (3, A0), and above left (4, B2).

In AMVP mode, the neighboring blocks of PUO 132 are divided into two groups: left group including block 0 and 1, and above group including blocks 2, 3, and 4 as shown on FIG. 2B. For each group, the potential candidate in a neighboring block that refers to the same reference picture as that indicated by the signaled reference index has the highest priority to be chosen to form a final candidate of the group for POU 132. It is possible that all neighboring blocks do not contain a motion vector pointing to the same reference picture. Therefore, if such a candidate cannot be found, the first available candidate will be scaled to form the final candidate, thus the temporal distance differences can be compensated. For example, video encoder 200 or video decoder 300 may select the first available candidate and scale that first available candidate to form a final candidate to compensate for temporal distance differences.

Temporal Motion Vector Prediction in HEVC is now discussed. Temporal motion vector predictor (TMVP) candidate, if enabled and available, is added into the MV candidate list after spatial motion vector candidates. The process of motion vector derivation for TMVP candidate is the same for both merge and AMVP modes, however the target reference index for the TMVP candidate in the merge mode may always be set to 0.

Figure 3B:
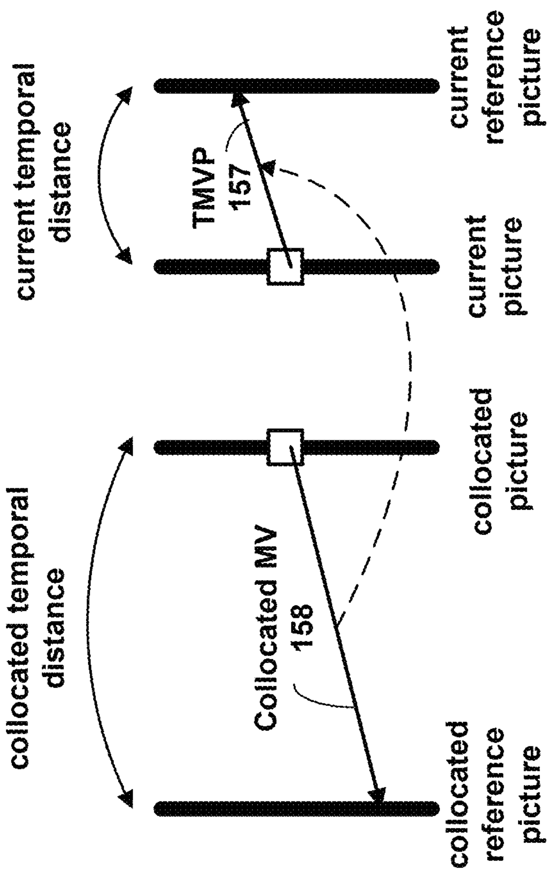
FIG. 3B shows an example motion vector scaling process.
Figure 3A:
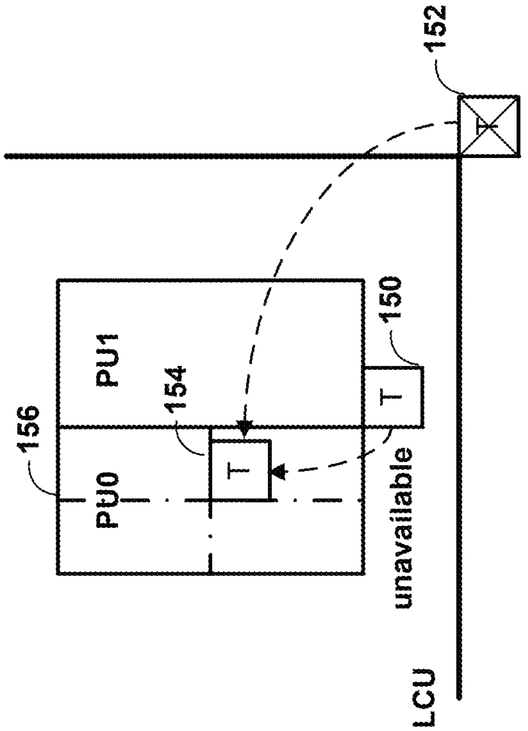
FIG. 3A shows an example temporal motion vector predictor (TMVP) candidate for a block.

FIG. 3A is a conceptual diagram illustrating an example of a temporal motion vector predictor. FIG. 3A shows example TMVP candidates for block 156 (PUO) and FIG. 3B shows a motion vector scaling process. The primary block location for TMVP candidate derivation is the bottom right block outside of the collocated PU. This candidate is shown in FIG. 3A as a block "T" 154. The location of block T 154 is used to compensate the bias to the above and left blocks used to generate spatial neighboring candidates. However, if that block is located outside of the current CTB row (shown as block T 152), or motion information is not available (shown as block T 150), the block is substituted with a center block of the PU.

FIG. 3B is a conceptual diagram illustrating an example of motion vector scaling. Similar to temporal direct mode in AVC, to derive the TMVP candidate motion vector, the co-located MV may be scaled to compensate the temporal distance differences, as shown in FIG. 3B. Video encoder 200 and video decoder 300 may derive a motion vector for the TMVP candidate from the co-located PU of the co-located picture, indicated in the slice level. The motion vector for the co-located PU is called a collocated MV. Similar to temporal direct mode in AVC, to derive TMVP candidate motion vector 157, co-located MV 158 may be scaled to compensate the temporal distance differences, as shown in FIG. 3B.

Other Aspects of Motion Prediction in HEVC are now discussed. Several aspects of merge and AMVP modes are worth mentioning as follows.

Motion vector scaling: It is assumed that the value of motion vectors is proportional to the distance of pictures in the presentation time. A motion vector associates two pictures, the reference picture, and the picture containing the motion vector (namely the containing picture). When a motion vector is utilized to predict the other motion vector, the distance of the containing picture and the reference picture is calculated based on the Picture Order Count (POC) values.

For a motion vector to be predicted, both its associated containing picture and reference picture may be different. Therefore, a new distance (based on POC) is calculated. And the motion vector is scaled based on these two POC distances. For a spatial neighboring candidate, the containing pictures for the two motion vectors are the same, while the reference pictures are different. In HEVC, motion vector scaling applies to both TMVP and AMVP for spatial and temporal neighboring candidates.

Artificial motion vector candidate generation: If a motion vector candidate list is not complete, artificial motion vector candidates may be generated and inserted at the end of the list until the list includes all candidates.

In merge mode, there are two types of artificial MV candidates: combined candidate derived only for B-slices and zero candidates used only for AMVP if the first type does not provide enough artificial candidates.

For each pair of candidates that are already in the candidate list and have necessary motion information, bi-directional combined motion vector candidates may be derived by a combination of the motion vector of the first candidate referring to a picture in the list 0 and the motion vector of a second candidate referring to a picture in the list 1.

Pruning process for candidate insertion: Candidates from different blocks may happen to be the same, which decreases the efficiency of a merge/AMVP candidate list. A pruning process may be applied to solve this problem. The pruning process compares one candidate against the others in the current candidate list to avoid inserting identical candidate in certain extent. To reduce the complexity, only limited numbers of pruning process is applied instead of comparing each potential one with all the other existing ones.

Template Matching Prediction is now discussed. Template matching (TM) prediction is a special merge mode based on Frame-Rate Up Conversion (FRUC) techniques. With this mode, motion information of a block is not signaled but is derived at decoder side. TM may be applied to both AMVP mode and regular merge mode. In AMVP mode, MVP candidate selection is determined based on template matching to select the candidate which reaches the minimal difference between current block template and reference block template. In regular merge mode, a TM mode flag is signaled to indicate the use of TM and then TM is applied to the merge candidate indicated by merge index for MV refinement.

Figure 4:
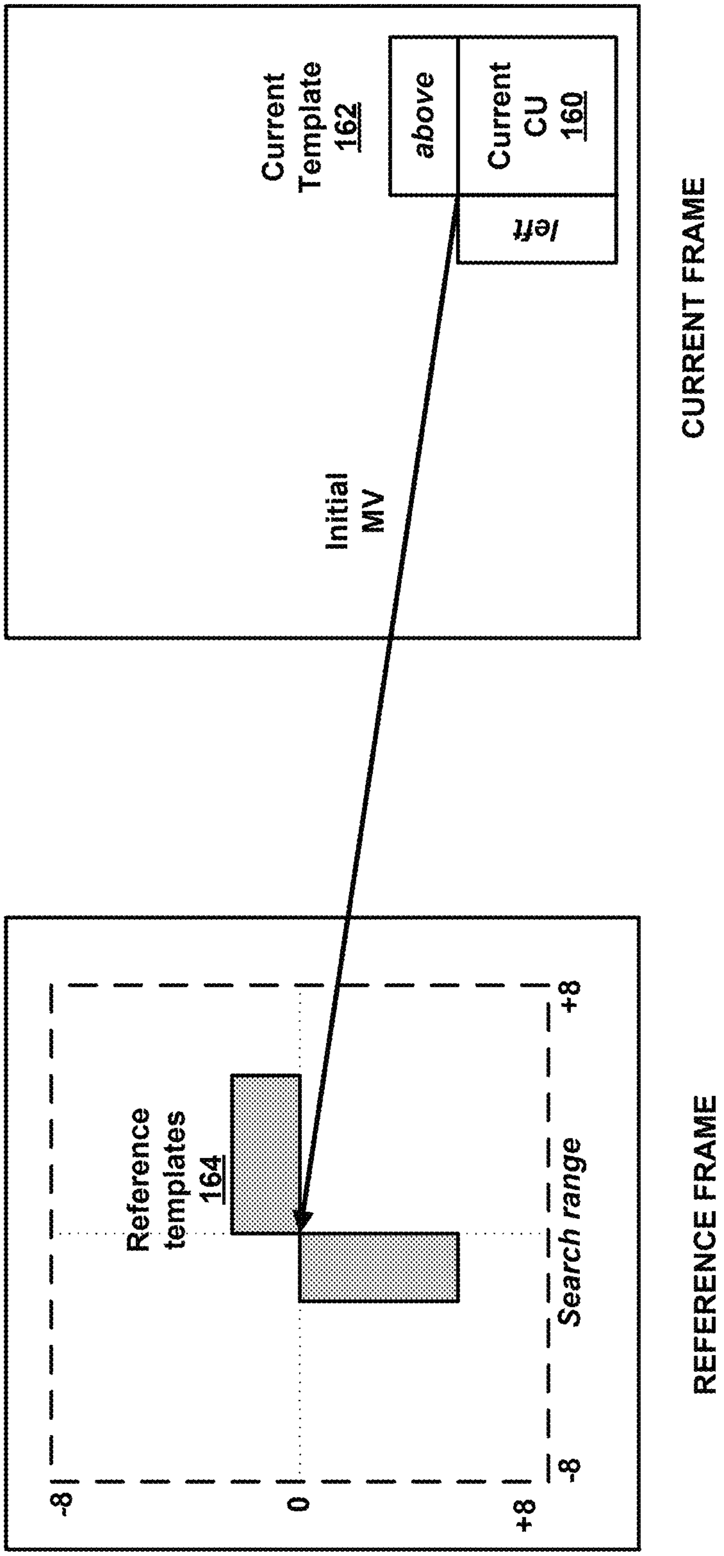
FIG. 4 is a conceptual diagram illustrating example template matching on a search area around an initial MV.

As shown in FIG. 4, template matching is used to derive motion information of current CU 160 by finding the closest match between a current template 162 in the current picture and a reference template 164, which may be the same size as current template 162, in a reference picture. Both current template 162 and reference template 164 may include respective above and left portions, as shown. With an AMVP candidate selected based on initial matching error, video encoder 200 and video decoder 300 may refine the MVP using template matching. With a merge candidate indicated by signaled merge index, video encoder 200 and video decoder 300 may be configured to refine MVs corresponding to L0 and L1 independently by template matching and then further refine the less accurate MV based on the more accurate MV.

Video encoder 200 and video decoder 300 may be configured to implement a cost function. When a motion vector points to a fractional sample position, motion compensated interpolation is needed. To reduce complexity, bi-linear interpolation instead of regular 8-tap DCT-IF interpolation is used for both template matching to generate templates on reference pictures. The matching cost C of template matching is calculated as follows:

$$C = SAD + w\cdot\left(\left|MV_x - MV_x^s\right| + \left|MV_y - MV_y^s\right|\right)$$

where w is a weighting factor which is empirically set to 4, MV and $MV^s$ indicate the currently testing MV and the initial MV (i.e., a MVP candidate in AMVP mode or merged motion in merge mode), respectively. SAD is used as the matching cost of template matching.

When TM is used, motion is refined by using luma samples only. The derived motion will be used for both luma and chroma for MC inter prediction. After MV is decided, final MC is performed using 8-taps interpolation filter for luma and 4-taps interpolation filter for chroma.

Video encoder 200 and video decoder 300 may be configured to implement a search process. MV refinement is a pattern based MV search with the criterion of template matching cost. Two search patterns are supported-a diamond search and a cross search for MV refinement. The MV is directly searched at quarter luma sample MVD accuracy with diamond pattern, followed by quarter luma sample MVD accuracy with cross pattern, and then this is followed by one-eighth luma sample MVD refinement with cross pattern. The search range of MV refinement is set equal to (−8, +8) luma samples around the initial MV.

Bilateral Matching Prediction is now discussed. Video encoder 200 and video decoder 300 may be configured to perform bilateral matching prediction. Bilateral Matching (also known as Bilateral Merge) (BM) prediction is another merge mode base on Frame-Rate Up Conversion (FRUC) techniques. When applying BM mode to a block, video encoder 200 and video decoder 300 may derive two initial motion vectors MV0 and MV1 using a signaled merge candidate index to select the merge candidate in a constructed merge list. When implementing bilateral matching, video encoder 200 and video decoder 300 search around the MV0 and MV1 and derive the final MV0' and MV1' based on a minimum bilateral matching cost.

Figure 5:
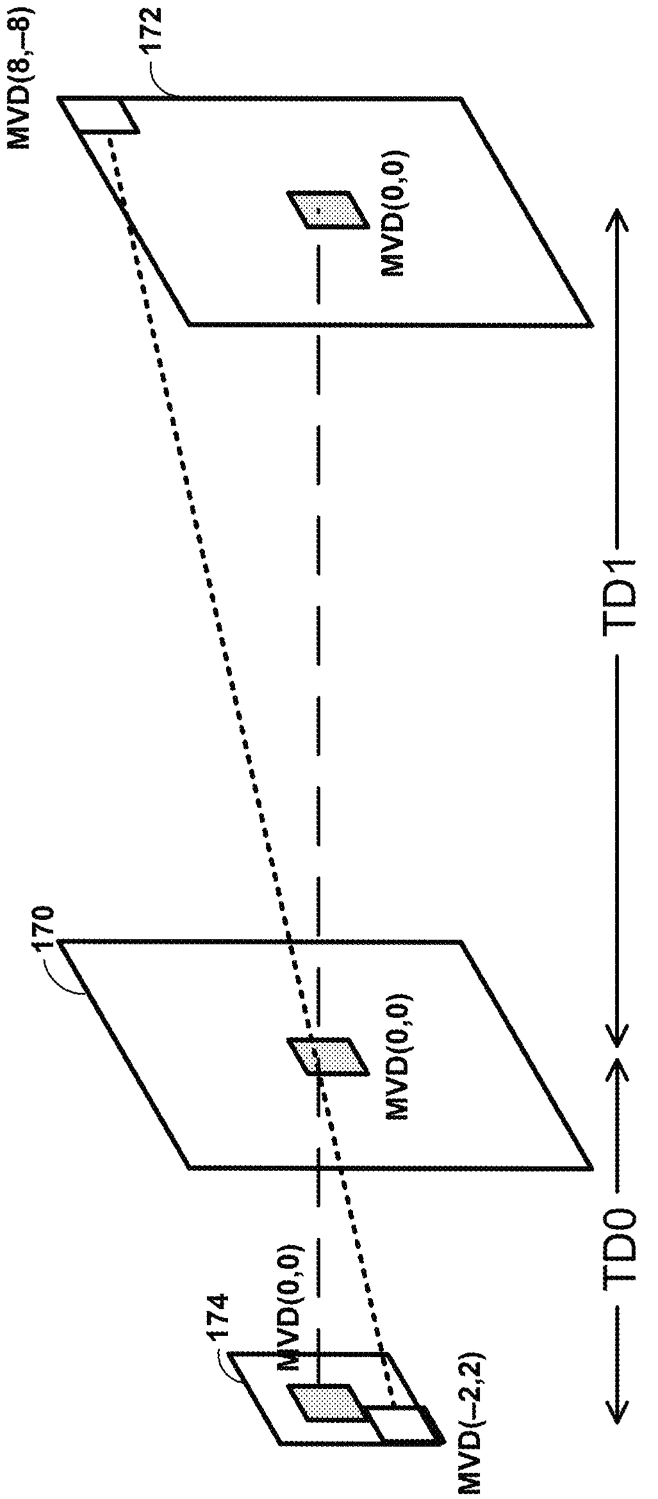
FIG. 5 is a conceptual diagram illustrating an example of MVD0 and MVD1 proportionally based on temporal distances.

The motion vector difference (MVD) MVD0 (denoted by MV0'-MV0) and MVD1 (denoted by MV1'−MV1) pointing to the two reference blocks may be proportional to the temporal distances (TD), e.g., TD0 and TD1, between the current picture and the two reference pictures. FIG. 5 shows an example of MVD0 and MVD1 where the distance (TD1) between current picture 170 and reference picture 172 is 4-times the distance (TD0) between current picture 170 and reference picture 174. FIG. 5 shows an example of MVD0 and MVD1 being proportional based on the temporal distances.

Figure 6:
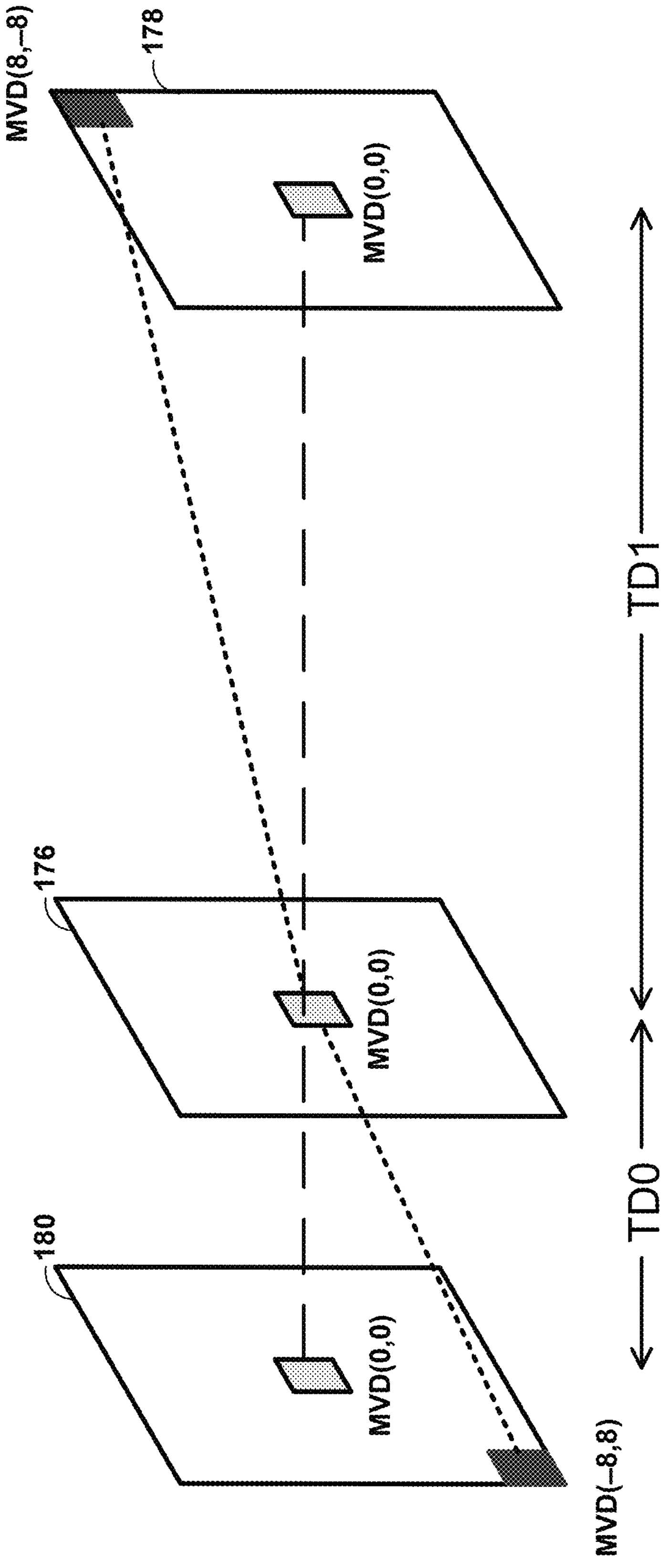
FIG. 6 is a conceptual diagram illustrating an example of MVD0 and MVD1 mirrored regardless of the temporal distances.

However, there is an optional design where MVD0 and MVD1 are mirrored regardless of the temporal distances TD0 and TD1. FIG. 6 shows an example of MVD0 and MVD1 being mirrored regardless of the temporal distance (TD1) between current picture 176 and reference picture 178 and the temporal distance (TD0) between current picture 176 and reference picture 180. FIG. 6 shows an example of mirrored MVD0 and MVD1, where TD1 is 4-times of TD0.

Figure 7:
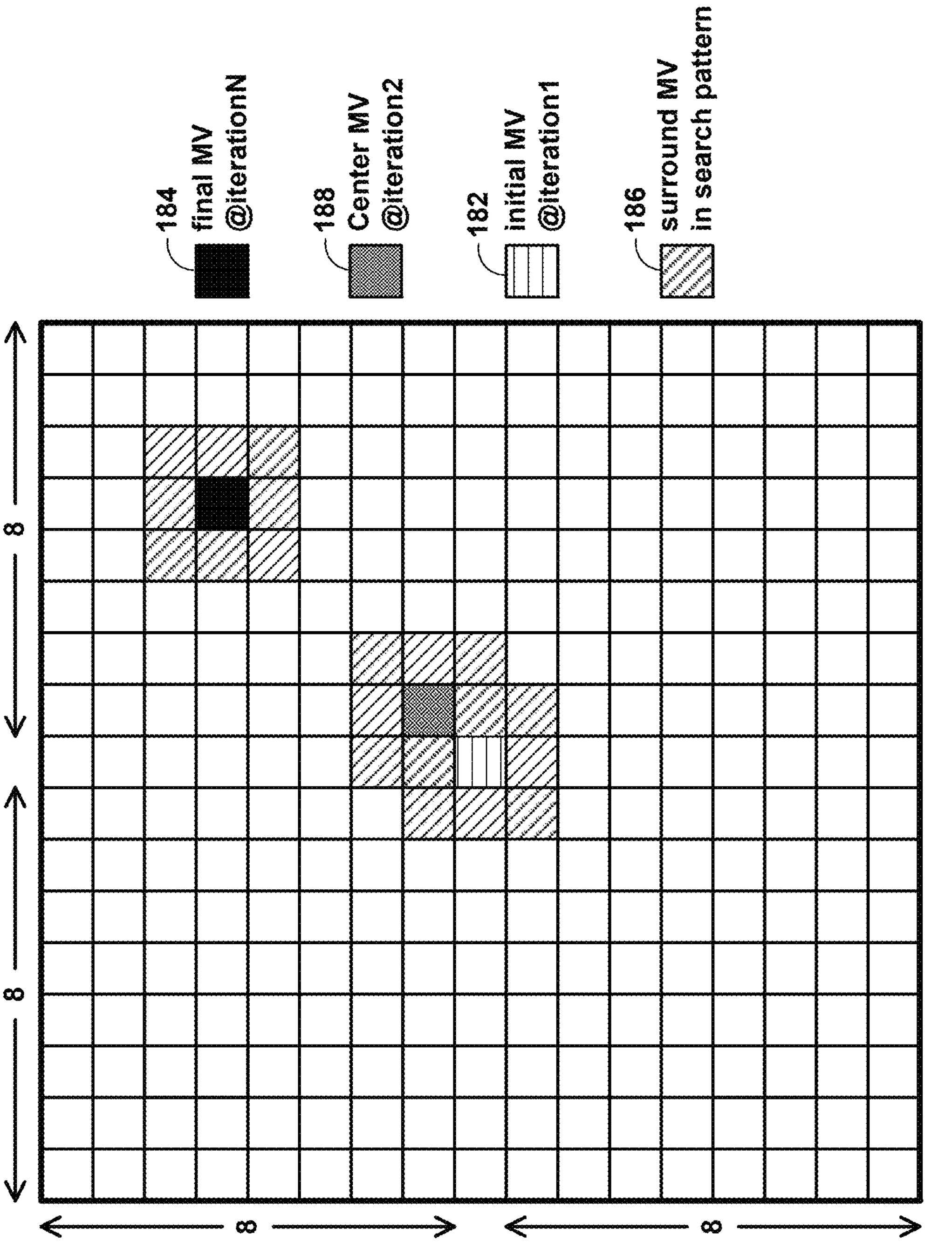
FIG. 7 is a conceptual diagram illustrating an example of the 3×3 square search pattern in the search range [−8, 8].

FIG. 7 shows an example of 3×3 square search patterns in the search range [−8, 8] for implementing bilateral matching. When implementing bilateral matching, video encoder 200 and video decoder 300 may be configured to perform a local search around the initial MV0 and MV1 to derive the final MV0' and MV1'. In the example of FIG. 7, the initial MV points to sample 182, and the final MV points to sample 184. The local search applies a 3×3 square search pattern to loop through the search range [−8, 8]. Samples 186 represent examples of samples in the search range around samples 182, 184, and sample 188. Sample 188 represents an example of a sample corresponding to a MV determined during an intermediate iteration of the search process. In each search iteration, the bilateral matching cost of the eight surrounding MVs in the search pattern are calculated and compared to the bilateral matching cost of center MV. The MV which has minimum bilateral matching cost becomes the new center MV in the next search iteration. The local search is terminated when the current center MV has a minimum cost within the 3×3 square search pattern or the local search reaches the pre-defined maximum search iteration.

Figure 8:
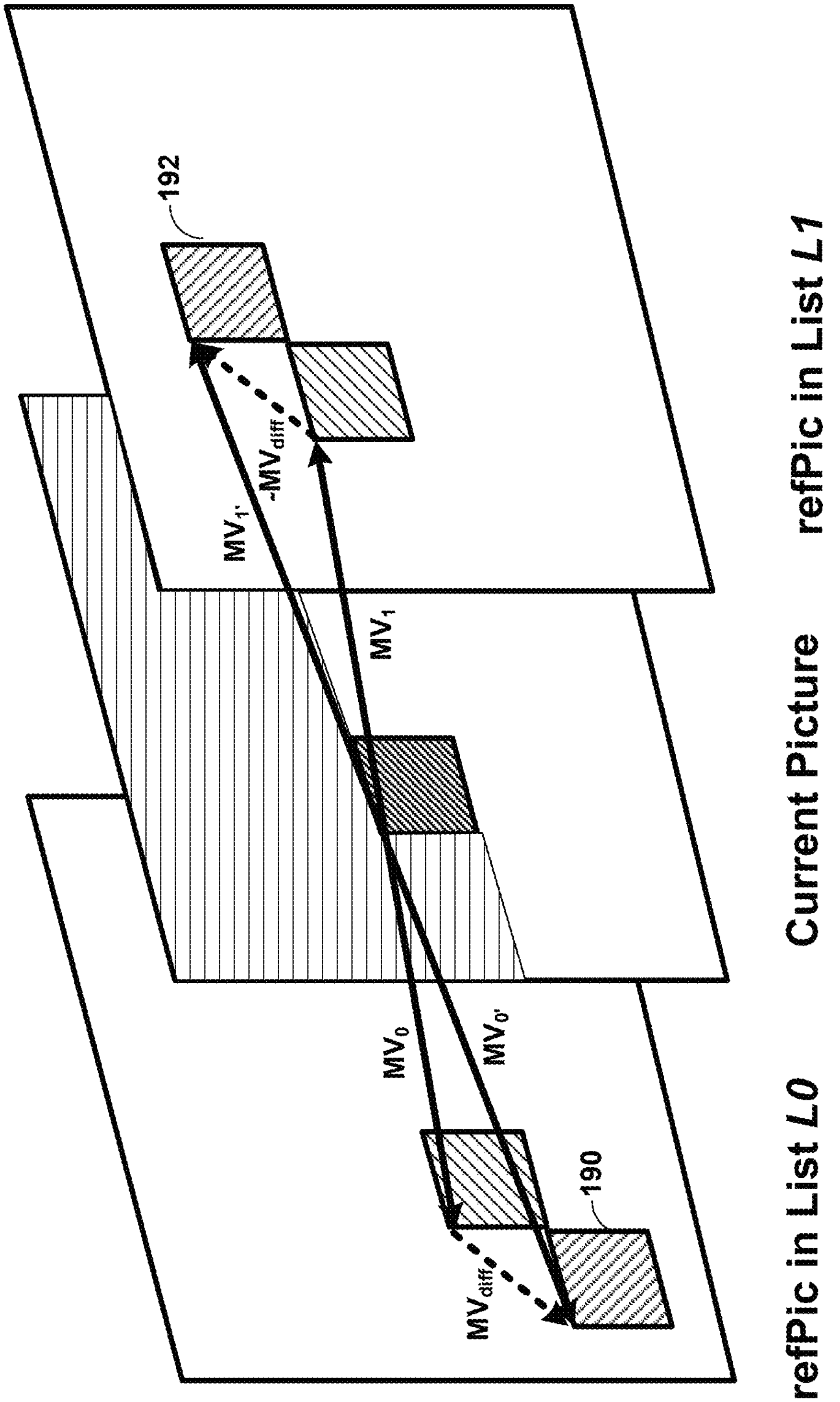
FIG. 8 is a conceptual diagram illustrating example decoder side motion vector refinement techniques.

Decoder-side Motion Vector Refinement is now discussed. To increase the accuracy of the MVs of the merge mode, a decoder side motion vector refinement (DMVR) is applied in VVC. In a bi-prediction operation, a refined MV is searched around the initial MVs in the reference picture list L0 and reference picture list L1. The DMVR method calculates the distortion between the two candidate blocks in the reference picture list L0 and list L1. As illustrated in FIG. 8, the SAD between blocks 190 and 192 based on each MV candidate around the initial MV is calculated. The MV candidate with the lowest SAD becomes the refined MV and used to generate the bi-predicted signal.

The refined MV derived by DMVR process is used to generate the inter prediction samples and also used in temporal motion vector prediction for future pictures coding. While the original MV is used in deblocking process and also used in spatial motion vector prediction for future CU coding.

DMVR is a sub-block based merge mode with a predefined maximum processing unit of 16×16 luma samples. When the width and/or height of a CU are larger than 16 luma samples, it will be further split into subblocks with width and/or height equal to 16 luma samples.

Searching scheme is now discussed. In DMVR, the search points are surrounding the initial MV and the MV offset by the MV difference mirroring rule. In other words, any points that are checked by DMVR, denoted by candidate MV pair (MV0, MV1) follow the two equations:

$$MV0' = MV0 + \text{MV\_offset}$$

$$MV1' = MV1 - \text{MV\_offset}$$

Where MV_offset represents the refinement offset between the initial MV and the refined MV in one of the reference pictures. The refinement search range is two integer luma samples from the initial MV. The searching includes the integer sample offset search stage and fractional sample refinement stage.

25 points full search is applied for integer sample offset searching. The SAD of the initial MV pair is first calculated. If the SAD of the initial MV pair is smaller than a threshold, the integer sample stage of DMVR is terminated. Otherwise SADs of the remaining 24 points are calculated and checked in raster scanning order. The point with the smallest SAD is selected as the output of integer sample offset searching stage. To reduce the penalty of the uncertainty of DMVR refinement, the original MV may be favored during the DMVR process. The SAD between the reference blocks referred by the initial MV candidates is decreased by ¼ of the SAD value.

The integer sample search is followed by fractional sample refinement. To save on calculational complexity, the fractional sample refinement is derived by using parametric error surface equation, instead of additional search with SAD comparison. The fractional sample refinement is conditionally invoked based on the output of the integer sample search stage. When the integer sample search stage is terminated with center having the smallest SAD in either the first iteration or the second iteration search, the fractional sample refinement is further applied.

In parametric error surface based sub-pixel offsets estimation, the center position cost and the costs at four neighboring positions from the center are used to fit a 2-D parabolic error surface equation of the following form $$E(x, y) = A(x - x_{min})^2 + B(y - y_{min})^2 + C$$

where $(x_{min}, y_{min})$ corresponds to the fractional position with the least cost and C corresponds to the minimum cost value. By solving the above equations by using the cost value of the five search points, the $(x_{min}, y_{min})$ is computed as:

$$x_{min} = (E(-1, 0) - E(1, 0))/(2(E(-1, 0) + E(1, 0) - 2E(0, 0)))$$

$$y_{min} = (E(0, -1) - E(0, 1))/(2((E(0, -1) + E(0, 1) - 2E(0, 0)))$$

The value of $x_{min}$ and $y_{min}$ are automatically constrained to be between −8 and 8 since all cost values are positive and the smallest value is E(0,0). This corresponds to half peal offset with 1/16th-pel MV accuracy in VVC. The computed fractional $(x_{min}, y_{min})$ are added to the integer distance refinement MV to get the sub-pixel accurate refinement delta MV.

Bilinear-interpolation and sample padding is now discussed. In VVC, the resolution of the MVs is 1/16 luma samples. The samples at the fractional position are interpolated using an 8-tap interpolation filter. In DMVR, the search points are surrounding the initial fractional-pel MV with integer sample offset, therefore the samples of those fractional position need to be interpolated for DMVR search process. To reduce the calculation complexity, the bi-linear interpolation filter is used to generate the fractional samples for the searching process in DMVR. Another important effect of using the bi-linear filter is that with a 2-sample search range, the DMVR does not access more reference samples compared to the normal motion compensation process. After the refined MV is attained with DMVR search process, the normal 8-tap interpolation filter is applied to generate the final prediction. In order to not access more reference samples to normal MC process, the samples, which is not needed for the interpolation process based on the original MV but is needed for the interpolation process based on the refined MV, will be padded from those available samples.

Enabling condition is DMVR is now discussed. DMVR is enabled if the following conditions are all satisfied: 1) CU level merge mode with bi-prediction MV; 2) One reference picture is in the past and another reference picture is in the future with respect to the current picture; 3) The distances (i.e. POC difference) from both reference pictures to the current picture are same; 4) CU has more than 64 luma samples; 5) Both CU height and CU width are larger than or equal to 8 luma samples; 6) bi-prediction with CU-based weighting (BCW) weight index indicates equal weight; 7) weighted prediction (WP) is not enabled for the current block; and 8) combined intra-inter prediction (CIIP) mode is not used for the current block.

Multi-pass decoder-side motion vector refinement in Enhanced Compression Model (ECM) is now discussed. A multi-pass decoder-side motion vector refinement may be applied. In the first pass, bilateral matching (BM) is applied to the coding block. In the second pass, BM is applied to each 16×16 subblock within the coding block. In the third pass, MV in each 8×8 subblock is refined by applying bi-directional optical flow (BDOF). The refined MVs are stored for both spatial and temporal motion vector prediction.

First pass—Block based bilateral matching MV refinement is now discussed. In the first pass, a refined MV is derived by applying BM to a coding block. Similar to decoder-side motion vector refinement (DMVR), in bi-prediction operation, a refined MV is searched around the two initial MVs (MV0 and MV1) in the reference picture lists L0 and L1. The refined MVs (MV0_pass1 and MV1_pass1) are derived around the initial MVs based on the minimum bilateral matching cost between the two reference blocks in L0 and L1.

A video coder implementing BM performs local search to derive integer sample precision intDeltaMV. The local search applies a 3×3 square search pattern to loop through the search range [−sHor, sHor] in horizontal direction and [−sVer, sVer] in vertical direction, wherein, the values of sHor and sVer are determined by the block dimension, and the maximum value of sHor and sVer is 8.

The bilateral matching cost may be calculated as: bilCost=mvDistanceCost+sadCost. When the block size cbW*cbH is greater than 64, mean reduced sum of average difference (MRSAD) cost function is applied to remove the DC effect of distortion between reference blocks. When the bilCost at the center point of the 3×3 search pattern has the minimum cost, the intDeltaMV local search is terminated. Otherwise, the current minimum cost search point becomes the new center point of the 3×3 search pattern and continue to search for the minimum cost, until it reaches the end of the search range.

The existing fractional sample refinement is further applied to derive the final deltaMV. The refined MVs after the first pass is then derived as:

$$\text{MV0\_pass1} = MV0 + deltaMV$$

$$\text{MV1\_pass1} = MV1 - deltaMV$$

Second pass—Subblock based bilateral matching MV refinement is now discussed. In the second pass, a refined MV is derived by applying BM to a 16×16 grid subblock. For each subblock, a refined MV is searched around the two MVs (MV0_pass1 and MV1_pass1), obtained on the first pass, in the reference picture list L0 and L1. The refined MVs (MV0_pass2 (sbIdx2) and MV1_pass2 (sbIdx2)) are derived based on the minimum bilateral matching cost between the two reference subblocks in L0 and L1.

For each subblock, a video coder implementing BM performs full search to derive integer sample precision intDeltaMV. The full search has a search range [−sHor, sHor] in horizontal direction and [−sVer, sVer] in vertical direction, wherein, the values of sHor and sVer are determined by the block dimension, and the maximum value of sHor and sVer is 8.

Figure 9:
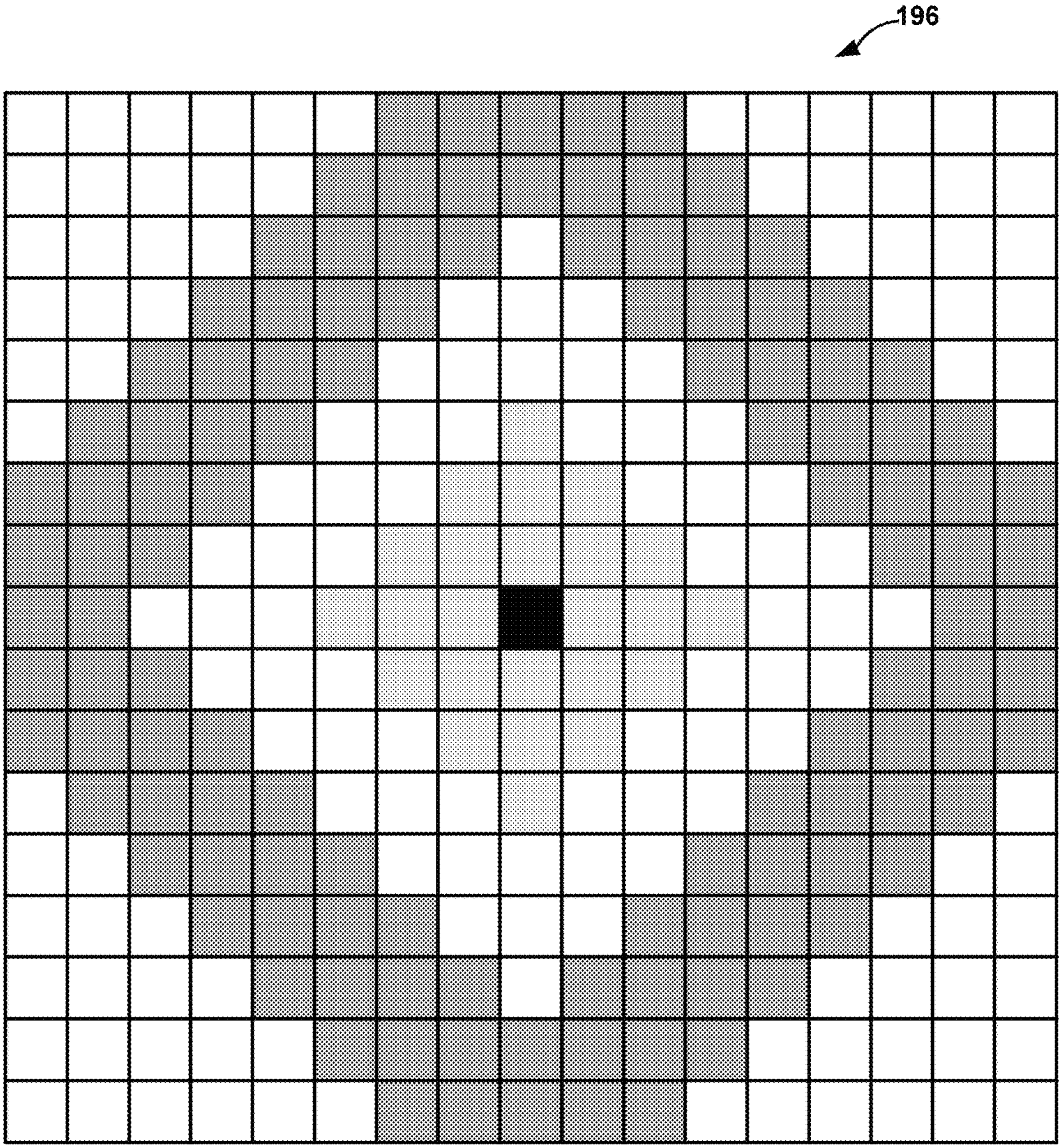
FIG. 9 is a conceptual diagram illustrating example diamond regions in a search area.

FIG. 9 is a conceptual diagram illustrating example diamond regions in a search area. The bilateral matching cost is calculated by applying a cost factor to the SATD cost between two reference subblocks, as: bilCost=satdCost*costFactor. The search area (2*sHor+1)*(2*sVer+1) is divided up to 5 diamond shape search regions in search area 196 as shown on FIG. 9. Each search region is assigned a costFactor, which is determined by the distance (intDeltaMV) between each search point and the starting MV, and each diamond region is processed in the order starting from the center of the search area. In each region, the search points are processed in the raster scan order starting from the top left going to the bottom right corner of the region. When the minimum bilCost within the current search region is less than a threshold equal to sbW*sbH, the int-pel full search is terminated, otherwise, the int-pel full search continues to the next search region until all search points are examined.

The existing VVC DMVR fractional sample refinement is further applied to derive the final deltaMV (sbIdx2). The refined MVs at second pass is then derived as:

$$\mathrm{MV0\_pass2}(sbIdx2) = \mathrm{MV0\_pass1} + deltaMV(sbIdx2)$$

$$\mathrm{MV1\_pass2}(sbIdx2) = \mathrm{MV1\_pass1} - deltaMV(sbIdx2)$$

Third pass—Subblock based bi-directional optical flow MV refinement is now discussed. In the third pass, a refined MV is derived by applying BDOF to an 8×8 grid subblock. For each 8×8 subblock, BDOF refinement is applied to derive scaled Vx and Vy without clipping starting from the refined MV of the parent subblock of the second pass. The derived bioMv (Vx, Vy) is rounded to 1/16 sample precision and clipped between −32 and 32.

The refined MVs (MV0_pass3 (sbIdx3) and MV1_pass3 (sbIdx3)) at third pass may be derived as:

$$\mathrm{MV0\_pass3}(sbIdx3) = \mathrm{MV0\_pass2}(sbIdx2) + bioMv$$

$$\mathrm{MV1\_pass3}(sbIdx3) = \mathrm{MV0\_pass2}(sbIdx2) - bioMv$$

Regular Merge+Affine Merge+set BCW default+LIC weight+LIC BDOF are now discussed. An affine motion model can be described as $$\begin{cases} v_x = ax + by + e \\ v_y = cx + dy + f \end{cases}$$

wherein $(v_x, v_y)$ is the motion vector at the coordinate (x, y), and a, b, c, d, e, and f are the six affine parameters. We will refer to this affine motion model as 6-parameters affine motion model. In a typical video coder, a picture is partitioned into blocks for block-based coding. The affine motion model for a block can also be described by the 3 motion vectors (MVs) $\vec{v}=(v_{ox}, v_{oy})$, $\vec{v}_1=(v_{1x}, v_{1y})$, and $\vec{v}_2=(v_{2x}, v_{2y})$ at 3 different locations that are not in the same line. The 3 locations are usually referred to as control-points, the 3 motion vectors are referred to as control-point motion vectors (CPMVs). In the case when the 3 control-points are at the 3 corners of the block, the affine motion can be described as $$\begin{cases} v_x = \dfrac{(v_{1x} - v_{0x})}{blkW}x + \dfrac{(v_{2x} - v_{0x})}{blkH}y + v_{0x} \\ v_y = \dfrac{(v_{1y} - v_{0y})}{blkW}x + \dfrac{(v_{2y} - v_{0y})}{blkH}y + v_{0y} \end{cases}$$

wherein blkW and blkH are the width and height of the block.

In affine mode, different motion vectors can be derived for each pixel in the block according to the associate affine motion model. Therefore, motion compensation can be performed in pixel-by-pixel. However, to reduce the complexity, subblock based motion compensation is usually adopted, wherein the block is partitioned into multiple subblocks (that have smaller block size) and each subblock is associate with one motion vector for block-based motion compensation. The motion vector for each subblock is derived using the representative coordinate of the subblock. Typically, the center position is used. In one example, the block is partitioned into non-overlapping subblocks. The block width is blkW, block height is blkH, the subblock width is sbW and subblock height is sbH, then there's blkH/sbH rows of subblocks and blkW/sbW subblocks in each row. For a six-parameter affine motion model, the motion vector for the subblock (referred to as subblock MV) at $i_{th}$ row (0<=i<blkW/sbW) and $j_{th}$ (0<=j<blkH/sbH) column is derived as $$\begin{cases} v_x = \dfrac{(v_{1x} - v_{0x})}{blkW}\left(j*sbW + \dfrac{sbW}{2}\right) + \dfrac{(v_{2x} - v_{0x})}{blkH}\left(i*sbH + \dfrac{sbH}{2}\right) + v_{0x} \\ v_y = \dfrac{(v_{1y} - v_{0y})}{blkW}\left(j*sbW + \dfrac{sbW}{2}\right) + \dfrac{(v_{2y} - v_{0y})}{blkH}\left(i*sbH + \dfrac{sbH}{2}\right) + v_{0y} \end{cases}$$

The subblock MVs are rounded to the predefined precision and stored in the motion buffer for motion compensation and motion vector prediction.

A simplified 4-parameters affine model (for zoom and rotational motion) is described as $$\begin{cases} v_x = ax - by + e \\ v_y = bx + ay + f \end{cases}$$

Similarly, the 4-parameters affine model for a block can be described by 2 CPMVs $\vec{v}_0=(v_{0x}, v_{0y})$ and $\vec{v}_1=(v_{1x}, v_{1y})$ at the 2 corners (typically top-left and top-right) of the block. The motion field is then described as $$\begin{cases} v_x = \dfrac{(v_{1x} - v_{0x})}{blkW}x - \dfrac{(v_{1y} - v_{0y})}{blkW}y + v_{0x} \\ v_y = \dfrac{(v_{1y} - v_{0y})}{blkW}x + \dfrac{(v_{1x} - v_{0x})}{blkW}y + v_{0y} \end{cases}$$

The subblock MV at $i_{th}$ row and $j_{th}$ column is derived as $$\begin{cases} v_x = \dfrac{(v_{1x} - v_{0x})}{blkW}\left(j*sbW + \dfrac{sbW}{2}\right) - \dfrac{(v_{1y} - v_{0y})}{blkW}\left(i*sbH + \dfrac{sbH}{2}\right) + v_{0x} \\ v_y = \dfrac{(v_{1y} - v_{0y})}{blkW}\left(j*sbW + \dfrac{sbW}{2}\right) + \dfrac{(v_{1x} - v_{0x})}{blkW}\left(i*sbH + \dfrac{sbH}{2}\right) + v_{0y} \end{cases}$$

Prediction refinement for affine mode is now described. After the sub-block based affine motion compensation is performed, the prediction signal can be refined by adding an offset derived based on the pixel-wise motion and the gradient of the prediction signal. The offset at location (m, n) can be calculated as:

$$\Delta I(m, n) = g_x(m, n) * \Delta v_x(m, n) + g_y(m, n) * \Delta v_y(m, n)$$

wherein $g_x(m, n)$ is the horizontal gradient and $g_y(m, n)$ is the vertical gradient of the prediction signal, respectively. $\Delta v_x(m, n)$ and $\Delta v_y(m, n)$ are the differences in x and y components between the motion vector calculated at location pixel location (m, n) and the subblock MV. Let the coordinate of the top-left sample of the subblock be (0,0), the center of the subblock is $$\left(\frac{sbW}{2}, \frac{sbH}{2}\right).$$

Given the affine motion parameters a, b, c, and d, $\Delta v_x(m, n)$ and $\Delta v_y(m, n)$ can be derived as:

$$\Delta v_x(m, n) = a * \left(m - \frac{sbW}{2}\right) + b * \left(n - \frac{sbH}{2}\right)$$

$$\Delta v_y(m, n) = c * \left(m - \frac{sbW}{2}\right) + d * \left(n - \frac{sbH}{2}\right)$$

In the control-points based affine motion model, the affine motion parameters a, b, c, and d are calculated from the CPMVs as $$a = \frac{(v_{1x} - v_{0x})}{blkW}$$

$$b = \frac{(v_{2x} - v_{0x})}{blkH}$$

$$c = \frac{(v_{1y} - v_{0y})}{blkW}$$

$$d = \frac{(v_{2y} - v_{0y})}{blkH}$$

Affine merge mode is now described. In the affine merge mode of VVC, the CPMVs of the current CU is generated based on the motion information of the spatial neighboring CUs. There can be up to five candidates and an index is signaled to indicate the one to be used for the current CU. The following three types of candidates are used to form the affine merge candidate list: Inherited affine merge candidates that extrapolated from the CPMVs of the neighbor CUs; Constructed affine merge candidates that are derived using the translational MVs of the neighbor CUs; and Zero MVs.

Figure 10:
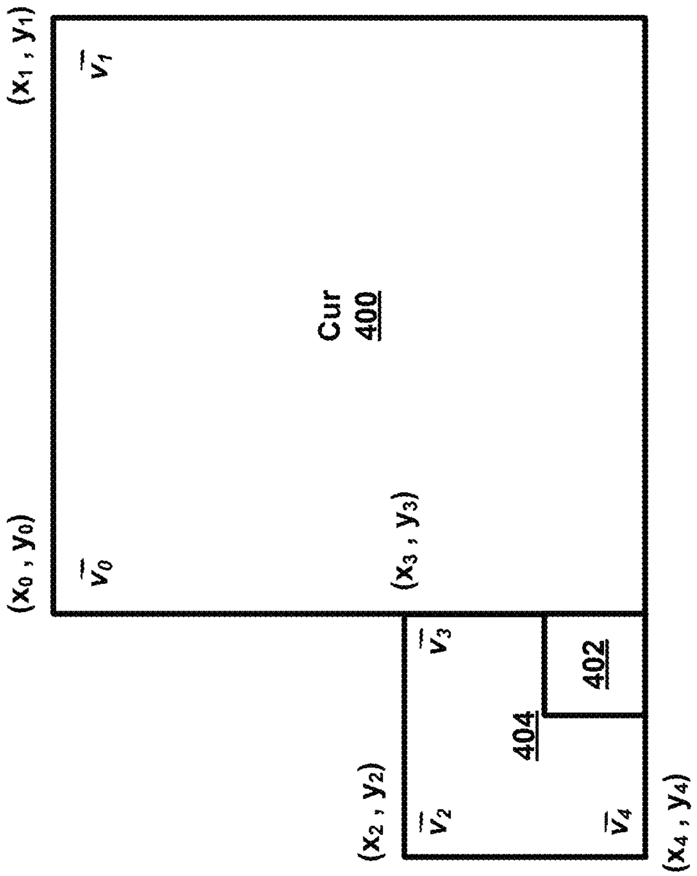
FIG. 10 is a conceptual diagram illustrating an example of control point motion vector inheritance.

In VVC, when a neighboring affine CU is identified, its control point motion vectors are used to derive the inherited affine merge candidate in the affine merge list of the current CU. As shown in FIG. 10, if the neighbor left bottom block 402 is coded in affine mode, the motion vectors $v_2$, $v_3$ and $v_4$ of the top left corner, above right corner and left bottom corner of the CU 404 which contains block 402 are attained. When block 402 is coded with 4-parameter affine model, the two CPMVs of current CU 400 are calculated according to $v_2$, and $v_3$. In case that block 402 is coded with 6-parameter affine model, the three CPMVs of current CU 400 are calculated according to $v_2$, $v_3$ and $v_4$.

Figure 11:
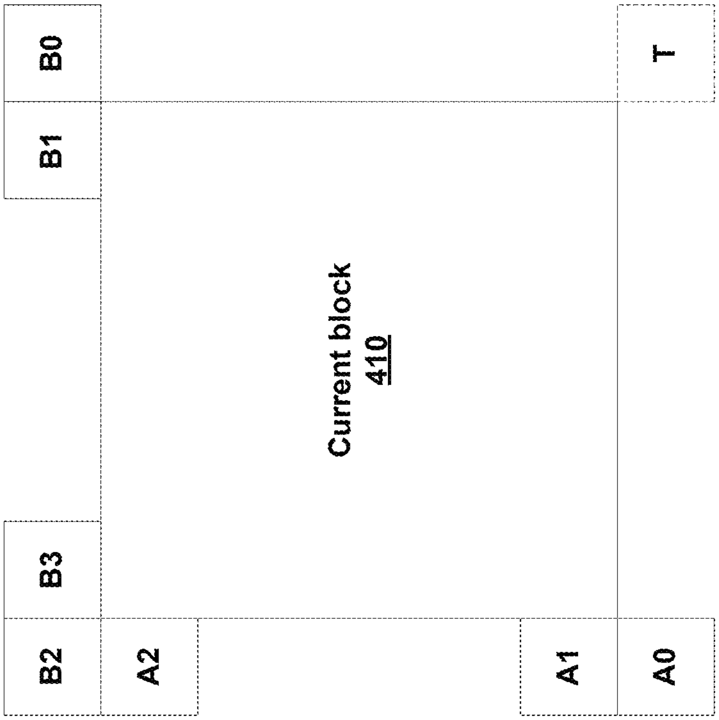
FIG. 11 is a conceptual diagram illustrating example locations of candidates position for constructed affine merge mode.

Constructed affine candidate means the candidate is constructed by combining the neighbor translational motion information of each control point. The motion information for the control points is derived from the specified spatial neighbors and temporal neighbor shown in FIG. 11. $CPMV_k$ (k=1, 2, 3, 4) represents the k-th control point. For $CPMV_1$, video encoder 200 and/or video decoder 300 check the B2→B3→A2 blocks in that order and the motion vector of the first available block is used for current block 410. For $CPMV_2$, video encoder 200 and/or video decoder 300 check the B1→B0 blocks in that order. For $CPMV_3$, video encoder 200 and/or video decoder 300 check the A1→A0 blocks in that order. A TMVP candidate may be used as $CPMV_4$ if available.

After motion vectors of four control points are obtained, video encoder 200 and/or video decoder 300 construct affine merge candidates based on that motion information. The following combinations of CPMVs are used, in order, to construct an affine candidate:

{$CPMV_1$, $CPMV_2$, $CPMV_3$}, {$CPMV_1$, $CPMV_2$, $CPMV_4$}, {$CPMV_1$, $CPMV_3$, $CPMV_4$}, {$CPMV_2$, $CPMV_3$, $CPMV_4$}, {$CPMV_1$, $CPMV_2$}, {$CPMV_1$, $CPMV_3$}

The combination of 3 CPMVs constructs a 6-parameter affine merge candidate and the combination of 2 CPMVs constructs a 4-parameter affine merge candidate. To avoid motion scaling process, if the reference indices of control points are different, the related combination of control point MVs is discarded.

After inherited affine merge candidates and constructed affine merge candidate are checked, if the list is still not full, zero MVs are inserted to the end of the list.

Affine AMVP mode is now discussed. In VVC, affine flag in coding unit (CU) level is signaled in the bitstream to indicate whether affine AMVP mode is used and then another flag is signaled to indicate whether 4-parameter affine or 6-parameter affine. In affine AMVP mode, the motion vector difference (MVD) between the CPMVs of current CU and their predictors CPMVPs is signaled in the bitstream together with the index of predictors and the index of the selected reference picture for each of the applicable prediction direction. In case of 4-parameter affine, two MVDs are signaled per applicable prediction direction. In case of 6-paramter affine, three MVDs are signaled per applicable prediction direction. When coding the 2nd and 3rd (in case of 6-paramter affine) MVD is further predicted by the 1st MVD. Therefore, the difference between 2nd and 1st MVD in stead of the 2nd MVD is signaled in the bitstream, and the difference between 3rd and 1st MVD instead of the 3rd MVD is signaled in the bitstream for the 6-parameter affine. Note that inter prediction direction is signaled beforehand to indicate whether it's bi-prediction, uni-prediction from reference picture list 0 or uni-prediction from reference picture list 1.

In VVC, the affine AMVP candidate list size is generated by using the following four types of CPMVP candidate in order: 1) Inherited affine AMVP candidates that extrapolated from the CPMVs of the neighbor CUs; 2) Constructed affine AMVP candidates CPMVPs that are derived using the translational MVs of the neighbor CUs; 3) Translational MVs from neighboring CUs; and 4) Zero MVs.

The checking order of inherited affine AMVP candidates is same to the checking order of inherited affine merge candidates. The only difference is that, for AMVP candidate, only the affine CU that has the same reference picture as in current block is considered. No pruning process is applied when inserting an inherited affine motion predictor into the candidate list.

A constructed AMVP candidate is derived from the specified spatial neighbors. The same checking order is used as done in affine merge candidate construction. In addition, reference picture index of the neighboring block is also checked. The first block in the checking order that is inter coded and has the same reference picture as in current CUs is used. There is only one when the current CU is coded with 4-parameter affine mode, and $mv_0$ and $mv_1$ are both available, they are added as one candidate in the affine AMVP list. When the current CU is coded with 6-parameter affine mode, and all three CPMVs are available, they are added as one candidate in the affine AMVP list. Otherwise, constructed AMVP candidate is set as unavailable.

If a number of affine AMVP list candidates is still less than maximum number after valid inherited affine AMVP candidates and constructed AMVP candidate are inserted, $mv_0$, $mv_1$, and $mv_2$ will be added, in order, as the translational MVs to predict all control point MVs of the current CU, when available. Finally, zero MVs are used to fill the affine AMVP list if it is still not full.

Linear regression based affine merge candidates are now discussed. In ECM6.0, linear regression based affine merge candidate derivation method proposed in JVET-AA0107 was adopted. In the proposal, two types of linear regression based affine merge candidates are derived, the non-refined and refined candidates. For both types of candidates, the derivation process is the same with only different sub-block motion information are used as the input.

Figure 12:
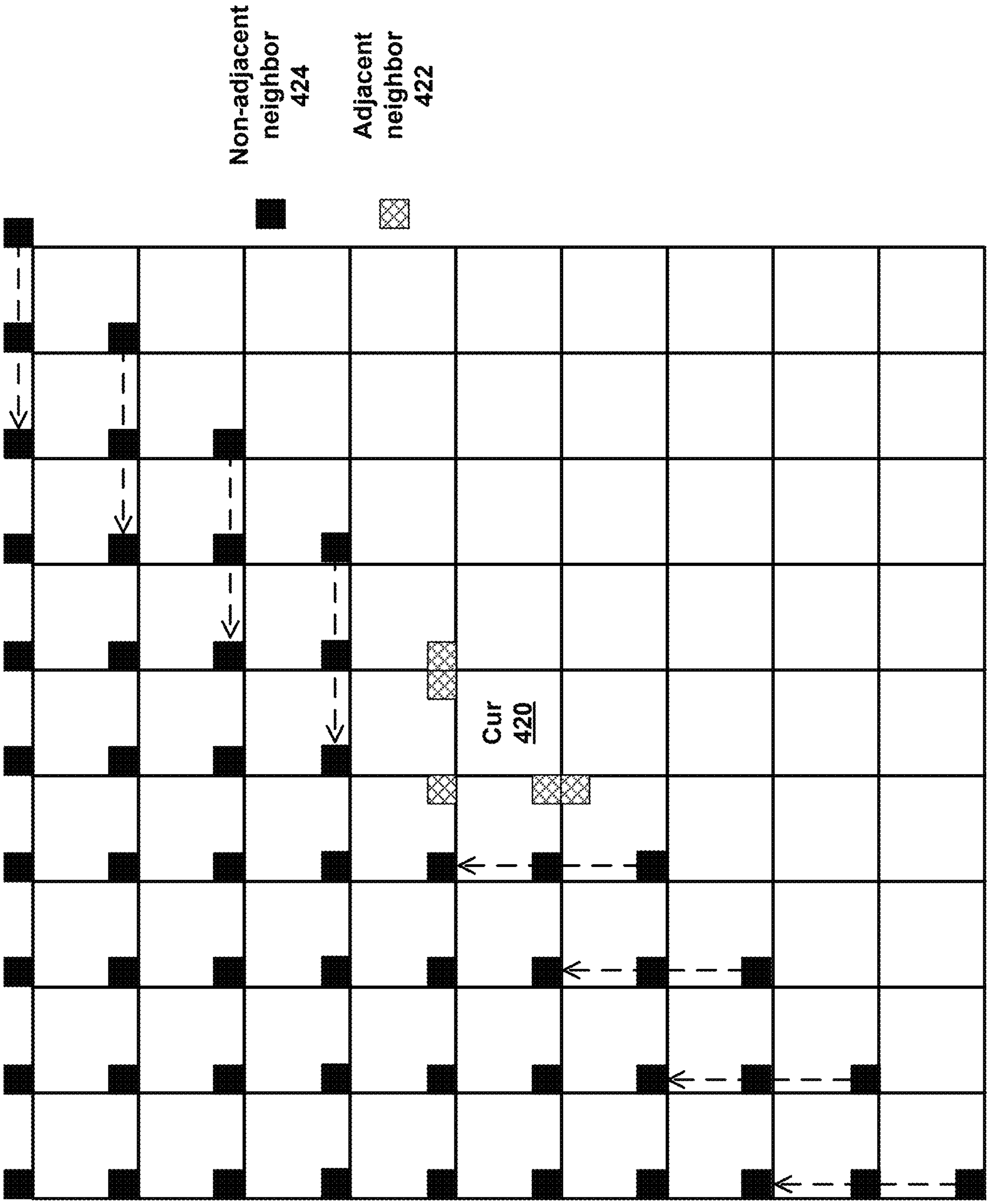
FIG. 12 is a conceptual diagram illustrating an example of searching for non-adjacent affine CU and use motion information to derive non-refined candidates.

FIG. 12 is a conceptual diagram illustrating example non-adjacent spatial neighboring blocks used to derive non-adjacent affine candidates. In the example of FIG. 12, current block 420 is depicted, along with adjacent neighbors 422 (shown with cross hatching) and non-adjacent neighbors 424 (shown with shading). For the non-refined candidates, only the sub-block motion information from a non-adjacent affine CU is used as the input to the linear regression process. A non-adjacent affine CU would be a non-adjacent neighbor 424 that is coded using affine mode.

FIG. 12 shows an example of inputs to the linear regression process to derive the non-refined linear regression based affine merge candidates. As described above with respect to BDOF, certain scan patterns may be used in searching for non-adjacent affine CUs. Once a non-adjacent affine CU is identified, as in the example of FIG. 12, each of a sub-block's motion information including the sub-block's motion vectors denoted by $\{(mv_{x0}, mv_{y0}), (mv_{x1}, mv_{y1}), \ldots, (mV_{xN-1}, mv_{yN-1})\}$ and central coordinates denoted by $\{(x_0, y_0), (x_1, y_1), \ldots, (x_{N-1}, y_{N-1})\}$ are input to the linear regression process to derive non-refined affine merge candidates.

Figure 13:
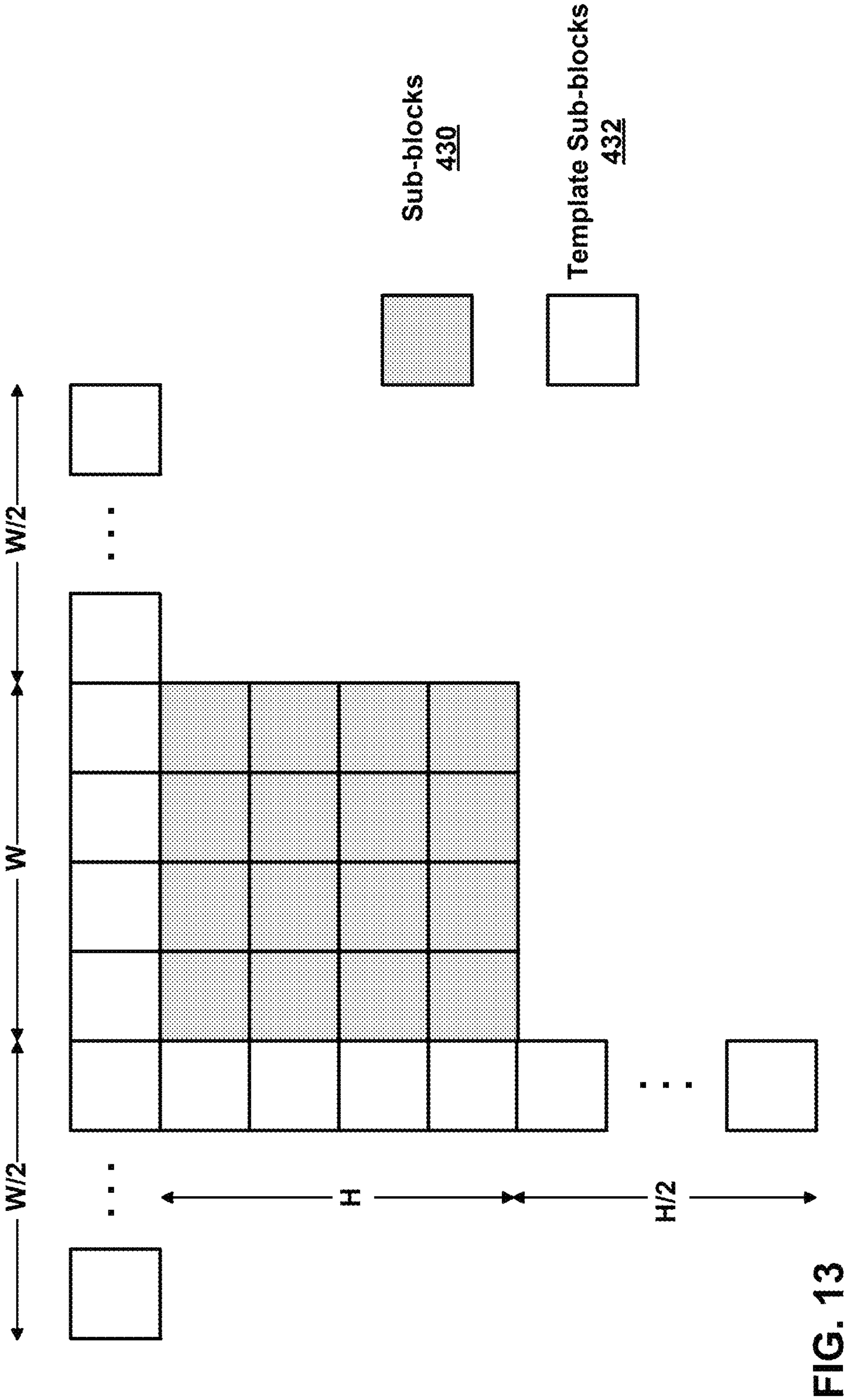
FIG. 13 is a conceptual diagram illustrating an example of sub-block motion information used to derive refined candidates.

FIG. 13 shows an example of sub-block motion information used to derive refined candidates. For the refined candidates, in addition to the motion information from sub-blocks 430 in the non-adjacent affine CU (as shown in FIG. 12), motion information from the template sub-blocks 432 may additionally be included as input to the linear regression process.

The linear regression process for deriving both the non-refined as well as the refined candidates are the same which follows the mathematical derivation as explained above. The only difference is which of the sub-blocks' information should be used as the input to the linear regression process.

Bilateral matching AMVP-merge mode in ECM is now discussed. The bi-directional predictor is composed of an AMVP predictor in one direction and a merge predictor in the other direction. The mode can be enabled to a coding block when the selected merge predictor and the AMVP predictor satisfy DMVR condition, where there is at least one reference picture from the past and one reference picture from the future relatively to the current picture and the distances from two reference pictures to the current picture are the same, the bilateral matching MV refinement is applied for the merge MV candidate and AMVP MVP as a starting point. Otherwise, if template matching functionality is enabled, template matching MV refinement is applied to the merge predictor or the AMVP predictor which has a higher template matching cost. The pipeline of AMVP-merge mode is illustrated in FIG. 14.

Figure 14:
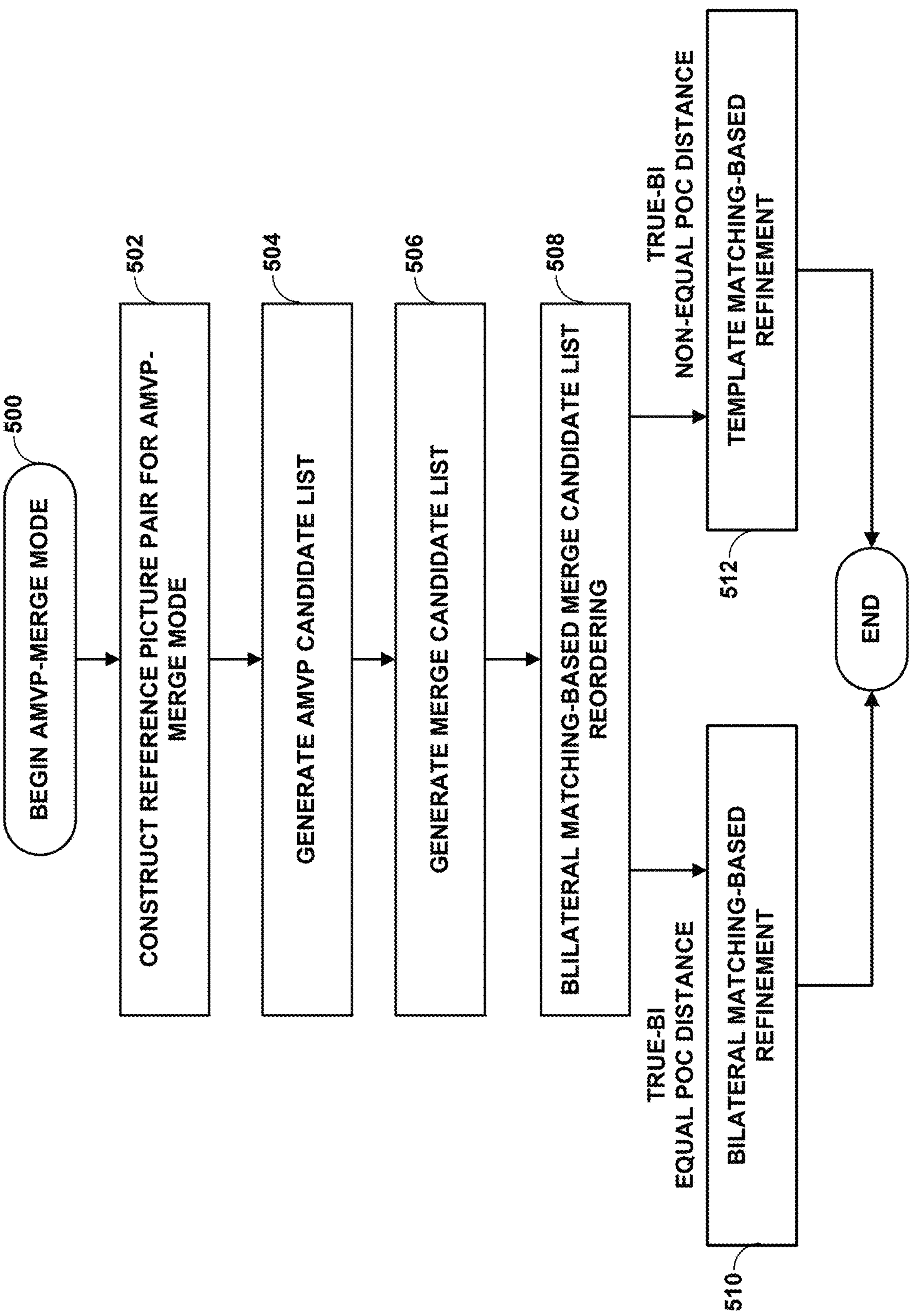
FIG. 14 is a flow diagram illustrating example techniques of AMVP-Merge mode for non-low delay condition (non-LDC) picture.

In FIG. 14, the AMVP-merge mode process begins at 500. Then video encoder 200 and video decoder 300 may construct a reference picture pair for the AMVP-merge mode (502). Video encoder 200 and video decoder 300 may generate an AMVP candidate list (504) for one prediction direction, and may generate a merge candidate list (506) for the other prediction direction. In some examples, video encoder 200 and video decoder 300 may perform bilateral matching-based merge candidate list reordering (508) on the AMVP candidate list and/or the merge candidate list. Video encoder 200 and video decoder 300 may perform bilateral matching-based refinement (510) if the candidates have equal POC distance, and may perform template matching-based refinement if the candidates have unequal POC distance (512). The term "true-bi equal POC distance" refers to the situation where one reference picture has a POC that is less than the POC of the current picture, and the other reference picture has a POC that is greater than the POC of the current picture.

The AMVP part of the mode is signaled as a regular uni-directional AMVP, i.e., reference index and MVD are signaled, and it has a derived MVP index if template matching is used or MVP index is signaled when template matching is disabled.

For AMVP direction LX, X can be 0 or 1, the merge part in the other direction (1−LX) is implicitly derived by minimizing the bilateral matching cost between the AMVP predictor and a merge predictor, i.e., for a pair of the AMVP and a merge motion vectors. For every merge candidate in the merge candidate list which has that other direction (1−LX) motion vector, the bilateral matching cost is calculated using the merge candidate MV and the AMVP MV. The merge candidate with the smallest cost is selected. The bilateral matching refinement is applied to the coding block with the selected merge candidate MV and the AMVP MV as a starting point.

The third pass of multi pass DMVR which is 8×8 sub-PU BDOF refinement of the multi-pass DMVR is enabled to AMVP-merge mode coded block.

The mode is indicated by a flag, if the mode is enabled AMVP direction LX is further indicated by a flag.

Local illumination compensation (LIC) is now discussed. LIC is an inter prediction technique to model local illumination variation between current block and its prediction block as a function of that between current block template and reference block template. The parameters of the function can be denoted by a scale $\alpha$ and an offset $\beta$, which forms a linear equation, that is, $\alpha * p[x] + \beta$ to compensate illumination changes, where p[x] is a reference sample pointed to by MV at a location x on reference picture. Since $\alpha$ and $\beta$ can be derived based on current block template and reference block template, no signaling overhead is required for them, except that an LIC flag is signaled for AMVP mode to indicate the use of LIC.

The local illumination compensation proposed in JVET-00066 is used for uni-prediction inter CUs with the following modifications: Intra neighbor samples can be used in LIC parameter derivation; LIC is disabled for blocks with less than 32 luma samples; For both non-subblock and affine modes, LIC parameter derivation is performed based on the template block samples corresponding to the current CU, instead of partial template block samples corresponding to first top-left 16×16 unit; Samples of the reference block template are generated by using MC with the block MV without rounding it to integer-pel precision.

In JVET-AD0213, LIC mode is extended to bi-predictive CUs and is adopted into ECM, where two different linear models are applied to the two prediction blocks which are then combined to generate the bi-prediction samples of the current CU, i.e., $$P'[x, y] = (1-\omega)\cdot p_0'[x, y] + \omega\cdot p_1'[x, y]$$

and $$p_0'[x, y] = \alpha_0\cdot P_0[x, y] + \beta_0$$

$$p_1'[x, y] = \alpha_1\cdot P_1[x, y] + \beta_1$$

where $\alpha_0$ and $\beta_0$, and $\alpha_1$ and $\beta_1$ indicate the scales and the offsets in L0 and L1, respectively; ω indicates the weight (as indicated by the CU-level BCW index) for the weighted combination of L0 and L1 predictions.

The method firstly derives the L0 parameters by minimizing difference between L0 template prediction $T_0$ and the template T and the samples in T are updated by subtracting the corresponding samples in $T_0$. Then, the L1 parameters are calculated that minimizes the difference between L1 template prediction $T_1$ and the updated template. Finally, the L0 parameter is refined again in the same way.

Following the current LIC design, one flag is signaled for AMVP bi-predicted CUs for the indication of the LIC mode while the flag is inherited for merge related inter CUs. Additionally, the LIC is disabled for DMVR and BDOF.

In ECM, the derived LIC model parameter is stored in the CUs since when performing overlapped block motion compensation (OBMC), the LIC model parameter will additionally be compared to decide whether the OBMC need to be performed. Hence, for a CU with LIC flag equals to true, a set of LIC model parameters is stored and available for future usage.

In JVET-AF0191, non-local illumination compensation (NLIC) is proposed. For this method, instead of using the template samples, the samples of the previously coded CUs are utilized for deriving the linear model used for the motion compensation of the current block. Specifically, after the reconstruction of each inter CU (except for geometry-based prediction mode (GPM) and SbTMVP CUs), one linear model is derived by minimizing the difference between the reconstruction and prediction samples of the block. The derived LIC model parameters are also stored. This LIC model is derived irrespective of the LIC flag value of the block. If the LIC flag is true for the CU, then two set of LIC model parameters are stored. One set is derived between the current template and reference template. Another set is derived by minimizing the difference between the reconstruction and prediction samples of the block. If the LIC flag is false, then only set of LIC parameters are stored which is derived between the reconstruction and prediction samples of the block.

In JVET-AF0128, template matching cost based LIC flag derivation technique(s) are proposed and such techniques were adopted into the ECM reference software. In these techniques, the template matching cost is computed twice for the same merge candidate with LIC flag set to true or false each time. The two template matching costs are compared, and a predefined threshold is used to decide whether the LIC flag will be modified. Currently, such techniques are only applied to uni-predicted merge candidates.

In some video coding standards and implementations, when BDMVR, a video coder may decide a final motion vector by minimizing BM cost between two candidate reference blocks in a reference picture L0 and a reference picture L1. Video encoder 200 or video decoder 300 may derive candidate reference blocks by bilinear interpolation using initial motion vectors of reference picture L0 and reference picture L1, respectively. The BM cost is defined as the difference between two candidate reference blocks, and this difference may be the SAD, MR-SAD, SATD, etc. A pair of candidate reference blocks may have a higher BM cost than another pair of candidate reference blocks due to for example, illuminance differences, high frequency noise, or the like. As such, in some cases, determining a refined MV by using BM cost may not be accurate, and the resulting prediction signal which is derived from the BDMVR refined MV may not be efficient for video compression. This may lead to less efficient coding and/or poorer quality decoded video.

In this disclosure, various techniques are described to improve BDMVR search results by improving the prediction signal of reference search areas on reference picture L0 and reference picture L1. For example, given a W×H block, the block has two initial motion vectors, denoted by MV0 and MV1, in reference picture L0 and reference picture L1, respectively. The reference search area W_EXT×H_EXT on L0 and L1 is an interpolation area, pointed to by MV0 and MV1 respectively, wherein the size of the reference search area is larger than the size of the block. In some examples, the initial reference blocks on L0 and L1 are at the center of the reference search areas.

Figure 15:
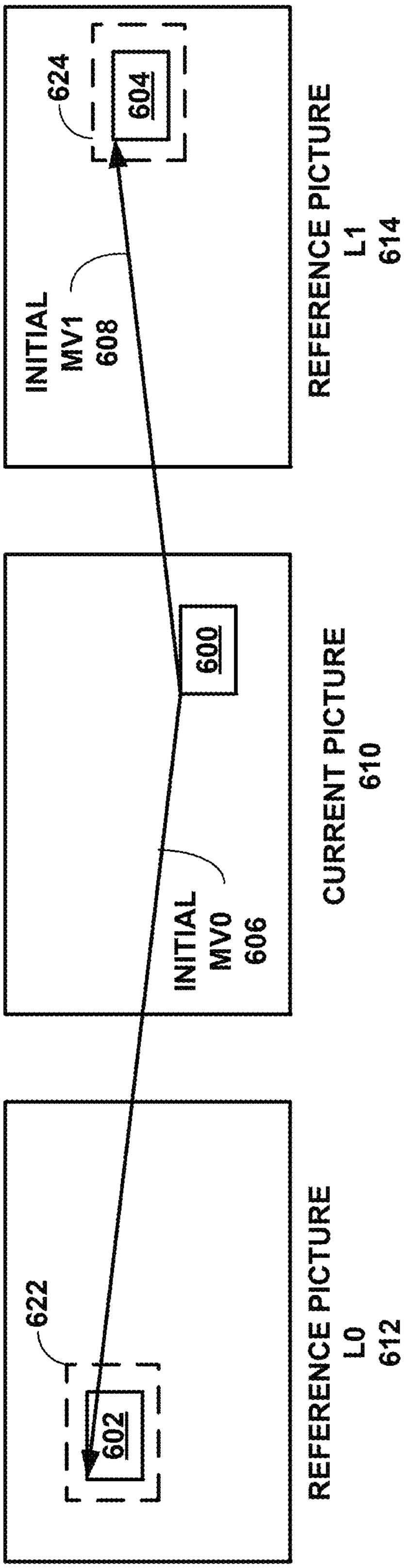
FIG. 15 is a conceptual diagram illustrating an example of reference search area of bilateral matching bases decoder side motion refinement.

FIG. 15 shows an example of the reference search area of BDMVR and initial reference blocks for a W×H block. Current block 600 of current picture 610 may be a W×H block. Reference block 602 of reference picture L0 612 may be an initial reference block within a reference search area 622. Similarly, reference block 604 of reference picture L1 614 may be an initial reference block within a reference search area 624. Initial MV0 606 may point from current block 600 to initial reference block 602, while initial MV1 608 may point from current block 600 to initial reference block 604. In some examples, current block 600 is a coding block. In some examples, current block 600 is a subblock of a coding block. In some examples, the initial MV, MV0 606, and/or MV1 608 are derived from a merge candidate. In some examples, the initial MV, MV0 606, and/or MV1 608 are derived from some decoder motion vector refinement process. For example, in a multi-pass DMVR process, the refined MVs of preceding pass are used as the initial MVs of the succeeding pass.

The bilateral matching search will use the refined reference search area to determine a candidate MV which has the minimum BM cost between L0 and L1. For example, video encoder 200 or video decoder 300 may use a refined reference search area to determine a candidate MV that has a minimum BM cost between L0 and L1.

Figure 16:
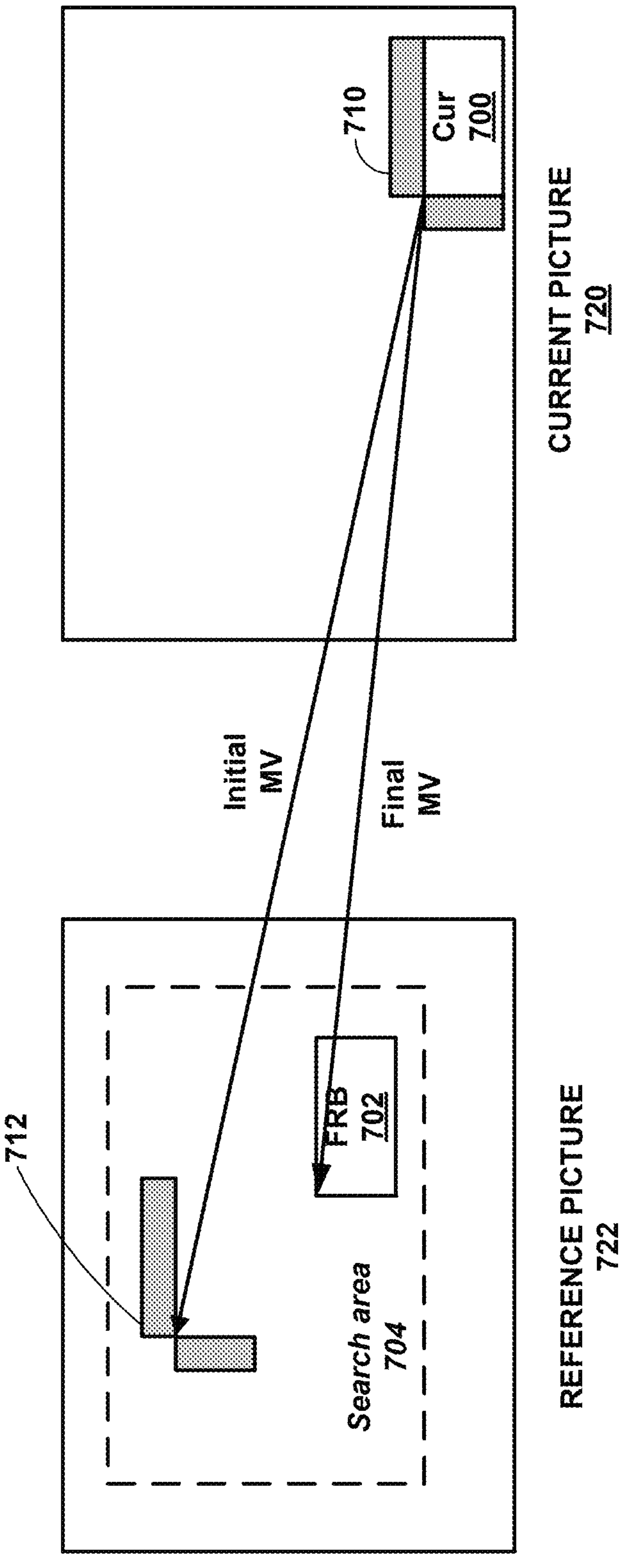
FIG. 16 is a conceptual diagram illustrating an example of reference search area of template matching bases decoder side motion refinement.

FIG. 16 shows an example of the reference search area of template matching and initial reference blocks for a W×H block. In one example, the proposed techniques are applied to a current block 700 to derive the final MVs by minimizing the template matching cost between a reference template 712 at a reference picture 722 (which may also be referred to as a reference frame) and the reconstructed template 710 in current picture 720 (which may also be referred to as a current frame). In this case, the template matching search will use the refined reference search area 704 to determine a candidate MV which has the minimum TM cost between reference template 712 and reconstructed template 710 and thereby determine a final reference block (FRB) 702. For example, video encoder 200 or video decoder 300 may use such techniques. In some examples, video encoder 200 or video decoder 300 may determine the final MVs by determining an MV0 for an L0 final reference block in such a manner and also determining an MV1 for an L1 final reference block in such a manner.

Example 1—Local Illuminance Compensation (LIC) of Search Area

In some examples, video encoder 200 or video decoder 300 may use a current block neighbor reconstruction to derive a LIC template, and apply a LIC model to L0 and L1 reference search area respectively.

In this example, the illuminance compensation is applied to both the reference search areas at reference picture L0 and at reference picture L1. For example, a LIC model (which has a scale $\alpha$ and an offset $\beta$) may be derived for L0 and for L1, respectively. The reconstructed neighbor samples relative to the left and to the above samples of the current block are used when deriving the LIC model. The derived LIC model for L(X), where X is 0 or 1, is applied to the reference search area at reference picture LX which is derived by, but not limited to, bi-linear interpolation using MV(X) or by motion compensation using MV(X). It should be noted that the choice of interpolator does not always have to be a bi-linear filter and might be subject to change in a video coding standard, e.g., using 8-tap/6-tap luma filter and 4-tap chroma filter in HEVC or VVC or 12-tap luma filter in ECM.

The LIC refined reference search area at L0 is derived by applying a LIC model $\alpha 0$ and $\beta 0$ to each sample in the reference search area at L0, e.g., $P0'(x, y)=\alpha 0*P0(x, y)+\beta 0$. Video encoder 200 or video decoder 300 may derive the LIC refined reference search area at L0.

The LIC refined reference search area at L1 is derived by applying a LIC model $\alpha 1$ and $\beta 1$ to each sample in the reference search area at L1, e.g., $P1'(x, y)=\alpha 1*P1(x, y)+\beta 1$. Video encoder 200 or video decoder 300 may derive the LIC refined reference search area at L1.

In one example, the LIC model derivation for L0 and L1 is similar to the current ECM bi-LIC (e.g., bi-prediction LIC), which video encoder 200 or video decoder 300 first derives L0 parameters by minimizing a difference between L0 template prediction $T_0$ and the template T and updates the samples in T by subtracting the corresponding samples in $T_0$. Then, the L1 parameters are calculated by minimizing the difference between L1 template prediction $T_1$ and the updated template. Finally, the L0 parameter is refined again in the same way. For example, video encoder 200 or video decoder 300 may use such techniques to derive the L0 LIC model parameters and/or to derive the L1 LIC model parameters.

In one example, the LIC model derivation for L0 is independent of the LIC model derivation for L1. The LIC model derivation for L(X), where X is 0 or 1, is to minimize the difference between LX template and the current block reconstruction template. For example, video encoder 200 or video decoder 300 may perform the LIC model derivation for L(X) to minimize the difference between the LX template and the current block reconstruction template.

In some examples, given a W×H block, which has a top-left position of (X, Y), video encoder 200 or video decoder 300 may determine the template size and position as follows: The above reconstruct template is of size W×G, located at the position (X, Y−P). The left reconstruct template is of size K×H, located at the position (X−Q, Y). The above reference template at reference picture L0 has a size of W×G and the top-left position (X+MV0_hor, Y+MV0_ver−R). The left reference template at reference picture L0 has a size of K×H and the top-left position (X+MV0_hor−S, Y+MV0_ver). The above reference template at reference picture L1 has a size of W×G and the top-left position (X+MV1_hor, Y+MV1_ver−R). The left reference template at reference picture L1 has a size of K×H and the top-left position (X+MV1_hor−S, Y+MV1_ver). The motion vectors (e.g., MV0 and MV1) aforementioned could be used as-is without change; or, in an example, the motion vectors may be rounded or truncated to integer resolution in advance before use to avoid the use interpolation for complexity reduction. For example, video encoder 200 or video decoder 300 may use MV0 and MV1 as described above without change, or may round or truncate MV0 and MV1 to an integer resolution.

In one example, the values of G, K, P, Q, R, S are all set equal to 1.

In another example, the values of P and Q are equal to 1, while the values of R and S are equal to 1+T, wherein T is equal to the search area extended size. For example, the search area is predetermined as a range of [−8, 8] which means a refined MV can have a horizontal difference to the initial MV−8-pel to 8-pel in horizontal direction and −8-pel to 8-pel in vertical direction. In this case, the value of T is equal to 8.

In some examples, video encoder 200 or video decoder 300 may use reference blocks L(X) and L (1−X) to derive a LIC template and apply the LIC template to reference search area L(X). In this example, the illuminance compensation is applied to the reference search area at reference picture L(X), where X is 0 or 1. The LIC model (which has a scale $\alpha$ and an offset $\beta$) is derived for L(X) by minimizing the difference between L(X) template prediction and L(1−X) template prediction. The derived LIC model for L(X) is applied to the reference search area at reference picture LX which is derived by bi-linear interpolation using MV(X) or by motion compensation using MV(X).

In this example, video encoder 200 or video decoder 300 avoid using the reconstructed neighbor samples of the current block to derive the LIC model, which may reduce the latency of video coding in a prediction stage.

In some examples, the LIC refined reference search area at L(X) is derived by applying a LIC model $\alpha$ and $\beta$ to each sample in the reference search area at L(X), e.g. $P'(x, y)=\alpha*P(x, y)+\beta$. For example, video encoder 200 or video decoder 300 may apply a LIC model to each sample in the reference search area.

In some examples, the LIC template has an above template and a left template.

Given a W×H block, which has a top-left position of (X, Y), video encoder 200 or video decoder 300 may determine the template size and position as follows: The above reference template at reference picture L0 has a size of W×G and the top-left position (X+MV0_hor, Y+MV0_ver−R). The left reference template at reference picture L0 has a size of K×H and the top-left position (X+MV0_hor−S, Y+MV0_ver). The above reference template at reference picture L1 has a size of W×G and the top-left position (X+MV1_hor, Y+MV1_ver−R). The left reference template at reference picture L1 has a size of K×H and the top-left position (X+MV1_hor−S, Y+MV1_ver). The motion vectors (i.e., MV0 and MV1) aforementioned could be used as-is without change; or, in an example, the motion vectors might be rounded or truncated to integer resolution in advance before use to avoid the use interpolation for complexity reduction. For example, video encoder 200 or video decoder 300 may use MV0 and MV1 as described above without change, or may round or truncate MV0 and MV1 to an integer resolution.

In one example, the values of G, K, R, S are all set equal to 1.

In another example, the values of P and Q are equal to 1, while the values of R and S are equal to 1+T, wherein T is equal to the search area extended size. For example, the search area is predetermined as a range of [−8, 8] which means a refined MV can have a horizontal difference to the initial MV−8-pel to 8-pel in horizontal direction and −8-pel to 8-pel in vertical direction. In this case, the value of T is equal to 8.

In one example, the LIC template includes the right and the below regions of the search area, which is determined as follows: The below reference template at reference picture L0 has a size of W×G and the top-left position (X+MV0_hor, Y+MV0_ver+H). The right reference template at reference picture L0 has a size of K×H and the top-left position (X+MV0_hor+W, Y+MV0_ver). The below reference template at reference picture L1 has a size of W×G and the top-left position (X+MV1_hor, Y+MV1_ver+H). The right reference template at reference picture L1 has a size of K×H and the top-left position (X+MV1_hor+W, Y+MV1_ver). For example, video encoder 200 or video decoder 300 may use a LIC template that includes the right and below regions of the search area.

In some examples, the LIC template is a rectangular block.

Given a W×H block, which has a top-left position of (X, Y), the template size and position are determined as follows: The reference template at reference picture L0 has a size of (W+G)×(H+K), and a position (X+MV0_hor+R, Y+MV0_ver+S). The reference template at reference picture L1 has a size of (W+G)×(H+K), and a position (X+MV1_hor+R, Y+MV1_ver+S).

In one example, the values of G, K, R, S are all equal to 0.

In one example, the values of G, K, R, S depend on the value of the search area extended size. For example, the search area is predetermined as a range of [−8, 8] which means a refined MV can have a horizontal difference to the initial MV−8-pel to 8-pel in horizontal direction and −8-pel to 8-pel in vertical direction. In this case, the value of G and K are equal to 8*2=16, the values of R and S are equal to −8. In this case, the entire extended area at L0 and L1 are used as the reference templates.

In some examples, video encoder 200 or video decoder 300 use reference blocks L0 and L1 to derive a weighted prediction block, to derive LIC templates for L0 and L1 by minimizing the difference between L(X) to the prediction block respectively, and apply the LIC model to reference search area L0 and L1, respectively.

In this example, video encoder 200 or video decoder 300 first derives a weighted prediction block by using an interpolation reference block at L0 and L1. The prediction template may include the prediction block or a subset of the prediction block. The LIC model at L0 is derived by minimizing the difference between a reference template at L0 and the prediction template. The LIC model at L1 is derived by minimizing the difference between a reference template at L1 and the prediction template. The derived LIC model at L0 and L1 is used to refine the reference search area at L0 and L1, respectively.

In one example, the prediction block size is equal to the reference block size, and is equal to the reference search area size.

In one example, the prediction block size is equal to the reference block size, and is smaller than the reference search area size. In this case, the reference block is a subset of the reference search area.

In one example, the weighted prediction block is derived by averaging the corresponding interpolation reference sample at L0 and L1.

In one example, the weight factors at L0 and L1 are indicated by the coding block parameter, e.g., BCW_IDX.

In some examples, video encoder 200 or video decoder 300 derive a LIC model from previous coded CUs.

In one example, a LIC model of a previous coded coding block is used for the current block. The LIC model is used to refine the reference search area at L0 and L1.

Example 2

Video encoder 200 or video decoder 300 derive a model (e.g., a LIC model) based on minimizing a difference between L0 and L1, and apply the model to L0 and/or L1.

In this example, a model which has N coefficients (denoted as C0, C1, . . . . Cn) and an offset (denoted as B), and has the current pixel is located at the center of the model, is derived and used to refine the reference search area. The refined pixel is derived as P'(x, y)=C0*P(x, y)+C1*P(x+x1, y+y1)+ . . . +Cn*P(x+xn, y+yn)+B. For example, video encoder 200 or video decoder 300 may apply such a model.

In one example, when a neighbor sample of the current pixel is not available, e.g., the current pixel is at the boundary of the reference search area, the not available neighbor sample is copied from the closest spatial available sample, e.g., the closest available sample in horizontal direction, or the closest available sample in vertical direction.

The following examples describe various techniques to derive the model, e.g., coefficients values C0, C1 . . . . Cn and offset B. Video encoder 200 or video decoder 300 may utilize any such techniques.

In one example, the neighbor reconstructed samples of the current block are used to derive the N coefficients model. For example, video encoder 200 or video decoder 300 may use the neighbor reconstructed samples of the current block to derive the N coefficients model. The derivation process of N coefficients at reference picture L(X), where X is 0 or 1, is to minimize the difference between template at L(X) and the template of the current reconstruct neighbor samples. The derived model 0 and model 1 is then applied to L0 and L1 respectively, to derive the refined reference search area.

In one example, the N coefficients model is derived by minimizing the difference between template at L(X) and template at L(1−X).

In one example, video encoder 200 or video decoder 300 first derives a weighted prediction block from reference blocks at L0 and L1. The N coefficients model at reference picture L(X) is derived by minimizing the difference between a template at L(X) and a template at the weighted prediction block.

In one example, the N coefficients model is derived from a previous coded coding block. In one example, the previous coded coding block is a block in the current picture, e.g., a spatial neighbor block of the current block. In one example, the previous coded coding block is a block in the temporal reference picture, e.g., a temporal collocated block to the current block.

In one example, the reconstructed template (e.g., the template of the reconstructed block) corresponds to a rectangular block above the current block and to the left of the current block.

In one example, the reference template at L(X) corresponds to a rectangular block to the above of the current reference block at L(X) and to the left of the current reference block at L(X).

In one example, the reference template at L(X) corresponds to a rectangular block which is a subset of the reference search area at L(X).

In one example, video encoder 200 or video decoder 300 first derive a bi-predicted current block by weighting the reference block at L0 and L1. The filter at L0 and L1 are derived by minimizing the difference between reference block LX and the bi-pred current block at L0 and L1 respectively. The derived filter is applied to L0 and L1 respectively.

In one example, the model is an N×M filter, which has a center of a current sample to be refined. In some examples, the filter can be square shape, cross shape, or diamond shape.

In one example, video encoder 200 or video decoder 300 derives a model for reference picture L0 and reference picture L1, respectively, and the derived model is used to refine the reference search area at L0 and L1, respectively.

In one example, video encoder 200 or video decoder 300 derives a model for reference picture L(X), and the derived model is applied to refine the reference search area at L(X), wherein X is 0 or 1.

It should be noted that the LIC techniques described in above are special examples of a model, wherein, the model has one coefficient C0 (denoted as scale $\alpha$ for the LIC model) and an offset B (denoted as offset $\beta$ for the LIC model). Such a model may not consider the neighbor samples when refining the current sample.

Example 3

Video encoder 200 or video decoder 300 may perform high frequency removal. In one example, a smoothing filter is used to refine the reference search area L0 and L1, individually. For example, video encoder 200 or video decoder 300 may use a smoothing filter to refine search areas L0 and L1, individually.

In one example, the smoothing filter is a 2-D 8-tap filter, which can be expressed as P'(x, y)=C0*P(x−1, y−1)+C1*P(x,y−1)+C2*P(x+1,y−1)+C3*P(x−1,y)+C4*P(x, y)+C5*P(x+1, y)+C6*P(x−1, y+1)+C7*P(x, y+1)+C8*P(x+1, y+1).

In one example, the smoothing filter is a 2-D 5-tap filter, which can be expressed as P'(x, y)=C0*P(x, y−1)+C1*P(x−1,y)+C2*P(x,y)+C3*P(x+1,y)+C4*P(x, y+1).

In one example, the smoothing filter is a 1−D (2k+1)-tap filter in x direction, which can be expressed as P'(x, y)=C0*P(x−k, y)+C1*P(x−(k−1), y)+ . . . +Ck*P(x, y)+ . . . +C(2k−1)*P(x+(k−1), y)+C2k*P(x+k, y).

In one example, the smoothing filter is a 1−D (2k+1)-tap filter in y direction, which can be expressed as P'(x, y)=C0*P(x, y−k)+C1*P(x, y−(k−1))+ . . . +Ck*P(x, y)+ . . . +C(2k−1)*P(x, y+(k−1))+C2k*P(x, y+k).

In one example, the filter coefficients of each reference search area are decided by estimating the complexity of the content in the reference search area. In one example, the variance is calculated and used to decide the strength of the filter. For a search area with a large variance, the filter strength is larger.

In one example, a flag is signaled to indicate the smoothing filter used for the current block. In one example, a flag is signaled to indicate that for the current block video decoder 300 applies a 2-D filter or 1-D filter. In another example, a flag is signaled to indicate that for the current block video decoder 300 applies a x-direction filter or y-direction filter.

In one example, the smoothing filter used for the current block is decided by analyzing the complexity in x and y direction of each reference search area. In one example, the x-direction variance and the y-direction variance is calculated. If both the x-direction variance and the y-direction variance are larger than (or larger than or equal to) a threshold, a 2-D filter is applied, if only the x-direction variance is larger than (or larger than or equal to) a threshold, a 1-D x-direction filter is applied, and if only the y-direction variance is larger than (or larger than or equal to) a threshold, a 1-D y-direction filter is applied.

In some examples, video encoder 200 or video decoder 300 may apply conditions to the use of the techniques of this disclosure. In one example, the proposed technique(s) are applied to a block that meets the BDMVR conditions. For example, the block is a bi-prediction inter block. For example, the reference picture at L0 and L1 are relative to the past and to the future of the current picture. For example, the POC distance of reference picture L0 to the current picture is identical to the POC distance of reference picture L1. In one example, the proposed technique(s) are applied to a block indicated by a flag or index that is signaled in the bitstream. For example, video encoder 200 may signal such a flag or index to video decoder 300.

In one example, the proposed technique(s) are applied to a block indicated by a coding block parameter, for example, when video encoder 200 or video decoder 300 determines to use LIC for a block. Such a coding block parameter may be determined by a flag or index that is signaled in the bitstream. In some examples, the coding block parameter is derived in the decoder side (e.g., by video decoder 300), for example, by comparing a template matching cost with LIC to a template matching cost without LIC, to determine whether or not to use LIC for the current block.

In one example, video encoder 200 or video decoder 300 derives a model by using the coding block initial MVs, wherein, the initial MVs are signaled in the bitstream or derived from a merge candidate. The derived model is then used in all search process of decoder side motion refinement, such as, integer-pel PU MV search, half-pel PU MV search, integer-pel subPu MV search and half-pel subPu MV search. In one example, video encoder 200 or video decoder 300 implementing the proposed technique(s) derives a model by using the previous search process of decoder side motion refinement. For example, when performing half-pel PU MV search, the decided integer-pel PU MV is used to derive a model and the model is applied to refine the reference search area of the half-pel PU MV search process.

Figure 17:
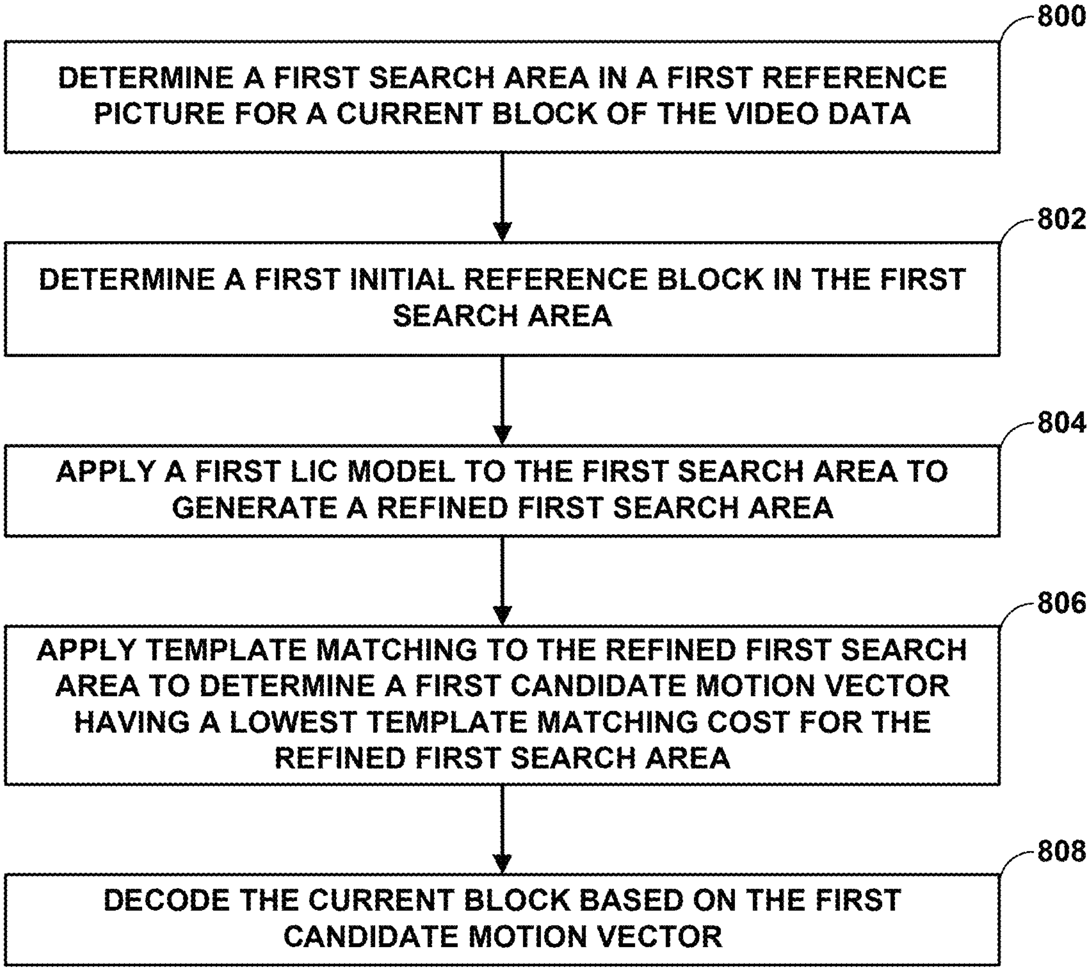
FIG. 17 is a flowchart illustrating example search area refinement techniques according to one or more aspects of this disclosure.

FIG. 17 is a flowchart illustrating example search area refinement techniques according to one or more aspects of this disclosure. Video encoder 200 or video decoder 300 may determine a first search area in a first reference picture for a current block of the video data (800). For example, video encoder 200 or video decoder 300 may determine search area 622 in reference picture L0 612 (both of FIG. 15).

Video encoder 200 or video decoder 300 may determine a first initial reference block in the first search area (802). For example, video encoder 200 or video decoder 300 may determine first initial reference block 602.

Video encoder 200 or video decoder 300 may apply a first LIC model to the first search area to generate a refined first search area (804). For example, video encoder 200 or video decoder 300 may apply a first LIC model to the first search area to generate a refined search area (e.g., refined reference search area 704 of FIG. 16).

Video encoder 200 or video decoder 300 may apply template matching to the refined first search area to determining a first candidate motion vector having a lowest template matching cost for the refined first search area (806). For example, video encoder 200 or video decoder 300 may determine a candidate motion vector based on a lowest cost template matching process.

Video encoder 200 or video decoder 300 may decode the current block based on the first candidate motion vector (808). For example, video encoder 200 or video decoder 300 may decoder the current block using the first candidate motion vector or may further refine the first candidate motion vector, for example, through additional stages or refinement, such as with a multi-pass DMVR process.

In some examples, video encoder 200 or video decoder 300 may determine to decode the current block using decoder side motion vector refinement. In some examples, video encoder 200 or video decoder 300 may determine the LIC model based on reconstructed neighbor samples of the current block. In some examples, video encoder 200 or video decoder 300 may determine the first candidate motion vector having the lowest template matching cost for the refined first search area between a first reference template in the first reference picture and a reconstructed template in a current picture, the current picture including the current block.

In some examples, to apply template matching, video encoder 200 or video decoder 300 may determine the first candidate motion vector having the lowest template matching cost for the refined first search area between a first reference template in the first reference picture and a second reference template in a second reference picture.

In some examples, the first reference picture comprises a list 0 (L0) reference picture, and video encoder 200 or video decoder 300 may determine a second search area in a second reference picture for a current block of the video data, the second reference picture comprising a list 1 (L1) reference picture. Video encoder 200 or video decoder 300 may determine a second initial reference block in the second search area. Video encoder 200 or video decoder 300 may apply a second LIC model to the second search area to generate a refined second search area. Video encoder 200 or video decoder 300 may apply template matching to the refined second search area to determining a second candidate motion vector having a lowest template matching cost for the refined second search area. Video encoder 200 or video decoder 300 may decode the current block based on the first candidate motion vector and the second candidate motion vector.

In some examples, video encoder 200 or video decoder 300 may determine a minimum difference between a L0 template prediction and an L1 template prediction. In some examples, video encoder 200 or video decoder 300 may determine at least one of the first LIC model or the second LIC model based on the minimum difference.

In some examples, to apply the first LIC model, video encoder 200 or video decoder 300 may determine a LIC template, the LIC template including an above template and a left template. In some examples, to apply the first LIC model, video encoder 200 or video decoder 300 may determine a LIC template, the LIC template including a rectangular block. In some examples, the LIC model includes a smoothing filter configured to remove high frequencies.

In some examples, video encoder 200 may encode the current block prior to decoding the current block. For example, video encoder 200 may encode the current block and then decode the current block in a decoder loop of video encoder 200.

Figure 18:
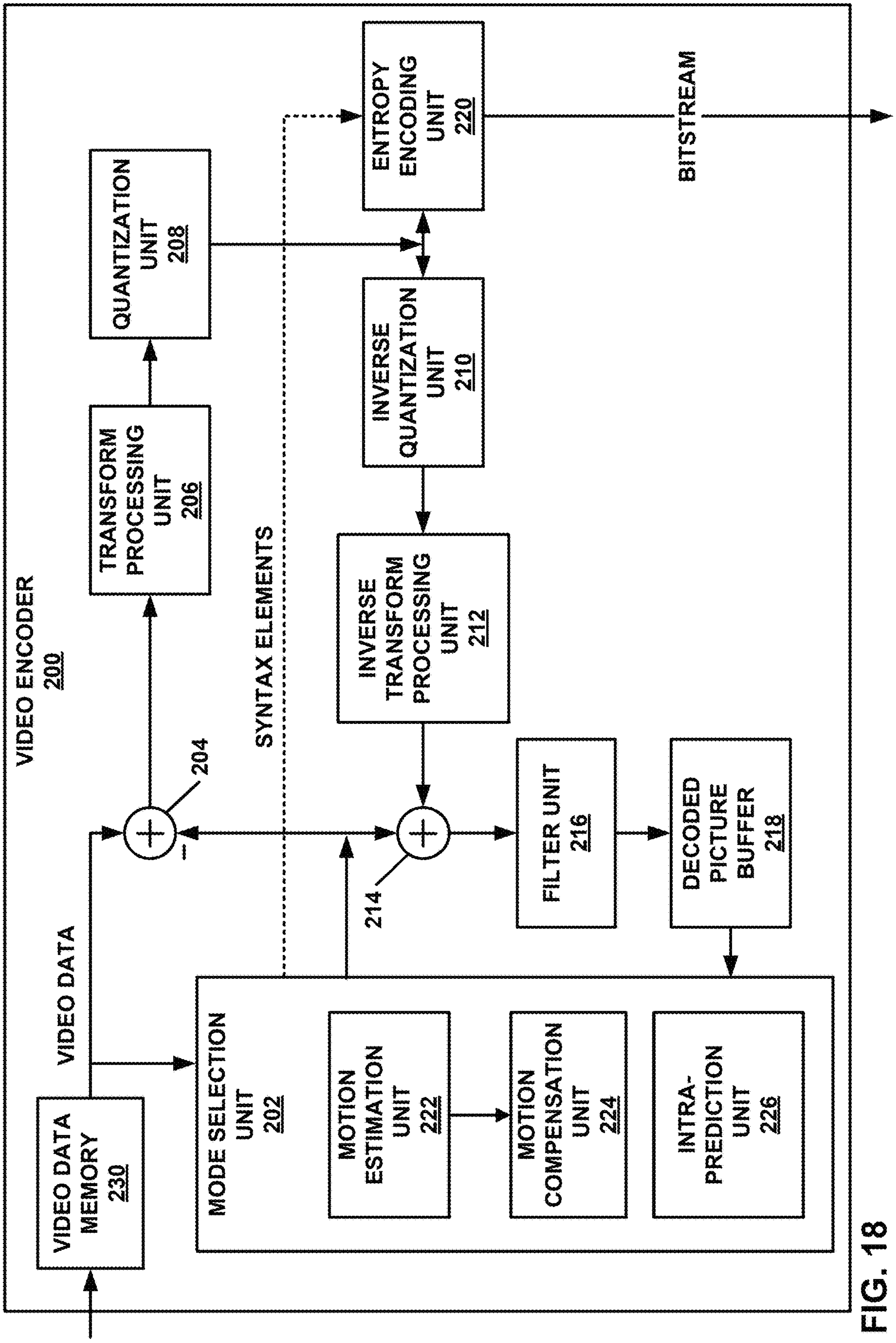
FIG. 18 is a block diagram illustrating an example video encoder that may perform the techniques of this disclosure.

FIG. 18 is a block diagram illustrating an example video encoder 200 that may perform the techniques of this disclosure. FIG. 18 is provided for purposes of explanation and should not be considered limiting of the techniques as broadly exemplified and described in this disclosure. For purposes of explanation, this disclosure describes video encoder 200 according to the techniques of VVC and HEVC. However, the techniques of this disclosure may be performed by video encoding devices that are configured to other video coding standards and video coding formats, such as AV1 and successors to the AV1 video coding format.

In the example of FIG. 18, video encoder 200 includes video data memory 230, mode selection unit 202, residual generation unit 204, transform processing unit 206, quantization unit 208, inverse quantization unit 210, inverse transform processing unit 212, reconstruction unit 214, filter unit 216, decoded picture buffer (DPB) 218, and entropy encoding unit 220. Any or all of video data memory 230, mode selection unit 202, residual generation unit 204, transform processing unit 206, quantization unit 208, inverse quantization unit 210, inverse transform processing unit 212, reconstruction unit 214, filter unit 216, DPB 218, and entropy encoding unit 220 may be implemented in one or more processors or in processing circuitry. For instance, the units of video encoder 200 may be implemented as one or more circuits or logic elements as part of hardware circuitry, or as part of a processor, ASIC, or FPGA. Moreover, video encoder 200 may include additional or alternative processors or processing circuitry to perform these and other functions.

Video data memory 230 is an example of a memory system that may store video data to be encoded by the components of video encoder 200. Video encoder 200 may receive the video data stored in video data memory 230 from, for example, video source 104 (FIG. 1). DPB 218 is an example of a memory system that may act as a reference picture memory that stores reference video data for use in prediction of subsequent video data by video encoder 200. Video data memory 230 and DPB 218 may each be formed by any of a variety of one or more memory devices or memory units, such as dynamic random access memory (DRAM), including synchronous DRAM (SDRAM), magnetoresistive RAM (MRAM), resistive RAM (RRAM), or other types of memory devices. Video data memory 230 and DPB 218 may be provided by the same memory device or separate memory devices. In various examples, video data memory 230 may be on-chip with other components of video encoder 200, as illustrated, or off-chip relative to those components.

In this disclosure, reference to video data memory 230 should not be interpreted as being limited to memory internal to video encoder 200, unless specifically described as such, or memory external to video encoder 200, unless specifically described as such. Rather, reference to video data memory 230 should be understood as reference memory that stores video data that video encoder 200 receives for encoding (e.g., video data for a current block that is to be encoded). Memory 106 of FIG. 1 may also provide temporary storage of outputs from the various units of video encoder 200.

The various units of FIG. 18 are illustrated to assist with understanding the operations performed by video encoder 200. The units may be implemented as fixed-function circuits, programmable circuits, or a combination thereof. Fixed-function circuits refer to circuits that provide particular functionality, and are preset on the operations that can be performed. Programmable circuits refer to circuits that can be programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, one or more of the units may be distinct circuit blocks (fixed-function or programmable), and in some examples, one or more of the units may be integrated circuits.

Video encoder 200 may include arithmetic logic units (ALUs), elementary function units (EFUs), digital circuits, analog circuits, and/or programmable cores, formed from programmable circuits. In examples where the operations of video encoder 200 are performed using software executed by the programmable circuits, memory 106 (FIG. 1) may store the instructions (e.g., object code) of the software that video encoder 200 receives and executes, or another memory within video encoder 200 (not shown) may store such instructions.

Video data memory 230 is configured to store received video data. Video encoder 200 may retrieve a picture of the video data from video data memory 230 and provide the video data to residual generation unit 204 and mode selection unit 202. Video data in video data memory 230 may be raw video data that is to be encoded.

Mode selection unit 202 includes a motion estimation unit 222, a motion compensation unit 224, and an intra-prediction unit 226. Mode selection unit 202 may include additional functional units to perform video prediction in accordance with other prediction modes. As examples, mode selection unit 202 may include a palette unit, an intra-block copy unit (which may be part of motion estimation unit 222 and/or motion compensation unit 224), an affine unit, a linear model (LM) unit, or the like.

Mode selection unit 202 generally coordinates multiple encoding passes to test combinations of encoding parameters and resulting rate-distortion values for such combinations. The encoding parameters may include partitioning of CTUs into CUs, prediction modes for the CUs, transform types for residual data of the CUS, quantization parameters for residual data of the CUs, and so on. Mode selection unit 202 may ultimately select the combination of encoding parameters having rate-distortion values that are better than the other tested combinations.

Video encoder 200 may partition a picture retrieved from video data memory 230 into a series of CTUs, and encapsulate one or more CTUs within a slice. Mode selection unit 202 may partition a CTU of the picture in accordance with a tree structure, such as the MTT structure, QTBT structure. superblock structure, or the quad-tree structure described above. As described above, video encoder 200 may form one or more CUs from partitioning a CTU according to the tree structure. Such a CU may also be referred to generally as a "video block" or "block."

In general, mode selection unit 202 also controls the components thereof (e.g., motion estimation unit 222, motion compensation unit 224, and intra-prediction unit 226) to generate a prediction block for a current block (e.g., a current CU, or in HEVC, the overlapping portion of a PU and a TU). For inter-prediction of a current block, motion estimation unit 222 may perform a motion search to identify one or more closely matching reference blocks in one or more reference pictures (e.g., one or more previously coded pictures stored in DPB 218). In particular, motion estimation unit 222 may calculate a value representative of how similar a potential reference block is to the current block, e.g., according to sum of absolute difference (SAD), sum of squared differences (SSD), mean absolute difference (MAD), mean squared differences (MSD), or the like. Motion estimation unit 222 may generally perform these calculations using sample-by-sample differences between the current block and the reference block being considered. Motion estimation unit 222 may identify a reference block having a lowest value resulting from these calculations, indicating a reference block that most closely matches the current block.

Motion estimation unit 222 may form one or more motion vectors (MVs) that defines the positions of the reference blocks in the reference pictures relative to the position of the current block in a current picture. Motion estimation unit 222 may then provide the motion vectors to motion compensation unit 224. For example, for uni-directional inter-prediction, motion estimation unit 222 may provide a single motion vector, whereas for bi-directional inter-prediction, motion estimation unit 222 may provide two motion vectors. Motion compensation unit 224 may then generate a prediction block using the motion vectors. For example, motion compensation unit 224 may retrieve data of the reference block using the motion vector. As another example, if the motion vector has fractional sample precision, motion compensation unit 224 may interpolate values for the prediction block according to one or more interpolation filters. Moreover, for bi-directional inter-prediction, motion compensation unit 224 may retrieve data for two reference blocks identified by respective motion vectors and combine the retrieved data, e.g., through sample-by-sample averaging or weighted averaging.

When operating according to the AV1 video coding format, motion estimation unit 222 and motion compensation unit 224 may be configured to encode coding blocks of video data (e.g., both luma and chroma coding blocks) using translational motion compensation, affine motion compensation, overlapped block motion compensation (OBMC), and/or compound inter-intra prediction.

As another example, for intra-prediction, or intra-prediction coding, intra-prediction unit 226 may generate the prediction block from samples neighboring the current block. For example, for directional modes, intra-prediction unit 226 may generally mathematically combine values of neighboring samples and populate these calculated values in the defined direction across the current block to produce the prediction block. As another example, for DC mode, intra-prediction unit 226 may calculate an average of the neighboring samples to the current block and generate the prediction block to include this resulting average for each sample of the prediction block.

When operating according to the AV1 video coding format, intra-prediction unit 226 may be configured to encode coding blocks of video data (e.g., both luma and chroma coding blocks) using directional intra prediction, non-directional intra prediction, recursive filter intra prediction, chroma-from-luma (CFL) prediction, intra block copy (IBC), and/or color palette mode. Mode selection unit 202 may include additional functional units to perform video prediction in accordance with other prediction modes.

Mode selection unit 202 provides the prediction block to residual generation unit 204. Residual generation unit 204 receives a raw, unencoded version of the current block from video data memory 230 and the prediction block from mode selection unit 202. Residual generation unit 204 calculates sample-by-sample differences between the current block and the prediction block. The resulting sample-by-sample differences define a residual block for the current block. In some examples, residual generation unit 204 may also determine differences between sample values in the residual block to generate a residual block using residual differential pulse code modulation (RDPCM). In some examples, residual generation unit 204 may be formed using one or more subtractor circuits that perform binary subtraction.

In examples where mode selection unit 202 partitions CUs into PUs, each PU may be associated with a luma prediction unit and corresponding chroma prediction units. Video encoder 200 and video decoder 300 may support PUs having various sizes. As indicated above, the size of a CU may refer to the size of the luma coding block of the CU and the size of a PU may refer to the size of a luma prediction unit of the PU. Assuming that the size of a particular CU is 2N×2N, video encoder 200 may support PU sizes of 2N×2N or N×N for intra prediction, and symmetric PU sizes of 2N×2N, 2N×N, N×2N, N×N, or similar for inter prediction. Video encoder 200 and video decoder 300 may also support asymmetric partitioning for PU sizes of 2N×nU, 2N×nD, nL×2N, and nR×2N for inter prediction.

In examples where mode selection unit 202 does not further partition a CU into PUs, each CU may be associated with a luma coding block and corresponding chroma coding blocks. As above, the size of a CU may refer to the size of the luma coding block of the CU. The video encoder 200 and video decoder 300 may support CU sizes of 2N×2N, 2N×N, or N×2N.

For other video coding techniques such as an intra-block copy mode coding, an affine-mode coding, and linear model (LM) mode coding, as some examples, mode selection unit 202, via respective units associated with the coding techniques, generates a prediction block for the current block being encoded. In some examples, such as palette mode coding, mode selection unit 202 may not generate a prediction block, and instead generate syntax elements that indicate the manner in which to reconstruct the block based on a selected palette. In such modes, mode selection unit 202 may provide these syntax elements to entropy encoding unit 220 to be encoded.

As described above, residual generation unit 204 receives the video data for the current block and the corresponding prediction block. Residual generation unit 204 then generates a residual block for the current block. To generate the residual block, residual generation unit 204 calculates sample-by-sample differences between the prediction block and the current block.

Transform processing unit 206 applies one or more transforms to the residual block to generate a block of transform coefficients (referred to herein as a "transform coefficient block"). Transform processing unit 206 may apply various transforms to a residual block to form the transform coefficient block. For example, transform processing unit 206 may apply a discrete cosine transform (DCT), a directional transform, a Karhunen-Loeve transform (KLT), or a conceptually similar transform to a residual block. In some examples, transform processing unit 206 may perform multiple transforms to a residual block, e.g., a primary transform and a secondary transform, such as a rotational transform. In some examples, transform processing unit 206 does not apply transforms to a residual block.

When operating according to AV1, transform processing unit 206 may apply one or more transforms to the residual block to generate a block of transform coefficients (referred to herein as a "transform coefficient block"). Transform processing unit 206 may apply various transforms to a residual block to form the transform coefficient block. For example, transform processing unit 206 may apply a horizontal/vertical transform combination that may include a discrete cosine transform (DCT), an asymmetric discrete sine transform (ADST), a flipped ADST (e.g., an ADST in reverse order), and an identity transform (IDTX). When using an identity transform, the transform is skipped in one of the vertical or horizontal directions. In some examples, transform processing may be skipped.

Quantization unit 208 may quantize the transform coefficients in a transform coefficient block, to produce a quantized transform coefficient block. Quantization unit 208 may quantize transform coefficients of a transform coefficient block according to a quantization parameter (QP) value associated with the current block. Video encoder 200 (e.g., via mode selection unit 202) may adjust the degree of quantization applied to the transform coefficient blocks associated with the current block by adjusting the QP value associated with the CU. Quantization may introduce loss of information, and thus, quantized transform coefficients may have lower precision than the original transform coefficients produced by transform processing unit 206.

Inverse quantization unit 210 and inverse transform processing unit 212 may apply inverse quantization and inverse transforms to a quantized transform coefficient block, respectively, to reconstruct a residual block from the transform coefficient block. Reconstruction unit 214 may produce a reconstructed block corresponding to the current block (albeit potentially with some degree of distortion) based on the reconstructed residual block and a prediction block generated by mode selection unit 202. For example, reconstruction unit 214 may add samples of the reconstructed residual block to corresponding samples from the prediction block generated by mode selection unit 202 to produce the reconstructed block.

Filter unit 216 may perform one or more filter operations on reconstructed blocks. For example, filter unit 216 may perform deblocking operations to reduce blockiness artifacts along edges of CUs. Operations of filter unit 216 may be skipped, in some examples.

When operating according to AV1, filter unit 216 may perform one or more filter operations on reconstructed blocks. For example, filter unit 216 may perform deblocking operations to reduce blockiness artifacts along edges of CUs. In other examples, filter unit 216 may apply a constrained directional enhancement filter (CDEF), which may be applied after deblocking, and may include the application of non-separable, non-linear, low-pass directional filters based on estimated edge directions. Filter unit 216 may also include a loop restoration filter, which is applied after CDEF, and may include a separable symmetric normalized Wiener filter or a dual self-guided filter.

Video encoder 200 stores reconstructed blocks in DPB 218. For instance, in examples where operations of filter unit 216 are not performed, reconstruction unit 214 may store reconstructed blocks to DPB 218. In examples where operations of filter unit 216 are performed, filter unit 216 may store the filtered reconstructed blocks to DPB 218. Motion estimation unit 222 and motion compensation unit 224 may retrieve a reference picture from DPB 218, formed from the reconstructed (and potentially filtered) blocks, to inter-predict blocks of subsequently encoded pictures. In addition, intra-prediction unit 226 may use reconstructed blocks in DPB 218 of a current picture to intra-predict other blocks in the current picture.

In general, entropy encoding unit 220 may entropy encode syntax elements received from other functional components of video encoder 200. For example, entropy encoding unit 220 may entropy encode quantized transform coefficient blocks from quantization unit 208. As another example, entropy encoding unit 220 may entropy encode prediction syntax elements (e.g., motion information for inter-prediction or intra-mode information for intra-prediction) from mode selection unit 202. Entropy encoding unit 220 may perform one or more entropy encoding operations on the syntax elements, which are another example of video data, to generate entropy-encoded data. For example, entropy encoding unit 220 may perform a context-adaptive variable length coding (CAVLC) operation, a CABAC operation, a variable-to-variable (V2V) length coding operation, a syntax-based context-adaptive binary arithmetic coding (SBAC) operation, a Probability Interval Partitioning Entropy (PIPE) coding operation, an Exponential-Golomb encoding operation, or another type of entropy encoding operation on the data. In some examples, entropy encoding unit 220 may operate in bypass mode where syntax elements are not entropy encoded.

Video encoder 200 may output a bitstream that includes the entropy encoded syntax elements needed to reconstruct blocks of a slice or picture. In particular, entropy encoding unit 220 may output the bitstream.

In accordance with AV1, entropy encoding unit 220 may be configured as a symbol-to-symbol adaptive multi-symbol arithmetic coder. A syntax element in AV1 includes an alphabet of N elements, and a context (e.g., probability model) includes a set of N probabilities. Entropy encoding unit 220 may store the probabilities as n-bit (e.g., 15-bit) cumulative distribution functions (CDFs). Entropy encoding unit 220 may perform recursive scaling, with an update factor based on the alphabet size, to update the contexts.

The operations described above are described with respect to a block. Such description should be understood as being operations for a luma coding block and/or chroma coding blocks. As described above, in some examples, the luma coding block and chroma coding blocks are luma and chroma components of a CU. In some examples, the luma coding block and the chroma coding blocks are luma and chroma components of a PU.

In some examples, operations performed with respect to a luma coding block need not be repeated for the chroma coding blocks. As one example, operations to identify a motion vector (MV) and reference picture for a luma coding block need not be repeated for identifying a MV and reference picture for the chroma blocks. Rather, the MV for the luma coding block may be scaled to determine the MV for the chroma blocks, and the reference picture may be the same. As another example, the intra-prediction process may be the same for the luma coding block and the chroma coding blocks.

Video encoder 200 represents an example of a device configured to encode video data including one or more memories configured to store video data, and one or more processors implemented in circuitry and configured to: determine a first search area in a first reference picture for a current block of the video data; determine a first initial reference block in the first search area; apply a first local illumination compensation (LIC) model to the first search area to generate a refined first search area; apply template matching to the refined first search area to determine a first candidate motion vector having a lowest template matching cost for the refined first search area; and code the current block based on the first candidate motion vector.

Figure 19:
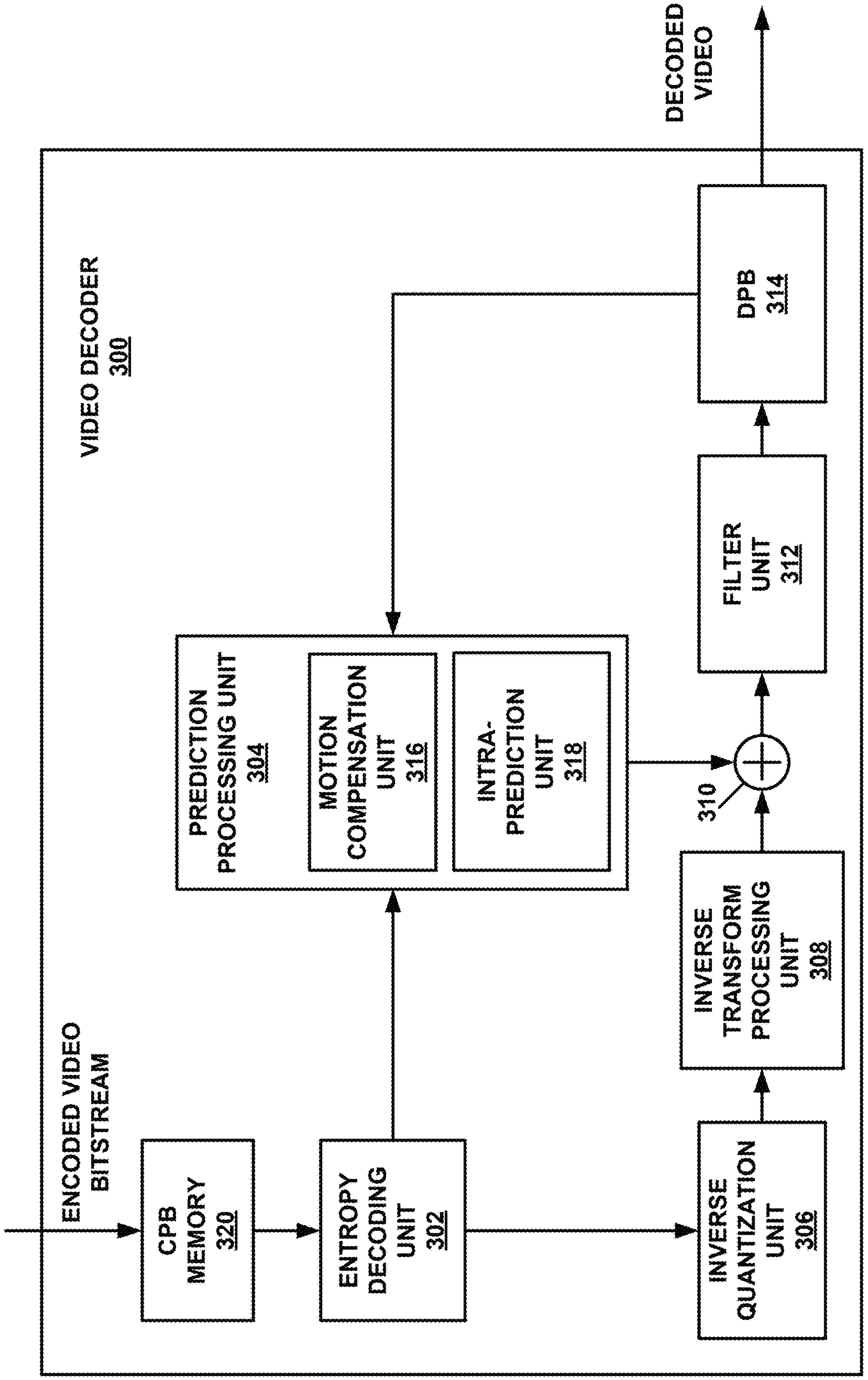
FIG. 19 is a block diagram illustrating an example video decoder that may perform the techniques of this disclosure.

FIG. 19 is a block diagram illustrating an example video decoder 300 that may perform the techniques of this disclosure. FIG. 19 is provided for purposes of explanation and is not limiting on the techniques as broadly exemplified and described in this disclosure. For purposes of explanation, this disclosure describes video decoder 300 according to the techniques of VVC and HEVC. However, the techniques of this disclosure may be performed by video coding devices that are configured to other video coding standards.

In the example of FIG. 19, video decoder 300 includes coded picture buffer (CPB) memory 320, entropy decoding unit 302, prediction processing unit 304, inverse quantization unit 306, inverse transform processing unit 308, reconstruction unit 310, filter unit 312, and DPB 314. Any or all of CPB memory 320, entropy decoding unit 302, prediction processing unit 304, inverse quantization unit 306, inverse transform processing unit 308, reconstruction unit 310, filter unit 312, and DPB 314 may be implemented in one or more processors or in processing circuitry. For instance, the units of video decoder 300 may be implemented as one or more circuits or logic elements as part of hardware circuitry, or as part of a processor, ASIC, or FPGA. Moreover, video decoder 300 may include additional or alternative processors or processing circuitry to perform these and other functions.

Prediction processing unit 304 includes motion compensation unit 316 and intra-prediction unit 318. Prediction processing unit 304 may include additional units to perform prediction in accordance with other prediction modes. As examples, prediction processing unit 304 may include a palette unit, an intra-block copy unit (which may form part of motion compensation unit 316), an affine unit, a linear model (LM) unit, or the like. In other examples, video decoder 300 may include more, fewer, or different functional components.

When operating according to AV1, motion compensation unit 316 may be configured to decode coding blocks of video data (e.g., both luma and chroma coding blocks) using translational motion compensation, affine motion compensation, OBMC, and/or compound inter-intra prediction, as described above. Intra-prediction unit 318 may be configured to decode coding blocks of video data (e.g., both luma and chroma coding blocks) using directional intra prediction, non-directional intra prediction, recursive filter intra prediction, CFL, IBC, and/or color palette mode, as described above.

CPB memory 320 is an example of a memory system that may store video data, such as an encoded video bitstream, to be decoded by the components of video decoder 300. The video data stored in CPB memory 320 may be obtained, for example, from computer-readable medium 110 (FIG. 1). CPB memory 320 may include a CPB that stores encoded video data (e.g., syntax elements) from an encoded video bitstream. Also, CPB memory 320 may store video data other than syntax elements of a coded picture, such as temporary data representing outputs from the various units of video decoder 300. DPB 314 is an example of a memory system that generally stores decoded pictures, which video decoder 300 may output and/or use as reference video data when decoding subsequent data or pictures of the encoded video bitstream. CPB memory 320 and DPB 314 may each be formed by any of a variety of memory devices or memory units, such as DRAM, including SDRAM, MRAM, RRAM, or other types of memory devices. CPB memory 320 and DPB 314 may be provided by the same memory device or separate memory devices. In various examples, CPB memory 320 may be on-chip with other components of video decoder 300, or off-chip relative to those components.

Additionally or alternatively, in some examples, video decoder 300 may retrieve coded video data from memory 120 (FIG. 1). That is, memory 120 may store data as discussed above with CPB memory 320. Likewise, memory 120 may store instructions to be executed by video decoder 300, when some or all of the functionality of video decoder 300 is implemented in software to be executed by processing circuitry of video decoder 300.

The various units shown in FIG. 19 are illustrated to assist with understanding the operations performed by video decoder 300. The units may be implemented as fixed-function circuits, programmable circuits, or a combination thereof. Similar to FIG. 18, fixed-function circuits refer to circuits that provide particular functionality, and are preset on the operations that can be performed. Programmable circuits refer to circuits that can be programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, one or more of the units may be distinct circuit blocks (fixed-function or programmable), and in some examples, one or more of the units may be integrated circuits.

Video decoder 300 may include ALUs, EFUs, digital circuits, analog circuits, and/or programmable cores formed from programmable circuits. In examples where the operations of video decoder 300 are performed by software executing on the programmable circuits, on-chip or off-chip memory may store instructions (e.g., object code) of the software that video decoder 300 receives and executes.

Entropy decoding unit 302 may receive encoded video data from the CPB and entropy decode the video data to reproduce syntax elements. Prediction processing unit 304, inverse quantization unit 306, inverse transform processing unit 308, reconstruction unit 310, and filter unit 312 may generate decoded video data based on the syntax elements extracted from the bitstream.

In general, video decoder 300 reconstructs a picture on a block-by-block basis. Video decoder 300 may perform a reconstruction operation on each block individually (where the block currently being reconstructed, i.e., decoded, may be referred to as a “current block”).

Entropy decoding unit 302 may entropy decode syntax elements defining quantized transform coefficients of a quantized transform coefficient block, as well as transform information, such as a quantization parameter (QP) and/or transform mode indication(s). Inverse quantization unit 306 may use the QP associated with the quantized transform coefficient block to determine a degree of quantization and, likewise, a degree of inverse quantization for inverse quantization unit 306 to apply. Inverse quantization unit 306 may, for example, perform a bitwise left-shift operation to inverse quantize the quantized transform coefficients. Inverse quantization unit 306 may thereby form a transform coefficient block including transform coefficients.

After inverse quantization unit 306 forms the transform coefficient block, inverse transform processing unit 308 may apply one or more inverse transforms to the transform coefficient block to generate a residual block associated with the current block. For example, inverse transform processing unit 308 may apply an inverse DCT, an inverse integer transform, an inverse Karhunen-Loeve transform (KLT), an inverse rotational transform, an inverse directional transform, or another inverse transform to the transform coefficient block.

Furthermore, prediction processing unit 304 generates a prediction block according to prediction information syntax elements that were entropy decoded by entropy decoding unit 302. For example, if the prediction information syntax elements indicate that the current block is inter-predicted, motion compensation unit 316 may generate the prediction block. In this case, the prediction information syntax elements may indicate a reference picture in DPB 314 from which to retrieve a reference block, as well as a motion vector identifying a location of the reference block in the reference picture relative to the location of the current block in the current picture. Motion compensation unit 316 may generally perform the inter-prediction process in a manner that is substantially similar to that described with respect to motion compensation unit 224 (FIG. 18).

As another example, if the prediction information syntax elements indicate that the current block is intra-predicted, intra-prediction unit 318 may generate the prediction block according to an intra-prediction mode indicated by the prediction information syntax elements. Again, intra-prediction unit 318 may generally perform the intra-prediction process in a manner that is substantially similar to that described with respect to intra-prediction unit 226 (FIG. 18). Intra-prediction unit 318 may retrieve data of neighboring samples to the current block from DPB 314.

Reconstruction unit 310 may reconstruct the current block using the prediction block and the residual block. For example, reconstruction unit 310 may add samples of the residual block to corresponding samples of the prediction block to reconstruct the current block.

Filter unit 312 may perform one or more filter operations on reconstructed blocks. For example, filter unit 312 may perform deblocking operations to reduce blockiness artifacts along edges of the reconstructed blocks. Operations of filter unit 312 are not necessarily performed in all examples.

Video decoder 300 may store the reconstructed blocks in DPB 314. For instance, in examples where operations of filter unit 312 are not performed, reconstruction unit 310 may store reconstructed blocks to DPB 314. In examples where operations of filter unit 312 are performed, filter unit 312 may store the filtered reconstructed blocks to DPB 314. As discussed above, DPB 314 may provide reference information, such as samples of a current picture for intra-prediction and previously decoded pictures for subsequent motion compensation, to prediction processing unit 304. Moreover, video decoder 300 may output decoded pictures (e.g., decoded video) from DPB 314 for subsequent presentation on a display device, such as display device 118 of FIG. 1.

In this manner, video decoder 300 represents an example of a video decoding device including one or more memories configured to store video data, and one or more processors implemented in circuitry and configured to determine a first search area in a first reference picture for a current block of the video data; determine a first initial reference block in the first search area; apply a first local illumination compensation (LIC) model to the first search area to generate a refined first search area; apply template matching to the refined first search area to determine a first candidate motion vector having a lowest template matching cost for the refined first search area; and decode the current block based on the first candidate motion vector.

Figure 20:
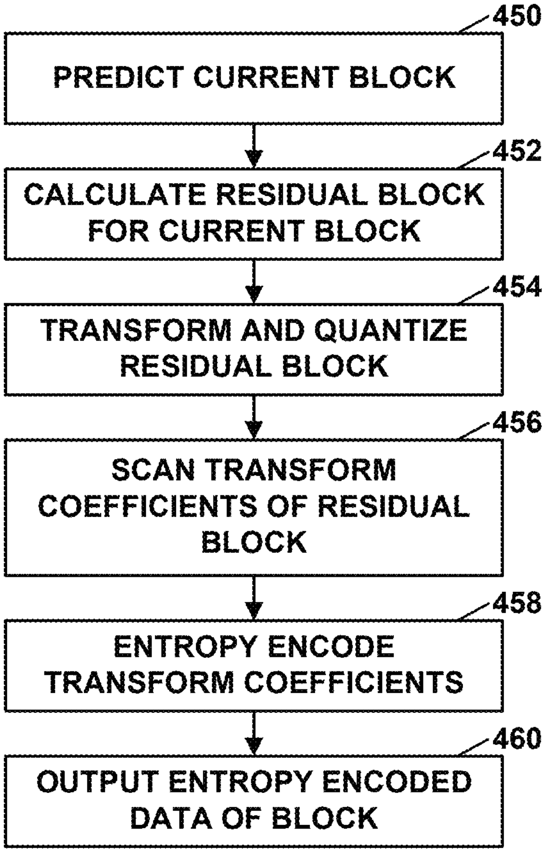
FIG. 20 is a flowchart illustrating an example method for encoding a current block in accordance with the techniques of this disclosure.

FIG. 20 is a flowchart illustrating an example method for encoding a current block in accordance with the techniques of this disclosure. The current block may be or include a current CU. Although described with respect to video encoder 200 (FIGS. 1 and 18), it should be understood that other devices may be configured to perform a method similar to that of FIG. 20.

In this example, video encoder 200 initially predicts the current block (450). For example, video encoder 200 may form a prediction block for the current block. Video encoder 200 may then calculate a residual block for the current block (452). To calculate the residual block, video encoder 200 may calculate a difference between the original, unencoded block and the prediction block for the current block. Video encoder 200 may then transform the residual block and quantize transform coefficients of the residual block (454). Next, video encoder 200 may scan the quantized transform coefficients of the residual block (456). During the scan, or following the scan, video encoder 200 may entropy encode the transform coefficients (458). For example, video encoder 200 may encode the transform coefficients using CAVLC or CABAC. Video encoder 200 may then output the entropy encoded data of the block (460).

Figure 21:
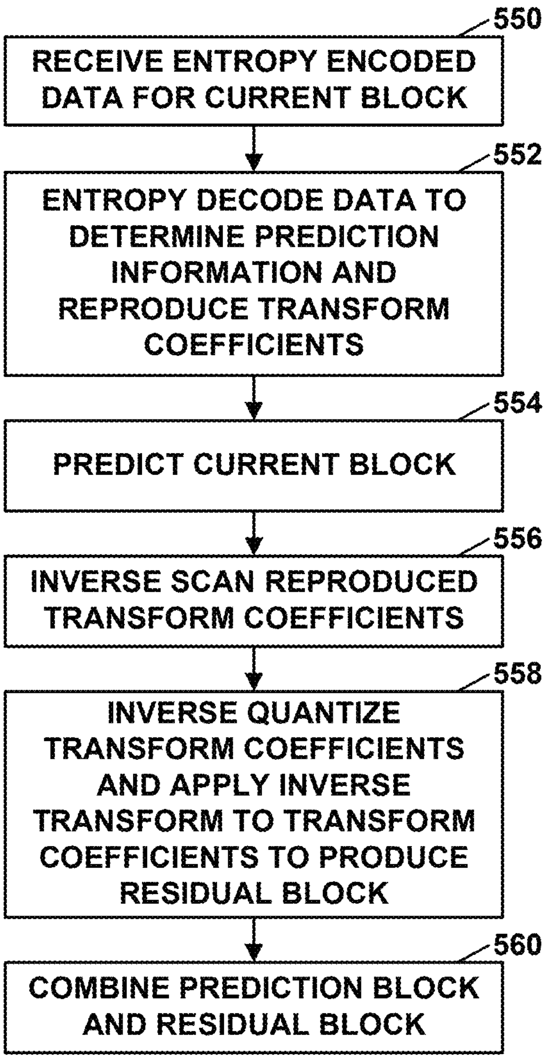
FIG. 21 is a flowchart illustrating an example method for decoding a current block in accordance with the techniques of this disclosure.

FIG. 21 is a flowchart illustrating an example method for decoding a current block of video data in accordance with the techniques of this disclosure. The current block may be or include a current CU. Although described with respect to video decoder 300 (FIGS. 1 and 19, it should be understood that other devices may be configured to perform a method similar to that of FIG. 21.

Video decoder 300 may receive entropy encoded data for the current block, such as entropy encoded prediction information and entropy encoded data for transform coefficients of a residual block corresponding to the current block (550). Video decoder 300 may entropy decode the entropy encoded data to determine prediction information for the current block and to reproduce transform coefficients of the residual block (552). Video decoder 300 may predict the current block (554), e.g., using an intra- or inter-prediction mode as indicated by the prediction information for the current block, to calculate a prediction block for the current block. Video decoder 300 may then inverse scan the reproduced transform coefficients (556), to create a block of quantized transform coefficients. Video decoder 300 may then inverse quantize the transform coefficients and apply an inverse transform to the transform coefficients to produce a residual block (558). Video decoder 300 may ultimately decode the current block by combining the prediction block and the residual block (560).

The following numbered clauses illustrate one or more aspects of the devices and techniques described in this disclosure.

Clause 1A. A method of coding video data, the method comprising: determining a first search area in a first reference picture for a current block of the video data, a size of the first search area being larger than a size of the current block; determining a first initial reference block in the first search area; determining a second search area in a second reference picture for the current block of the video data, a size of the second search area being larger than the size of the current block; determining a second initial reference block in the second search area; and coding the current block based on the first initial reference block and the second initial reference block.

Clause 2A. The method of clause 1A, wherein the first initial reference block is at a center of the first search area and the second initial reference block is at a center of the second search area.

Clause 3A. The method of clause 1A or clause 2A, wherein the current block comprises a coding block or a subblock of a coding block.

Clause 4A. The method of any of clauses 1A-3A, further comprising: determining a first luma illuminance compensation (LIC) model based on reconstructed neighbor samples of the current block; and applying the first LIC model to the first search area.

Clause 5A. The method of any of clauses 1A-4A, further comprising: determining a second luma illuminance compensation (LIC) model based on reconstructed neighbor samples of the current block; and applying the second LIC model to the second search area.

Clause 6A. The method of clause 5A, wherein the first LIC model and the second LIC model are identical or different.

Clause 7A. The method of any of clauses 1A-3A, further comprising: determining a model based on minimizing a difference between a template matching cost of a template of the first search area and a template of the second search area; and applying the model to the first search area and the second search area.

Clause 8A. The method of clause 7A, wherein the model is a luma illumination compensation model.

Clause 9A. The method of any of clauses 1A-8A, further comprising: refining the first search area; and refining the second search area.

Clause 10A. The method of any of clauses 1A-9A, further comprising: applying a first smoothing filter to refine the first search area; and applying a second smoothing filter to refine the second search area, wherein the first smoothing filter and the second smoothing filter are identical or different.

Clause 11A. The method of clause 10A, wherein the first smoothing filter is based on complexity of content in the first search area.

Clause 12A. The method of any of clauses 1A-11A, further comprising: determining that one or more conditions are satisfied; and based on the one or more conditions being satisfied, coding the current block based on the first initial reference block and the second initial reference block.

Clause 13A. The method of any of clauses 1A-12A, wherein coding comprises decoding.

Clause 14A. The method of any of clauses 1A-13A, wherein coding comprises encoding.

Clause 15A. A device for coding video data, the device comprising one or more means for performing the method of any of clauses 1A-14A.

Clause 16A. The device of clause 15A, wherein the one or more means comprise one or more processors implemented in circuitry.

Clause 17A. The device of any of clauses 15A and 16A, further comprising a memory to store the video data.

Clause 18A. The device of any of clauses 15A-17A, further comprising a display configured to display decoded video data.

Clause 19A. The device of any of clauses 15A-18A, wherein the device comprises one or more of a camera, a computer, a mobile device, a broadcast receiver device, or a set-top box.

Clause 20A. The device of any of clauses 15A-19A, wherein the device comprises a video decoder.

Clause 21A. The device of any of clauses 15A-20A, wherein the device comprises a video encoder.

Clause 22A. A computer-readable storage medium having stored thereon instructions that, when executed, cause one or more processors to perform the method of any of clauses 1A-14A.

Clause 1B. A method of decoding video data, the method comprising: determining a first search area in a first reference picture for a current block of the video data; determining a first initial reference block in the first search area; applying a first local illumination compensation (LIC) model to the first search area to generate a refined first search area; applying template matching to the refined first search area to determine a first candidate motion vector having a lowest template matching cost for the refined first search area; and decoding the current block based on the first candidate motion vector.

Clause 2B. The method of clause 1B, further comprising determining to decode the current block using decoder side motion vector refinement.

Clause 3B. The method of clause 1B or clause 2B, further comprising determining the first LIC model based on reconstructed neighbor samples of the current block.

Clause 4B. The method of any of clauses 1B-3B, wherein applying template matching comprises determining the first candidate motion vector having the lowest template matching cost for the refined first search area between a first reference template in the first reference picture and a reconstructed template in a current picture, the current picture comprising the current block.

Clause 5B. The method of any of clauses 1B-3B, wherein applying template matching comprises determining the first candidate motion vector having the lowest template matching cost for the refined first search area between a first reference template in the first reference picture and a second reference template in a second reference picture.

Clause 6B. The method of clause 5B, wherein the first reference picture comprises a list 0 (L0) reference picture, the method further comprising: determining a second search area in a second reference picture for a current block of the video data, the second reference picture comprising a list 1 (L1) reference picture; determining a second initial reference block in the second search area; applying a second LIC model to the second search area to generate a refined second search area; applying template matching to the refined second search area to determining a second candidate motion vector having a lowest template matching cost for the refined second search area; and decoding the current block based on the first candidate motion vector and the second candidate motion vector.

Clause 7B. The method of clause 6B, further comprising: determining a minimum difference between a L0 template prediction and an L1 template prediction; and determining at least one of the first LIC model or the second LIC model based on the minimum difference.

Clause 8B. The method of any of clauses 1B-7B, wherein applying the first LIC model comprises determining a LIC template, the LIC template comprising an above template and a left template.

Clause 9B. The method of any of clauses 1B-8B, wherein the applying the first LIC model comprises determining a LIC template, the LIC template comprising a rectangular block.

Clause 10B. The method of any of clauses 1B-9B, wherein the first LIC model comprises a smoothing filter configured to remove high frequencies from the first search area.

Clause 11B. The method of any of clauses 1B-10B, further comprising encoding the current block prior to decoding the current block.

Clause 12B. A device for decoding video data, the device comprising: one or more memories configured to store the video data; and one or more processors, the one or more processors communicatively coupled to the one or more memories and configured to: determine a first search area in a first reference picture for a current block of the video data; determine a first initial reference block in the first search area; apply a first local illumination compensation (LIC) model to the first search area to generate a refined first search area; apply template matching to the refined first search area to determine a first candidate motion vector having a lowest template matching cost for the refined first search area; and decode the current block based on the first candidate motion vector.

Clause 13B. The device of clause 12B, wherein the one or more processors are further configured to determine to decode the current block using decoder side motion vector refinement.

Clause 14B. The device of clause 12B or clause 13B, wherein the one or more processors are further configured to determine the first LIC model based on reconstructed neighbor samples of the current block.

Clause 15B. The device of any of clauses 12B-14B, wherein to apply template matching, the one or more processors are configured to determine the first candidate motion vector having the lowest template matching cost for the refined first search area between a first reference template in the first reference picture and a reconstructed template in a current picture, the current picture comprising the current block.

Clause 16B. The device of any of clauses 12B-14B, wherein to apply template matching, the one or more processors are configured to determine the first candidate motion vector having the lowest template matching cost for the refined first search area between a first reference template in the first reference picture and a second reference template in a second reference picture.

Clause 17B. The device of clause 16B, wherein the first reference picture comprises a list 0 (L0) reference picture, and wherein the one or more processors are further configured to: determine a second search area in a second reference picture for a current block of the video data, the second reference picture comprising a list 1 (L1) reference picture; determine a second initial reference block in the second search area; apply a second LIC model to the second search area to generate a refined second search area; apply template matching to the refined second search area to determining a second candidate motion vector having a lowest template matching cost for the refined second search area; and decode the current block based on the first candidate motion vector and the second candidate motion vector.

Clause 18B. The device of clause 17B, wherein the one or more processors are further configured to: determine a minimum difference between a L0 template prediction and an L1 template prediction; and determine at least one of the first LIC model or the second LIC model based on the minimum difference.

Clause 19B. The device of any of clauses 12B-18B, wherein to apply the first LIC model, the one or more processors are configured to determine a LIC template, the LIC template comprising an above template and a left template.

Clause 20B. The device of any of clauses 12B-19B, wherein to apply the first LIC model, the one or more processors are configured to determine a LIC template, the LIC template comprising a rectangular block.

Clause 21B. The device of any of clauses 12B-20B, wherein the first LIC model comprises a smoothing filter configured to remove high frequencies from the first search area.

Clause 22B. The device of any of clauses 12B-21B, further comprising a display configured to display decoded video data.

Clause 23B. The device of any of clauses 12B-22B, wherein the one or more processors are further configured to encode the current block prior to decoding the current block.

Clause 24B. A device for decoding video data, the device comprising: means for determining a first search area in a first reference picture for a current block of the video data; means for determining a first initial reference block in the first search area; means for applying a first local illumination compensation (LIC) model to the first search area to generate a refined first search area; means for applying template matching to the refined first search area to determine a first candidate motion vector having a lowest template matching cost for the refined first search area; and means for decoding the current block based on the first candidate motion vector.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media may include one or more of RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more DSPs, general purpose microprocessors, ASICs, FPGAs, or other equivalent integrated or discrete logic circuitry. Accordingly, the terms "processor" and "processing circuitry," as used herein may refer to any of the foregoing structures or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of decoding video data, the method comprising:

determining a first search area in a first reference picture for a current block of the video data, the first reference picture comprising a list 0 (L0) reference picture;

determining a first initial reference block in the first search area;

determining a second search area in a second reference picture for a current block of the video data, the second reference picture comprising a list 1 (L1) reference picture;

determining a second initial reference block in the second search area;

determining a minimum difference between a L0 template prediction and an L1 template prediction;

determining at least one of a first local illumination compensation (LIC) model or a second LIC model based on the minimum difference;

applying the first LIC model to the first search area to generate a refined first search area;

applying template matching to the refined first search area to determine a first candidate motion vector having a lowest template matching cost for the refined first search area;

applying the second LIC model to the second search area to generate a refined second search area;

applying template matching to the refined second search area to determine a second candidate motion vector having a lowest template matching cost for the refined second search area; and decoding the current block based on the first candidate motion vector and the second candidate motion vector.

2. The method of claim 1, further comprising determining to decode the current block using decoder side motion vector refinement.

3. The method of claim 1, further comprising determining the first LIC model based on reconstructed neighbor samples of the current block.

4. The method of claim 1, wherein applying template matching comprises determining the first candidate motion vector having the lowest template matching cost for the refined first search area between a first reference template in the first reference picture and a reconstructed template in a current picture, the current picture comprising the current block.

5. The method of claim 1, wherein applying template matching comprises determining the first candidate motion vector having the lowest template matching cost for the refined first search area between a first reference template in the first reference picture and a second reference template in a second reference picture.

6. The method of claim 1, wherein applying the first LIC model comprises determining a LIC template, the LIC template comprising an above template and a left template.

7. The method of claim 1, wherein the applying the first LIC model comprises determining a LIC template, wherein the LIC template is a rectangular block.

8. The method of claim 1, wherein the first LIC model comprises a smoothing filter configured to remove high frequencies from the first search area.

9. The method of claim 1, further comprising encoding the current block prior to decoding the current block.

10. A device for decoding video data, the device comprising:

one or more memories configured to store the video data; and one or more processors, the one or more processors communicatively coupled to the one or more memories and configured to:

determine a first search area in a first reference picture for a current block of the video data, the first reference picture comprising a list 0 (L0) reference picture;

determine a first initial reference block in the first search area;

determine a second search area in a second reference picture for a current block of the video data, the second reference picture comprising a list 1 (L1) reference picture;

determine a second initial reference block in the second search area;

determine a minimum difference between a L0 template prediction and an L1 template prediction;

determine at least one of a first local illumination compensation (LIC) model or a second LIC model based on the minimum difference;

apply the first LIC model to the first search area to generate a refined first search area;

apply template matching to the refined first search area to determine a first candidate motion vector having a lowest template matching cost for the refined first search area;

apply the second LIC model to the second search area to generate a refined second search area;

apply template matching to the refined second search area to determine a second candidate motion vector having a lowest template matching cost for the refined second search area; and decode the current block based on the first candidate motion vector and the second candidate motion vector.

11. The device of claim 10, wherein the one or more processors are further configured to determine to decode the current block using decoder side motion vector refinement.

12. The device of claim 10, wherein the one or more processors are further configured to determine the first LIC model based on reconstructed neighbor samples of the current block.

13. The device of claim 10, wherein to apply template matching, the one or more processors are configured to determine the first candidate motion vector having the lowest template matching cost for the refined first search area between a first reference template in the first reference picture and a reconstructed template in a current picture, the current picture comprising the current block.

14. The device of claim 10, wherein to apply template matching, the one or more processors are configured to determine the first candidate motion vector having the lowest template matching cost for the refined first search area between a first reference template in the first reference picture and a second reference template in a second reference picture.

15. The device of claim 10, wherein to apply the first LIC model, the one or more processors are configured to determine a LIC template, the LIC template comprising an above template and a left template.

16. The device of claim 10, wherein to apply the first LIC model, the one or more processors are configured to determine a LIC template, wherein the LIC template is a rectangular block.

17. The device of claim 10, wherein the first LIC model comprises a smoothing filter configured to remove high frequencies from the first search area.

18. The device of claim 10, further comprising a display configured to display decoded video data.

19. The device of claim 10, wherein the one or more processors are further configured to encode the current block prior to decoding the current block.

20. A device for decoding video data, the device comprising:

means for determining a first search area in a first reference picture for a current block of the video data, the first reference picture comprising a list 0 (L0) reference picture;

means for determining a first initial reference block in the first search area;

means for determining a second search area in a second reference picture for a current block of the video data, the second reference picture comprising a list 1 (L1) reference picture;

means for determining a second initial reference block in the second search area;

means for determining a minimum difference between a L0 template prediction and an L1 template prediction;

means for determining at least one of a first local illumination compensation (LIC) model or a second LIC model based on the minimum difference;

means for applying the first LIC model to the first search area to generate a refined first search area;

means for applying template matching to the refined first search area to determine a first candidate motion vector having a lowest template matching cost for the refined first search area;

means for applying the second LIC model to the second search area to generate a refined second search area;

means for applying template matching to the refined second search area to determine a second candidate motion vector having a lowest template matching cost for the refined second search area; and means for decoding the current block based on the first candidate motion vector and the second candidate motion vector.

* * * * *